(12) United States Patent
Hattori et al.

(10) Patent No.: US 6,597,424 B2
(45) Date of Patent: Jul. 22, 2003

(54) OCB LIQUID CRYSTAL DISPLAY DEVICE HAVING PIXEL PROTRUSIONS

(75) Inventors: Katsuji Hattori, Takaraduka (JP); Shoichi Ishihara, Katano (JP); Hirofumi Kubota, Nishinomiya (JP); Shin-ichiro Hatta, Nara (JP); Katsumi Adachi, Kashiba (JP); Yoshinori Tanaka, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/159,121

(22) Filed: Jun. 3, 2002

(65) Prior Publication Data

US 2003/0001809 A1 Jan. 2, 2003

Related U.S. Application Data

(63) Continuation of application No. 09/786,160, filed as application No. PCT/JP99/04814 on Mar. 1, 2001.

(30) Foreign Application Priority Data

| Sep. 3, 1998 | (JP) | 10-249356 |
| Mar. 15, 1999 | (JP) | 11-068149 |
| Apr. 19, 1999 | (JP) | 11-110282 |
| Jun. 3, 1999 | (JP) | 11-157060 |
| Jul. 14, 1999 | (JP) | 11-200102 |

(51) Int. Cl.$^7$ ............................................. G02F 1/1343
(52) U.S. Cl. ........................ 349/146; 349/143; 349/191
(58) Field of Search ................................. 349/146, 191, 349/143, 38

(56) References Cited

U.S. PATENT DOCUMENTS 5,825,445 A * 10/1998 Okamoto et al. ........... 349/118

6,115,087 A * 9/2000 Ohi ........................... 349/38

FOREIGN PATENT DOCUMENTS

EP           0854465        7/1998

(List continued on next page.)

OTHER PUBLICATIONS

"Late–News Paper: A Full–Color TFT–LCD with a Domain–Divided Twisted–Nematic Structure," Y. Koike et al., 1992, p. 798–801.

(List continued on next page.)

*Primary Examiner*—Robert H. Kim
*Assistant Examiner*—Andrew Schechter
(74) *Attorney, Agent, or Firm*—McDermott, Will & Emery

(57) ABSTRACT

An active matrix liquid crystal display device having a liquid crystal cell including an army substrate provided with a pixel electrode, a signal electrode line, and a gate electrode line and an opposing substrate provided with a common electrode, in which pretilt angles of liquid crystal at upper and lower interfaces of a liquid crystal layer disposed between the army substrate and the opposing substrate have opposite signs having splay alignment formed by parallel alignment process while no voltage is applied. The active matrix liquid crystal display device is subjected to an initialization process for transitioning the splay alignment to bend alignment by application of voltage before liquid crystal display driving and adapted to perform the liquid crystal display driving in the bend alignment. In addition the pixel electrode is provided with a protrusion at a periphery thereof in a plane parallel to a plane defined by an upper surface of the array substrate, and in a region where the protrusion does not overlap with the signal electrode line and the gate electrode line in a vertical direction relative to the, and voltage is applied continuously or intermittently applied to the pixel electrode and the common electrode.

11 Claims, 48 Drawing Sheets

FOREIGN PATENT DOCUMENTS

| | | |
|---|---|---|
| JP | 02-013927 | 1/1990 |
| JP | 8-087013 | 4/1996 |
| JP | 8-328045 | 12/1996 |
| JP | 9-138421 | 5/1997 |
| JP | 9-146086 | 6/1997 |
| JP | 9-179123 | 7/1997 |
| JP | 9-185032 | 7/1997 |
| JP | 10-020284 | 1/1998 |
| JP | 10-206822 | 8/1998 |

OTHER PUBLICATIONS

"The Propagation of Disclination of Pi–Cell," Nakamura, p. 310–311.

"Initialization of Optically Compensated Bend–Mode LCDs," Sueoka et al., 1996, p. 133–1363.

"The Phase Initialization in the Pi–Cell," Noguchi et al., 1997, p. 739–741.

Partial European Search Report.

* cited by examiner

Fig. 27(a)
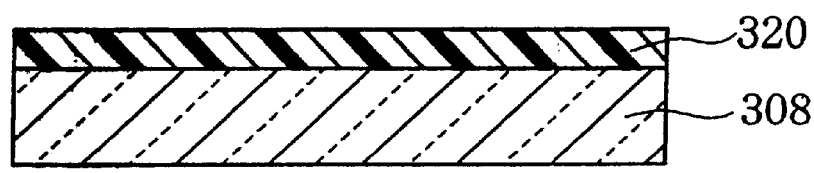
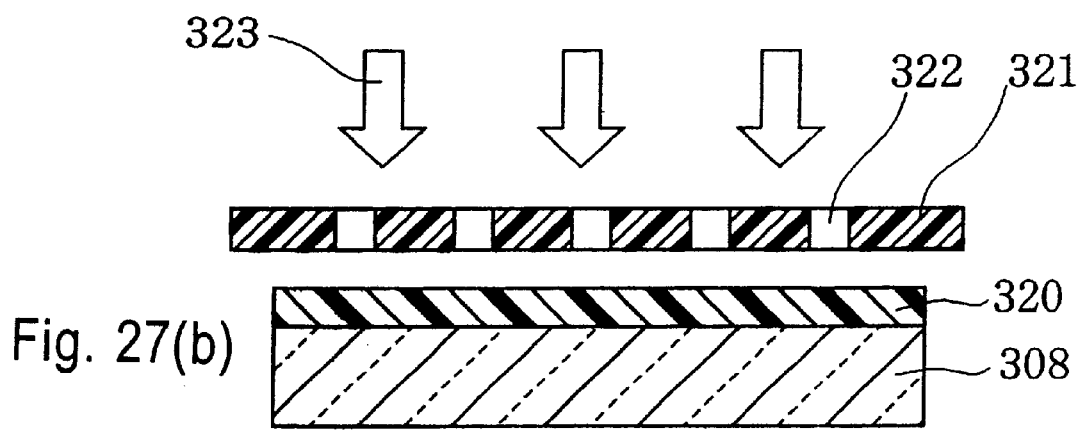
Fig. 27(b)

Orthographic Projection into the Substrate Plane of the Main Axis of Phase Difference Plate Made of an Optical Medium with Negative Reflective Index Anisotropy Whose Main Axes in Hybrid Arrangement

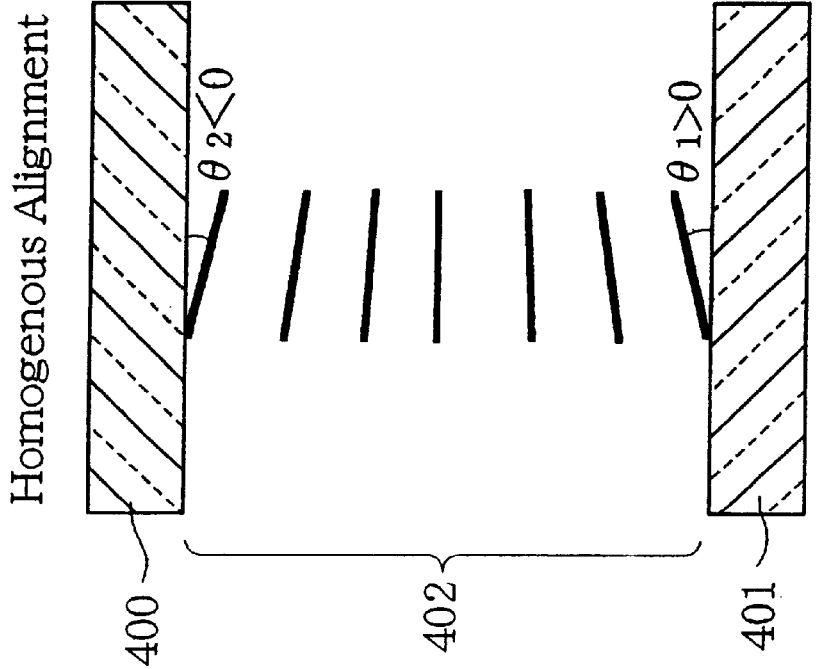
Fig. 41(b) Bend Alignment
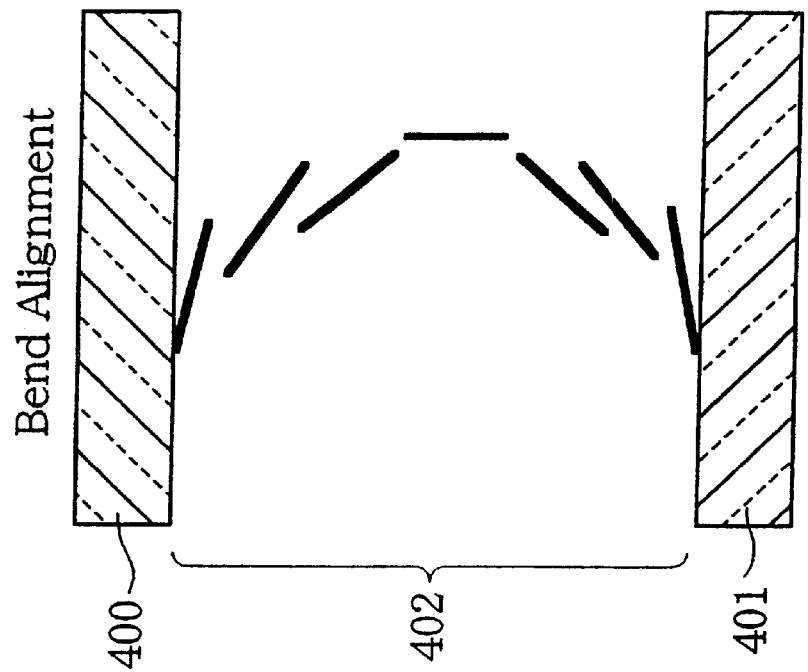
Fig. 41(a) Homogenous Alignment

ОCB LIQUID CRYSTAL DISPLAY DEVICE
HAVING PIXEL PROTRUSIONS

This application is a continuation of Ser. No. 09/786,160 Mar. 1, 2001 which is A 371 of PCT/JP99/04814 Sep. 3, 1999.

TECHNICAL FIELD

The present invention relates to an OCB-mode liquid crystal display device with fast response and broad viewing angle for displaying TV images, personal computer or multimedia images, a manufacturing method for the same, and a driving method for a liquid crystal display device.

BACKGROUND ART

Conventional liquid crystal display devices employ, as one example of liquid crystal display modes, twisted nematic (TN) mode liquid crystal display elements using a nematic liquid crystal with positive dielectric anisotropy, but these have the shortcomings of a slow response and narrow viewing angles. There are also display modes with slow response and broad viewing angles, using a ferroelectric liquid crystal (FLC) or anti-ferroelectric liquid crystal, but these have shortcomings with regard to burn-in, shock resistance, and temperature dependence. There is also the in-plane switching (IPS) mode which has extremely broad viewing angles, in which the liquid crystal molecules are driven within the display plane by a transversal electric field, but the response times are slow, and numerical aperture and luminance are low. When trying to display full-color moving images on large screens, a liquid crystal mode with broad viewing angle, high luminance and fast display properties is necessary, but at present, a liquid crystal display mode that perfectly satisfies all these requirements in practice does not exist.

Among the conventional liquid crystal display devices that aimed for at least a broad viewing angle and high luminance are liquid crystal display devices in which TN mode liquid crystal regions are partitioned into two domains to widen the viewing angle vertically (see SID 92 DIGEST p.798–801). That is to say, using a nematic liquid crystal with positive dielectric anisotropy in the display pixels of the liquid crystal display device, two TN mode liquid crystal regions with different alignment orientation of the liquid crystal molecules are formed, and the viewing angle is enlarged by this TN-mode with two alignment domains.

FIG. 48 is a diagram showing the configuration of such a conventional liquid crystal display device. In FIG. 48, numerals 701 and 702 denote glass substrates, numerals 703 and 704 denote electrodes, and numerals 705, 705', 706, and 706' denote alignment films. In the alignment region A, the nematic liquid crystal molecules 707 and 707' with positive dielectric anisotropy are slightly tilted away from the upper and lower boundaries to the opposing substrates, forming a larger and a smaller pretilt angle, whereas in the other alignment region B, the size of the pretilt angles with respect to the upper and lower boundaries of the opposing substrates is opposite to that in the alignment region A. Both the larger and the smaller pretilt angles are several degrees each, and are set to different angles. An example of a conventional manufacturing method for forming alignment regions with different pretilt angles at the upper and lower substrates is spreading photoresist on an alignment film, masking the photoresist photolithographically, and rubbing the desired alignment film surface in a predetermined direction, and repeating this procedure a certain number of times. As shown in FIG. 1, with this configuration, the liquid crystal molecules in the central portions of the liquid crystal layer in the alignment regions A and B are provided with opposite orientations, and since the liquid crystal molecules of the alignment regions rise in different directions when a voltage is applied, the refractive index anisotropy with respect to incoming light evens out for each pixel, and the viewing angle can be enlarged. With this conventional TN-mode with two alignment domains, the viewing angle can be made wider than with regular TN-mode, and the vertical viewing angle becomes about ±35° at a contrast of 10.

However, the response time is substantially the same as in TN-mode, namely about 50 ms. Thus., in this conventional TN-mode with two alignment domains, viewing angle and response are insufficient.

As for liquid crystal display modes utilizing the so-called homeotropic alignment mode, in which the liquid crystal molecules are aligned approximately vertically at the boundaries to the alignment films, there are liquid crystal display devices with broad viewing angle and fast response that are provided with film phase—difference plates and subjected to alignment partitioning, but again the response time between black and white display is about 25 ms, and in particular the response time for gray scales is slow at 50–80 ms, which is longer than the ⅟₃₀s that are held to be the visual speed of the human eye, so that moving images appear blurred.

On the other hand, a bend alignment type liquid crystal display device (OCB-mode liquid crystal display device) has been proposed, which utilizes changes of the refractive index due to changes in the angle with which the liquid crystal molecules rise when the liquid crystal molecules between the substrates are in bend alignment. The speed with which the orientation of bend aligned liquid crystal molecules changes in the ON state and the OFF state is much faster than the speed of orientation changes between ON and OFF states in TN liquid crystal display devices, so that a liquid crystal display device with fast response time can be obtained. Moreover, in this bend alignment type liquid crystal display device, optical phase differences can be compensated automatically, because all the liquid crystal molecules are bend aligned between the upper and lower substrates, and the liquid crystal display device has potential as a liquid crystal display device with low voltage and broad viewing angle, because phase differences are compensated by the film phase difference plates.

Incidentally, these liquid crystal display devices are manufactured such that the liquid crystal molecules between the substrates are in splay alignment when no voltage is applied. In order to change the refractive index using bend alignment, the entire display portion has to be transitioned uniformly from splay alignment to bend alignment before use of the liquid crystal display device. When applying a voltage between the opposing display electrodes, the transition seeds for the transition from splay alignment to bend alignment do not appear in uniform distribution, but around the distributed spacers, at alignment irregularities at the boundary to the alignment films, or at damaged portions. Furthermore, the transition seeds do not necessarily appear always at the same locations, which may easily lead to display defects, in which the transition sometimes takes place and sometimes does not take place. Consequently, it is very important that at least all pixel portions of the entire display portion are transitioned uniformly from splay alignment to bend alignment before use.

However, conventionally, when applying a simple ac voltage, the transition sometimes does not take place, and when it does take place, the transition time is very long.

DISCLOSURE OF THE INVENTION

It is an object of the present invention bend alignment type liquid crystal display device with fast response, suitable for display of moving images and broad viewing angle, in which the transition into bend alignment takes place reliably, and the transition is concluded in short time so that there are no display defects, as well as a manufacturing method for such a liquid crystal display device, and a driving method for a liquid crystal display device.

To achieve this object, according to a first aspect of the invention, a method for driving a liquid crystal display device, for an alignment transition from splay alignment to bend alignment in a liquid crystal display device which includes a pair of substrates and a liquid crystal layer disposed between the substrates; wherein, when no voltage is applied, pretilt angles of the liquid crystal at an upper and at a lower boundary of the liquid crystal layer have opposite signs, and the liquid crystal layer is in splay alignment, having been subjected to a parallel alignment process; wherein, before liquid crystal display driving, an initialization process is performed, in which the alignment of the liquid crystal layer is transitioned from splay alignment to bend alignment by application of a voltage to the substrates; and wherein the liquid crystal display driving is performed in the bend alignment attained by this initialization;

includes applying to the substrates an ac voltage superimposed with a bias voltage to cause transition of the liquid crystal layer into bend alignment.

With this method, an ac voltage superimposed with a bias voltage is applied between the substrates, which makes the transition time shorter than when only an ac voltage is applied. The reason for this is that, superimposing a bias voltage has the effect that the alignment of the liquid crystal molecules in the liquid crystal layer is disturbed by the bias voltage, and the liquid crystal molecules lean toward one of the substrates. Thus, transition seeds appear within a short time and reliably in the liquid crystal layer, and the transition time is shortened. In addition, the transition time be made even shorter by increasing the effective voltage.

According to a second aspect of the invention, a driving method for an alignment transition from splay alignment to bend alignment in a liquid crystal display device which includes a pair of substrates and a liquid crystal layer disposed between the substrates; wherein, when no voltage is applied, pretilt angles of the liquid crystal at an upper and at a lower boundary of the liquid crystal layer have opposite signs, and the liquid crystal layer is in splay alignment, having been subjected to a parallel alignment process; wherein, before liquid crystal display driving, an initialization process is performed, in which the alignment of the liquid crystal layer is transitioned from splay alignment to bend alignment by application of a voltage to the substrates; and wherein the liquid crystal display driving is performed in the bend alignment attained by this initialization;

includes a step of applying to the substrates an ac voltage superimposed with a bias voltage, and a step of putting the substrates into an electrically released state, repeated in alternation so as to cause transition of the liquid crystal layer into bend alignment.

This configuration includes providing a period of an electrically released state after the application of the ac voltage, which has the effect that the alignment of the liquid crystal molecules in the liquid crystal layer is disturbed, and the liquid crystal molecules lean toward one of the substrates. Thus, transition seeds appear within a short time and reliably in the liquid crystal layer, and the transition time is shortened.

According to a third aspect of the invention, a driving method for an alignment transition from splay alignment to bend alignment in a liquid crystal display device which includes a pair of substrates and a liquid crystal layer disposed between the substrates; wherein, when no voltage is applied, pretilt angles of the liquid crystal at an upper and at a lower boundary of the liquid crystal layer have opposite signs, and the liquid crystal layer is in splay alignment, having been subjected to a parallel alignment process; wherein, before liquid crystal display driving, an initialization process is performed, in which the alignment of the liquid crystal layer is transitioned from splay alignment to bend alignment by application of a voltage to the substrates; and wherein the liquid crystal display driving is performed in the bend alignment attained by this initialization;

includes a step of applying to the substrates an ac voltage superimposed with a bias voltage, and a step of applying zero voltage or a low voltage to the substrates, repeated in alternation so as to cause transition of the liquid crystal layer into bend alignment.

This configuration includes a zero voltage or a low voltage application period after the application of the ac voltage, so that the effect of disturbing the alignment of the liquid crystal molecules in the liquid crystal layer is larger than in the second aspect of the present invention. Consequently, the effect that the liquid crystal molecules lean toward one of the substrates occurs in very little time. Thus, and the transition time becomes even shorter.

According to a fourth aspect of the invention, in a method for driving a liquid crystal display device in accordance with the third aspect, the ac voltage superimposed with the bias voltage is replaced with a dc voltage.

With this configuration, also when a dc voltage is applied instead of the ac voltage, there are periods in which zero voltage of a low voltage are applied after the application of this dc voltage, which cause disturbances of the liquid crystal alignment in the liquid crystal layer. Thus, the transition time can be shortened with this driving method, too.

According to a fifth aspect of the invention, in a method for driving a liquid crystal display device in accordance with the second aspect, the frequency of the voltage repeated in alternation is in the range of 0.1 Hz to 100 Hz, and the duty ratio of the voltage repeated in alternation is in the range of at least 1:1 to 1000:1.

Here, "voltage repeated in alternation" is the voltage when the repetition of the ac voltage application period and the period of the electrically released that as a whole is taken as one voltage pattern. The following are the reasons for the limitation of the frequency and the duty of the voltage repeated in alternation.

When the frequency is smaller than 0.1 Hz, then there is almost no alternating repetition, so that the tilting of the liquid crystal molecule alignment caused by this alternating repetition stops. On the other hand, when the frequency is larger than 100 Hz, then the rate of the alternating repetition is too high and approximates an ac voltage, so that the tilting of the liquid crystal molecule alignment caused by this alternating repetition stops.

When the duty ratio of the repeatedly applied voltage is smaller than 1:1 (for example, 1:5), then the voltage applied to the liquid crystal layer is not sufficient. When the duty ratio is larger than 1000:1, then there is almost no alternated repetition, and the voltage is almost a dc voltage, so that the tilting of the liquid crystal molecule alignment caused by this alternating repetition stops.

According to a sixth aspect of the invention, in a method for driving a liquid crystal display device in accordance with the third aspect, the frequency of the voltage repeated in alternation is in the range of 0.1 Hz to 100 Hz, and the duty ratio of the voltage repeated in alternation is in the range of at least 1:1 to 1000:1.

The reasons for these limitations of the frequency and the duty ratio of the voltage repeated in alternation are the same as in the sixth aspect of the present invention.

According to a seventh aspect of the invention, in a method for driving a liquid crystal display device in accordance with the first aspect, the liquid crystal display device is an active matrix liquid crystal display device, and wherein the ac voltage is applied between a pixel electrode of the active matrix liquid crystal display device that is coupled to a switching element formed on one of the substrates and a common electrode formed on the other substrate.

With this configuration, the transition time can be shortened in an active matrix liquid crystal display device.

According to an eighth aspect of the invention, in a method for driving a liquid crystal display device in accordance with the third aspect, the liquid crystal display device is an active matrix liquid crystal display device, and wherein the ac voltage is applied between a pixel electrode of the active matrix liquid crystal display device that is coupled to a switching element formed on one of the substrates and a common electrode formed on the other substrate.

With this configuration, the transition time can be shortened in an active matrix liquid crystal display device.

According to a ninth aspect of the invention, in a method for driving a liquid crystal display device in accordance with the eighth aspect, the ac voltage is applied to the common electrode.

With this configuration, the transition time can be shortened.

According to a tenth aspect of the invention, in a method for driving a liquid crystal display device in accordance with the fourth aspect, the liquid crystal display device is an active matrix liquid crystal display device, and wherein the dc voltage is applied between a pixel electrode of the active matrix liquid crystal display device that is coupled to a switching element formed on one of the substrates and a common electrode formed on the other substrate.

With this configuration, the transition time can be shortened in an active matrix liquid crystal display device.

According to an eleventh aspect of the invention, in a method for driving a liquid crystal display device in accordance with the tenth aspect, the dc voltage is applied to the common electrode.

With this configuration, the transition time can be shortened.

According to a twelfth aspect of the invention, in a method for driving a liquid crystal display device in accordance with the first aspect, the value of the ac voltage is set to a critical voltage that is a minimum voltage necessary for transitioning the liquid crystal layer from splay alignment to bend alignment.

With this configuration, it is possible to reduce the voltage.

According to a thirteenth aspect of the invention, in a method for driving a liquid crystal display device in accordance with the fourth aspect, the value of the ac voltage is set to a critical voltage that is a minimum voltage necessary for transitioning the liquid crystal layer from splay alignment to bend alignment.

With this configuration, it is possible to reduce the voltage.

According to a fourteenth aspect of the invention, in a method for driving a liquid crystal display device in accordance with the third aspect, the voltage is an alternated voltage averaging over time.

With this configuration, deterioration of the liquid crystal can be prevented.

According to a fifteenth aspect of the invention, a liquid crystal display device including a pair of substrates and a liquid crystal layer disposed between the substrates; wherein, when no voltage is applied, pretilt angles of the liquid crystal at an upper and at a lower boundary of the liquid crystal layer have opposite signs, and the liquid crystal layer is in splay alignment, having been subjected to a parallel alignment process; wherein, before liquid crystal display driving, an initialization process is performed, in which the alignment of the liquid crystal layer is transitioned from splay alignment to bend alignment by application of a voltage to the substrates; wherein the liquid crystal display driving is performed in the bend alignment attained by the initialization;

including a voltage application means for applying to the substrates an ac voltage or a dc voltage superimposed with a bias voltage, so as to transition the liquid crystal layer from splay alignment to bend alignment.

With this configuration, a liquid crystal display device with short transition time is accomplished.

According to a sixteenth aspect of the invention, in a liquid crystal display device as in the fifteenth aspect, the value of the ac voltage or dc voltage is set to a critical voltage that is a minimum voltage necessary for transitioning the liquid crystal layer from splay alignment to bend alignment.

With this configuration, a liquid crystal display device with short transition time is accomplished.

According to a seventeenth aspect of the invention, an active matrix liquid crystal display device including an array substrate provided with a pixel electrode; an opposing substrate provided with a common electrode; and a liquid crystal layer arranged between the array substrate and the opposing substrate; wherein pretilt angles of the liquid crystal at an upper and at a lower boundary of liquid crystal layer have opposite signs, and in a liquid crystal cell in splay alignment, which has been subjected to a parallel alignment process, the liquid crystal is in splay alignment when no voltage is applied; wherein, before liquid crystal display driving, an initialization process is performed, in which the alignment of the liquid crystal layer is transitioned from splay alignment to bend alignment by application of a voltage; wherein the liquid crystal display driving is performed in the bend alignment attained by the initialization; including:

a liquid crystal cell including at least a first liquid crystal cell region, wherein a liquid crystal pretilt angle at an alignment film formed on an inner side of the array substrate is a first pretilt angle, and wherein a liquid crystal pretilt angle at an alignment film formed on an inner side of the opposing substrate is a second pretilt angle larger than the first pretilt angle; and a second liquid crystal cell region arranged next to the first liquid crystal cell region within the same pixel; wherein a liquid crystal pretilt angle at an alignment film formed on an inner side of the array substrate is a third pretilt angle, and wherein a liquid crystal pretilt angle at an alignment film formed on an inner side of the opposing substrate is a fourth pretilt angle larger than the third pretilt angle, the alignment films having been subjected to an alignment process directed from the first liquid crystal cell region to the second liquid crystal cell region;

a first voltage application means for applying a first voltage between the pixel electrode and the common electrode so as to form a disclination line at a border between the first liquid crystal cell region and the second liquid crystal cell region; and a second voltage application means for creating transition seeds at the disclination line by applying a second voltage larger than the first voltage between the pixel electrode and the common electrode, and causing transition from splay alignment to bend alignment.

With this configuration, applying a first voltage between the pixel electrode and the common electrode forms a disclination line between the first liquid crystal cell region and the second liquid crystal cell region, where the bending energy is higher than around it, and applying a second voltage larger than the first voltage between the pixel electrode and the common electrode, directs even more energy to this disclination line, causing transition from splay alignment to bend alignment at the disclination line.

Consequently, in a liquid crystal display device with this configuration, the splay—bend alignment transition occurs reliably at a certain location (namely at the disclination lines) within the pixel regions provided with many liquid crystal cells, a reliable and fast alignment transition can be ensured, and a high-quality and inexpensive liquid crystal display device without display defects can be realized.

According to an eighteenth aspect of the invention, in a liquid crystal display device as in the seventeenth aspect, the first and the fourth pretilt angles are at most 3°, and the second and third pretilt angles are at least 4°.

With this configuration, the ratio between the second and the fourth pretilt angle, and the ratio between the first and the fourth pretilt angle can be large, so that disclination lines with a bending energy that is even higher than the bending energy around them can be formed, and the transition time from splay alignment to bend alignment can be made even shorter.

According to a nineteenth aspect of the invention, in a liquid crystal display device as in the seventeenth aspect, the direction in which the alignment films are subjected to the alignment process is perpendicular to signal electrode lines or gate electrode lines arranged along the pixel electrode.

With this configuration, a transversal electric field is applied from the transversal electric field application portions in a direction that is substantially perpendicular to the alignment of the liquid crystal molecules in the liquid crystal layer, so that this transversal electric field exerts a twisting force on the liquid crystal molecules, and consequently, transition seeds appear at the disclination line, and a quick alignment transition from splay alignment to bend alignment can be achieved.

According to a twentieth aspect of the invention, in a liquid crystal display device as in the seventeenth aspect, the direction in which the alignment films are subjected to the alignment process is slightly askew to a direction perpendicular to signal electrode lines or gate electrode lines arranged along the pixel electrode.

Making the direction in which the alignment films are subjected to the alignment process is slightly askew to a direction perpendicular to signal electrode lines or gate electrode lines arranged along the pixel electrode, a slightly askew transversal electric field is applied to the disclination lines from the signal electrode lines or gate electrode lines, so that the twisting force on the splay aligned liquid crystal molecules is increased, thereby assisting the transition to bend alignment.

According to a twenty-first aspect of the invention, in a liquid crystal display device as in the seventeenth aspect, the second voltage is pulse-shaped with a frequency in the range of 0.1 Hz to 100 Hz, and a duty ratio in the range of at least 1:1 to 1000:1.

Applying such a pulse-shaped second voltage and alternating voltage application periods and periods in which no voltage is applied, the liquid crystal molecules are disturbed and transition more readily, so that the splay aligned liquid crystal molecules transition into bend alignment. Frequency and duty ratio are limited to the above ranges to enlarge the transition regions of transition from splay alignment to bend alignment.

According to a twenty-second aspect of the invention, in a liquid crystal display device as in the seventeenth aspect, the gate electrode lines are in an ON state for at least most of said transition period.

The regions of the disclination lines have a bending energy that is higher than in the regions around them, and in this situation, the transversal electric field is applied to the disclination lines from the gate electrode lines, which are arranged transversally with respect to the pixel electrodes, so that even more energy is directed to them, and the transition from splay alignment to bend alignment is accelerated.

According to a twenty-third aspect of the invention, a liquid crystal display device as in the seventeenth aspect further includes a liquid crystal cell that has been alignment partitioned by irradiating UV light on a portion of at least one of the alignment films formed on the inner sides of the pixel electrode and the common electrode so that the pretilt angle of the liquid crystal at that alignment film is changed.

Irradiating UV light on a portion of the alignment films, it is possible to modify the surface of the irradiated region of the alignment films, and to decrease the pretilt angle of the liquid crystal in the modified alignment films. The reasons why the pretilt angle in the alignment films are decreased by irradiation with UV light are not entirely clear at present, but it seems that the UV light breaks up side chains in the alignment surface. Thus, liquid crystal cells with alignment partitions can be formed by irradiation with UV light.

According to a twenty-fourth aspect of the invention, a liquid crystal display device as in the seventeenth aspect further includes a liquid crystal cell that has been alignment partitioned by irradiating a portion of the pixel electrode and a portion of the common electrode with UV light under an ozone atmosphere to flatten at least one of the portions of the pixel electrode and the common electrode has been flattened, and applying and baking an alignment film on the pixel electrode and the common electrode, so as to change the pretilt angle of the liquid crystal at the alignment film.

Irradiating a portion of the pixel electrode and a portion of the common electrode with UV light under an ozone atmosphere, the surfaces of the pixel electrode and the common electrode can be flattened, and consequently, liquid crystal cells with alignment partitions and varying pretilt angles of the liquid crystal at the alignment films can be formed by spreading the alignment films on the pixel electrode and the common electrode.

According to a twenty-fifth aspect of the invention, a method for manufacturing an active matrix liquid crystal display device including an array substrate provided with a pixel electrode; an opposing substrate provided with a common electrode; and a liquid crystal layer arranged between the array substrate and the opposing substrate; wherein pretilt angles of the liquid crystal at an upper and at a lower boundary of the liquid crystal layer have opposite signs, and in a liquid crystal cell in splay alignment, which has been subjected to a parallel alignment process, the liquid crystal is in splay alignment when no voltage is applied;

wherein, before liquid crystal display driving, an initialization process is performed, in which the alignment of the liquid crystal layer is transitioned from splay alignment to bend alignment by application of a voltage; wherein the liquid crystal display driving is performed in the bend alignment attained by the initialization;
includes:
a preparation step of preparing a liquid crystal cell in splay alignment, which has been subjected to a parallel alignment process, wherein the pretilt angles of the liquid crystal at the upper and lower boundaries of the liquid crystal layer arranged between the array substrate provided with the pixel electrode and the opposing substrate provided with the common electrode have opposite signs;
a disclination line forming step of applying a first voltage for forming a disclination line between the pixel electrode and the common electrode, and forming a disclination line at a boundary between a first liquid crystal cell region and a second liquid crystal cell region; and
an alignment transition step for transition from splay alignment to bend alignment of applying a second voltage larger than the first voltage between the pixel electrode and the common electrode, and creating transition seeds at the disclination line at the boundary between the first liquid crystal cell region and the second liquid crystal cell region.

With this method, the splay—bend alignment transition occurs reliably at a certain location (namely at the disclination lines) within the pixel regions provided with many liquid crystal cells in the liquid crystal display device, and transition seeds appear reliably, because the bending energy at the disclination lines is higher than around them. Consequently, a reliable and fast alignment transition can be ensured, and a high-quality and inexpensive liquid crystal display device without display defects can be obtained.

According to a twenty-sixth aspect of the invention, in a method for manufacturing a liquid crystal display device as in the twenty-fifth aspect, the preparation step includes an alignment process step of arranging the liquid crystal molecules in one pixel region in b-splay alignment by subjecting them to an alignment process such that a pretilt angle of the liquid crystal on the pixel electrode side becomes smaller than a pretilt angle of the liquid crystal on the common electrode side, and arranging the liquid crystal molecules in another pixel region in t-splay alignment by subjecting them to an alignment process such that a pretilt angle of the liquid crystal on the pixel electrode side becomes larger than a pretilt angle of the liquid crystal on the common electrode side.

With this method, b-splay alignment regions and t-splay alignment regions are formed in the pixels, and disclination lines are formed clearly at the border between them. As mentioned above, the bending energy at these disclination lines is larger than around them, so that transition seeds appear reliably, and consequently, a reliable and fast alignment transition can be ensured.

According to a twenty-seventh aspect of the invention, in a method for manufacturing a liquid crystal display device as in the twenty-sixth aspect, the alignment process step includes alignment partitioning by irradiating UV light on a portion of the alignment film formed on an inner surface side of at least one electrode of the pixel electrode and the common electrode to change the pretilt angle of the liquid crystal.

Irradiating UV light on a portion of the alignment films, it is possible to modify the surface of regions the alignment films irradiated with UV light, and to decrease the pretilt angle of the liquid crystal in the modified alignment films.

According to a twenty-seventh aspect of the invention, in a method for manufacturing a liquid crystal display device as in the twenty-sixth aspect, the alignment process step includes alignment partitioning by irradiating a region of at least one electrode of the pixel electrode and the common electrode with UV light under an ozone atmosphere, flattening a portion of the pixel electrode and the common electrode, and then applying and baking an alignment film on the pixel electrode and the common electrode to change the pretilt angle of the liquid crystal at the alignment film.

With this method, a portion of either the pixel electrode or the common electrode or both can be flattened, and consequently, a liquid crystal display device having liquid crystal cells with alignment partitions and varying pretilt angles of the liquid crystal at the alignment films can be formed by spreading the alignment films on the pixel electrode and the common electrode.

According to a twenty-ninth aspect of the invention, an active matrix liquid crystal display device includes an array substrate provided with a pixel electrode; an opposing substrate provided with a common electrode; and a liquid crystal layer arranged between the array substrate and the opposing substrate; wherein pretilt angles of the liquid crystal at an upper and at a lower boundary of liquid crystal layer have opposite signs, and in a liquid crystal cell in splay alignment, which has been subjected to a parallel alignment process, the liquid crystal is in splay alignment when no voltage is applied; wherein, before liquid crystal display driving, an initialization process is performed, in which the alignment of the liquid crystal layer is transitioned from splay alignment to bend alignment by application of a voltage; wherein the liquid crystal display driving is performed in the bend alignment attained by the initialization; and
wherein each pixel has at least one transition-inducing transversal field application portion due to which a transversal electric field is generated, and applying a continuous or intermittent voltage to the pixel electrode and the common electrode, transition seeds are created in each pixel, and the pixels transition from splay arrangement to bend arrangement.

The following effects can be attained with this configuration.

A voltage that is sufficiently larger than the transition voltage is applied between the pixel electrode and the common electrode, and at least one transition-inducing transversal electric application field portion provided in each pixel applies a transversal electric field, whereby the transversal electric application field portion becomes the starting point for the transition of the liquid crystal layer in the pixel from splay alignment to bend alignment (that is, it can be ensured that transition seeds appear in the liquid crystal layer near the transversal electric field application portions). Thus, the transition from splay alignment to bend alignment can be carried out fast.

According to a thirtieth aspect of the invention, in a liquid crystal display device as in the twenty-ninth aspect, the transversal electric field generated by the transversal electric field application portions is substantially perpendicular to the direction of the alignment process.

With this embodiment, the transversal electric field is applied by the transversal electric field application portions in a direction that is substantially perpendicular to the direction of the alignment of the liquid crystal molecules in the liquid crystal layer, so that this transversal electric field exerts a twisting force on the liquid crystal molecules, and consequently, transition seeds appear, and a quick transition from splay alignment to bend alignment can be achieved.

According to a thirty-first aspect of the invention, in a liquid crystal display device as in the twenty-ninth aspect, the transversal electric field application portions are electrode deformation portions, in which sides of the pixel electrodes are deformed to protrusions and recesses in a plane parallel to the substrate plane.

The following effects can be attained with this configuration.

The electric field concentrates between the transversal electric field application portions, which are electrode deformation portions, in which sides of the pixel electrodes are deformed to protrusions and recesses in a plane parallel to the substrate plane, and signal electrode lines or gate electrode lines arranged beneath the transversal electric field application portions. Consequently, the transversal electric field generated like this is stronger than the transversal electric field generated between pixel electrodes without such transversal electric field application portions and the signal electrode lines or gate electrode lines. Consequently, with the transversal electric field generated due to the transversal electric field application portions, the appearance of seeds in the liquid crystal layer can be ensured, and a quick transition from splay alignment to bend alignment can be achieved.

According to a thirty-second aspect of the invention, in a liquid crystal display device as in the twenty-ninth aspect, the transversal electric field application portions are electrode line deformation portions, in which signal electrode lines or gate electrode lines are deformed to protrusions and recesses in a plane parallel to the substrate plane.

The following effect can be attained with this configuration.

The same effect as in the thirty-first aspect of the present invention is attained due to electrode line deformation portions at either one or both types of electrode lines.

According to a thirty-third aspect of the invention, in a liquid crystal display device as in the twenty-ninth aspect, the transversal electric field application portions are deformations in the electrodes and the electrode lines, in which sides of the pixel electrodes are deformed to protrusions and recesses in a plane parallel to the substrate plane, and in correspondence to these protrusions and recesses, signal electrode lines or gate electrode lines are deformed to protrusions and recesses in a plane parallel to the substrate plane.

The following effects can be attained with this configuration.

The same effect as in the thirty-first aspect of the present invention is attained with the transversal electric field application portions, which are deformations in the electrodes and the electrode lines, in which at least one side of the pixel electrodes is deformed to protrusions and recesses in a plane parallel to the substrate plane, and in correspondence to these protrusions and recesses, signal electrode lines or gate electrode lines or both are deformed to protrusions and recesses.

According to a thirty-fourth aspect of the invention, in a liquid crystal display device as in the twenty-ninth aspect, the transversal electric field application portions are transversal electric field application line deformation portions in transversal electric field application lines that are deformed to protrusions and recesses in a plane parallel to the substrate plane, wherein the transversal electric field application lines are arranged in a layer above or below at least one of signal electrode lines or gate electrode lines and in the same direction as these, separated from them by an insulting film, and wherein the transversal electric field application lines are connected to a driving circuit, to which also the signal electrode lines or gate electrode lines are connected.

With this configuration, the transversal electric field application lines are dedicated lines for transversal electric field application, and are arranged in a layer above or below at least one of signal electrode lines or gate electrode lines, separated from them by an insulting film, which leads to flexibility with regard to the shape of the protrusions and recesses, which can be formed for example continuously along the sides of the transversal electric field application lines. Furthermore, since the transversal electric field application lines overlap with the signal electrode lines or the gate electrode lines, there is little light absorption, and consequently the aperture ratio of the pixels does not decrease. Thus, a redundant design with a greater degree of freedom.

According to a thirty-fifth aspect of the invention, in a liquid crystal display device as in the thirty-fourth aspect, the transversal electric field application lines are disconnected from the driving circuit during regular liquid display after alignment transition.

With this configuration, the transversal electric field application lines are disconnected from the driving circuit during regular liquid display after alignment transition, so that no electric field is generated between the transversal electric field application portions formed in the transversal electric field application lines and the pixel electrodes. Consequently, disturbances in the alignment of the liquid crystal do not occur during regular liquid crystal display, so that a liquid crystal display device with superior liquid crystal display quality can be obtained.

According to a thirty-sixth aspect of the invention, an active matrix liquid crystal display device including an array substrate; an opposing substrate; and a liquid crystal layer arranged between the array substrate and the opposing substrate; wherein pretilt angles of the liquid crystal at an upper and at a lower boundary of liquid crystal layer have opposite signs, and in a liquid crystal cell in splay alignment, which has been subjected to a parallel alignment process, the liquid crystal is in splay alignment when no voltage is applied; wherein, before liquid crystal display driving, an initialization process for a transition from splay alignment to bend alignment is performed by application of a voltage; wherein the liquid crystal display driving is performed in the bend alignment attained by the initialization;

includes at least one of a pixel electrode and a common electrode, wherein a defect portion for application of a transition-inducing transversal electric field is formed at least at one location in each pixel.

The following effects can be attained with this configuration.

Having at least one of a pixel electrode and a common electrode in which a defect portion for application of a transition-inducing transversal electric field is formed at least at one location for each pixel unit, a bending of the electric field (that is, an oblique electric field) is generated at the edge of this defect portion. Consequently, this oblique electric field exerts a twisting force on the liquid crystal molecules, so that the appearance of transition seeds can be ensured, and a quick transition from splay alignment to bend alignment can be achieved.

According to a thirty-seventh aspect of the invention, an active matrix liquid crystal display device including an array substrate; an opposing substrate; and a liquid crystal layer arranged between the array substrate and the opposing substrate; wherein pretilt angles of the liquid crystal at an upper and at a lower boundary of liquid crystal layer have opposite signs, and in a liquid crystal cell in splay alignment, which has been subjected to a parallel alignment process, the liquid crystal is in splay alignment when no voltage is applied; wherein, before liquid crystal display driving, an initialization process for a transition from splay alignment to bend alignment is performed by application of a voltage; wherein the liquid crystal display driving is performed in the bend alignment attained by the initialization;

includes in each pixel a transition-inducing transversal electric field application portion; and each pixel includes a first alignment region, wherein a pretilt angle of liquid crystal molecules in one region at a pixel electrode is a first pretilt angle, and a pretilt angle of liquid crystal molecules in the one region at a common electrode opposing the pixel electrode is a second pretilt angle larger than the first pretilt angle; and a second alignment region, wherein a pretilt angle of liquid crystal molecules in another region of the pixel electrode is a third pretilt angle, and a pretilt angle of liquid crystal molecules in the other region of a common electrode opposing the pixel electrode is a fourth pretilt angle smaller than the third pretilt angle.

The following effects can be attained with this configuration.

Due to the effect of the transversal electric field application portions, the pretilt angle in the first alignment region differs from the pretilt angle the second alignment region, so that a disclination line is formed between the first alignment region and the second alignment region. This disclination line becomes the starting point for the alignment transition, so that the transition from splay alignment to bend alignment is enhanced.

According to a thirty-eighth aspect of the invention, a liquid crystal display device as in the twenty-ninth aspect further includes a pulse voltage application portion for applying to the common electrode and the pixel electrode a pulse-shaped voltage with a frequency the range of 0.1 Hz to 100 Hz, and a duty ratio in the range of at least 1:1 to 1000:1.

The following effects can be attained with this configuration.

Although there may be certain differences depending for example on size, shape and thickness of the liquid crystal layer, the frequency and the duty ratio of the pulse voltage application portion are limited to the above ranges so as to enlarge the regions of transition from splay alignment to bend alignment.

Applying such a pulse-shaped second voltage and alternating voltage application periods and periods in which no voltage is applied, the liquid crystal molecules are disturbed and transition more readily, so that the splay aligned liquid crystal molecules transition into bend alignment. Frequency and duty ratio are limited to the above ranges to enlarge the transition regions of transition from splay alignment to bend alignment.

According to a thirty-ninth aspect of the invention, a liquid crystal display device including a pair of substrates; a liquid crystal layer disposed between the substrates; and a phase compensator arranged on an outer side of the substrates; wherein, when no voltage is applied, pretilt angles of the liquid crystal at an upper and at a lower boundary of the liquid crystal layer have opposite signs, and the liquid crystal layer is in splay alignment, having been subjected to a parallel alignment process; wherein, before liquid crystal display driving, an initialization process is performed, in which the alignment of the liquid crystal layer is transitioned from splay alignment to bend alignment by application of a voltage; wherein the liquid crystal display driving is performed in the bend alignment attained by this initialization;

includes at least one region in the display pixels where the liquid crystal layer thickness is smaller than around it, and the strength of an electric field applied to the liquid crystal layer in this region is larger than the strength of an electric field applied to the liquid crystal layer around it.

With this configuration, more transition seeds appear at the portions where the electric field is strong, so that the transition time can be shortened.

According to a fortieth aspect of the invention, a liquid crystal display device including a pair of substrates; a liquid crystal layer disposed between the substrates; and a phase compensator arranged on an outer side of the substrates; wherein, when no voltage is applied, pretilt angles of the liquid crystal at an upper and at a lower boundary of the liquid crystal layer have opposite signs, and the liquid crystal layer is in splay alignment, having been subjected to a parallel alignment process; wherein, before liquid crystal display driving, an initialization process is performed, in which the alignment of the liquid crystal layer is transitioned from splay alignment to bend alignment by application of a voltage; and wherein the liquid crystal display driving is performed in the bend alignment attained by this initialization;

includes at least one region outside the display pixels where the liquid crystal layer thickness is small, and the strength of an electric field applied to the liquid crystal layer in this region is larger than strength of an electric field applied to the liquid crystal layer in the pixels.

With this configuration, electric field concentrations occur outside the pixels, and the transition seeds appearing outside the pixels are propagated into the pixels. Thus, also in this case, the transition time can be shortened.

According to a forty-first aspect of the invention, a liquid crystal display device including a pair of substrates; a liquid crystal layer disposed between the substrates; and a phase compensator arranged on an outer side of the substrates; wherein, when no voltage is applied, pretilt angles of the liquid crystal at an upper and at a lower boundary of the liquid crystal layer have opposite signs, and the liquid crystal layer is in splay alignment, having been subjected to a parallel alignment process; wherein, before liquid crystal display driving, an initialization process is performed, in which the alignment of the liquid crystal layer is transitioned from splay alignment to bend alignment by application of a voltage; wherein the liquid crystal display driving is performed in the bend alignment attained by this initialization;

includes at least one location in the display pixels where the electric field concentrates.

According to a forty-second aspect of the invention, in a liquid crystal display device as in the forty-first aspect; the location in the display pixels where the electric field concentrates is at a portion of either the display electrode or the common electrode that partially protrudes in thickness direction of the liquid crystal layer, or both.

Thus, electric field concentrations can be achieved with such a protruding display electrode configuration.

According to a forty-third aspect of the invention, a liquid crystal display device including a pair of substrates; a liquid crystal layer disposed between the substrates; and a phase compensator arranged on an outer side of the substrates; wherein, when no voltage is applied, pretilt angles of the liquid crystal at an upper and at a lower boundary of the liquid crystal layer have opposite signs, and the liquid crystal layer is in splay alignment, having been subjected to a parallel alignment process; wherein, before liquid crystal display driving, an initialization process is performed, in which the alignment of the liquid crystal layer is transitioned from splay alignment to bend alignment by application of a voltage; wherein the liquid crystal display driving is performed in the bend alignment attained by this initialization;

includes at least one location outside the display pixels where the electric field concentrates.

Providing such electric field concentration portions outside the display pixels, the transition seeds appearing outside the pixels propagate into the pixels. Thus, also in this case, the transition time can be shortened.

According to a forty-fourth aspect of the invention, in a liquid crystal display device as in the forty-third aspect, the location where the electric field concentrates is a portion of an electrode that partially protrudes in thickness direction of the liquid crystal layer.

According to a forty-fifth aspect of the invention, a liquid crystal display device including a pair of substrates; a liquid crystal layer disposed between the substrates; and a phase compensator arranged on an outer side of the substrates; wherein, when no voltage is applied, pretilt angles of the liquid crystal at an upper and at a lower boundary of the liquid crystal layer have opposite signs, and the liquid crystal layer is in splay alignment, having been subjected to a parallel alignment process; wherein, before liquid crystal display driving, an initialization process is performed, in which the alignment of the liquid crystal layer is transitioned from splay alignment to bend alignment by application of a voltage; wherein the liquid crystal display driving is performed in the bend alignment attained by this initialization; and a portion of either the display electrode or the common electrode or both is provided with an aperture portion.

Also with this configuration, the transition time can be shortened.

According to a forty-sixth aspect of the invention, a liquid crystal display device as in the forty-fifth aspect is an active matrix liquid crystal display device provided with switching elements, and wherein the aperture portion is a conducting via hole electrically connecting pixel electrodes formed on a flattening film and the switching elements.

Also with this configuration, the transition time can be shortened.

According to a forty-seventh aspect of the invention, in a liquid crystal display device as in the thirty-ninth aspect, the phase compensator includes at least one phase compensator made of an optical medium with negative reflective index anisotropy whose main axes are in hybrid arrangement.

According to a forty-eighth aspect of the invention, in a liquid crystal display device as in the forty-seventh aspect, the phase compensator includes at least one positive phase compensator.

According to a forty-ninth aspect of the invention, a method for driving a liquid crystal display device includes applying an electric field to a liquid crystal disposed between a first substrate and a second substrate arranged in opposition, and transitioning the alignment of the liquid crystal into bend alignment;

wherein the splay elastic constant $k_{11}$ of the liquid crystal is in the range of $10 \times 10^{-7} \text{dyn} \geq k_{11} \geq 6 \times 10^{-7} \text{dyn}$; and
satisfying the relation $1.57 \text{ rad} > |\theta_1 - \theta_2| \geq 0.0002 \text{ rad}$, wherein $\theta_1$ is the absolute value of a pretilt angle of the liquid crystal with respect to the first substrate and $\theta_2$ is the absolute value of a pretilt angle of the liquid crystal with respect to the second substrate.

With this configuration, it is possible to decrease the critical electric field for liquid crystal transition, and achieve a quick transition from the initial alignment of the liquid crystal molecules to the bend alignment.

According to a fiftieth aspect of the invention, a method for driving a liquid crystal display device including applying an electric field to a liquid crystal disposed between a first substrate and a second substrate arranged in opposition, and transitioning the alignment of the liquid crystal into bend alignment;

wherein the splay elastic constant $k_{11}$ of the liquid crystal is in the range of $10 \times 10^{-7} \text{dyn} \geq k_{11} \geq 6 \times 10^{-7} \text{dyn}$; and
wherein the electric field is a main electric field $E_0$ applied uniformly over space, to which a secondary electric field $E_1$ applied non-uniformly over space is superimposed, satisfying the relation $1.0 > E_1 - E_0 > 1/100$.

Also with this configuration, it is possible to decrease the critical electric field for liquid crystal transition, and achieve a quick transition from the initial alignment of the liquid crystal molecules to the bend alignment.

According to a fifty-first aspect of the invention, a method for driving a liquid crystal display device including applying an electric field to a liquid crystal disposed between a first substrate and a second substrate arranged in opposition, and transitioning the alignment of the liquid crystal into bend alignment;

satisfying the relation $1.57 \text{ rad} > |\theta_1 - \theta_2| \geq 0.0002 \text{ rad}$, wherein $\theta_1$ is the absolute value of a pretilt angle of the liquid crystal with respect to the first substrate and $\theta_2$ is the absolute value of a pretilt angle of the liquid crystal with respect to the second substrate; and
wherein the electric field is a main electric field $E_0$ applied uniformly over space, to which a secondary electric field $E_1$ applied non-uniformly over space is superimposed, satisfying the relation $1.0 > E_1 - E_0 > 1/100$.

Also with this configuration, it is possible to decrease the critical electric field for liquid crystal transition, and achieve a quick transition from the initial alignment of the liquid crystal molecules to the bend alignment.

According to a fifty-second aspect of the invention, a method for driving a liquid crystal display device including applying an electric field to a liquid crystal disposed between a first substrate and a second substrate arranged in opposition, and transitioning the alignment of the liquid crystal into bend alignment;

wherein the splay elastic constant $k_{11}$ of the liquid crystal is in the range of $10 \times 10^{-7} \text{dyn} > k_{11} > 6 \times 10^{-7} \text{dyn}$; and
satisfying the relation $1.57 \text{ rad} > |\theta_1 - \theta_2| \geq 0.0002 \text{ rad}$, wherein $\theta_1$ is the absolute value of a pretilt angle of the liquid crystal with respect to the first substrate and $\theta_2$ is the absolute value of a pretilt angle of the liquid crystal with respect to the second substrate; and
wherein the electric field is a main electric field $E_0$ applied uniformly over space, to which a secondary electric field $E_1$ applied non-uniformly over space is superimposed, satisfying the relation $1.0 > E_1 - E_0 > 1/100$.

Also with this configuration, it is possible to decrease the critical electric field for liquid crystal transition, and achieve a quick transition from the initial alignment of the liquid crystal molecules to the bend alignment.

Here, the pretilt angle is the alignment angle of the liquid crystal molecules at the substrate surfaces before the application of an electric field, representing the tilt of the molecular axis of the liquid crystal molecules at the substrates surfaces with respect to a plane parallel to the substrates over a range of $-\pi/2$ to $\pi/2$ rad, and is positive in counter-clockwise direction, taking the plane parallel to the substrates as the reference (=0). Furthermore, the pretilt angle of the liquid crystal at the first substrate is marked with an opposite sign to the pretilt angle of the liquid crystal at the second substrate.

According to a fifty-third aspect of the invention, in a method for driving a liquid crystal display device as in the fiftieth aspect, the secondary electric field is applied between a source electrode or a gate electrode of a thin film transistor formed on a surface of the first substrate, and a transparent electrode formed on a surface of the second substrate.

According to a fifty-fourth aspect of the invention, in a method for driving a liquid crystal display device as in the fiftieth aspect, the secondary field is an ac electric field whose oscillation is dampened over time.

BRIEF DESCRIPTION OF THE DRAWINGS

FIG. 23 schematically illustrates the configuration of a liquid crystal display device in accordance with the tenth embodiment of the present invention.

FIG. 27 illustrates a process for manufacturing bump-shaped protrusions formed on a glass substrate in liquid crystal display devices of the thirteenth and fourteenth embodiment of the present invention.

FIG. 41($a$) is a schematic diagram illustrating homogenous alignment, and FIG. 41($b$) is a schematic diagram illustrating bend alignment.

BEST MODE FOR CARRYING OUT THE INVENTION

The present invention is based on results from observations made regarding a mechanism for a transition from splay alignment to bend alignment (explained below) in a liquid crystal display device provided with OCB cells of the bend alignment type. Thus, the specifics of the present invention will be explained in the embodiments after explaining this transition mechanism in detail.

Figure 1:
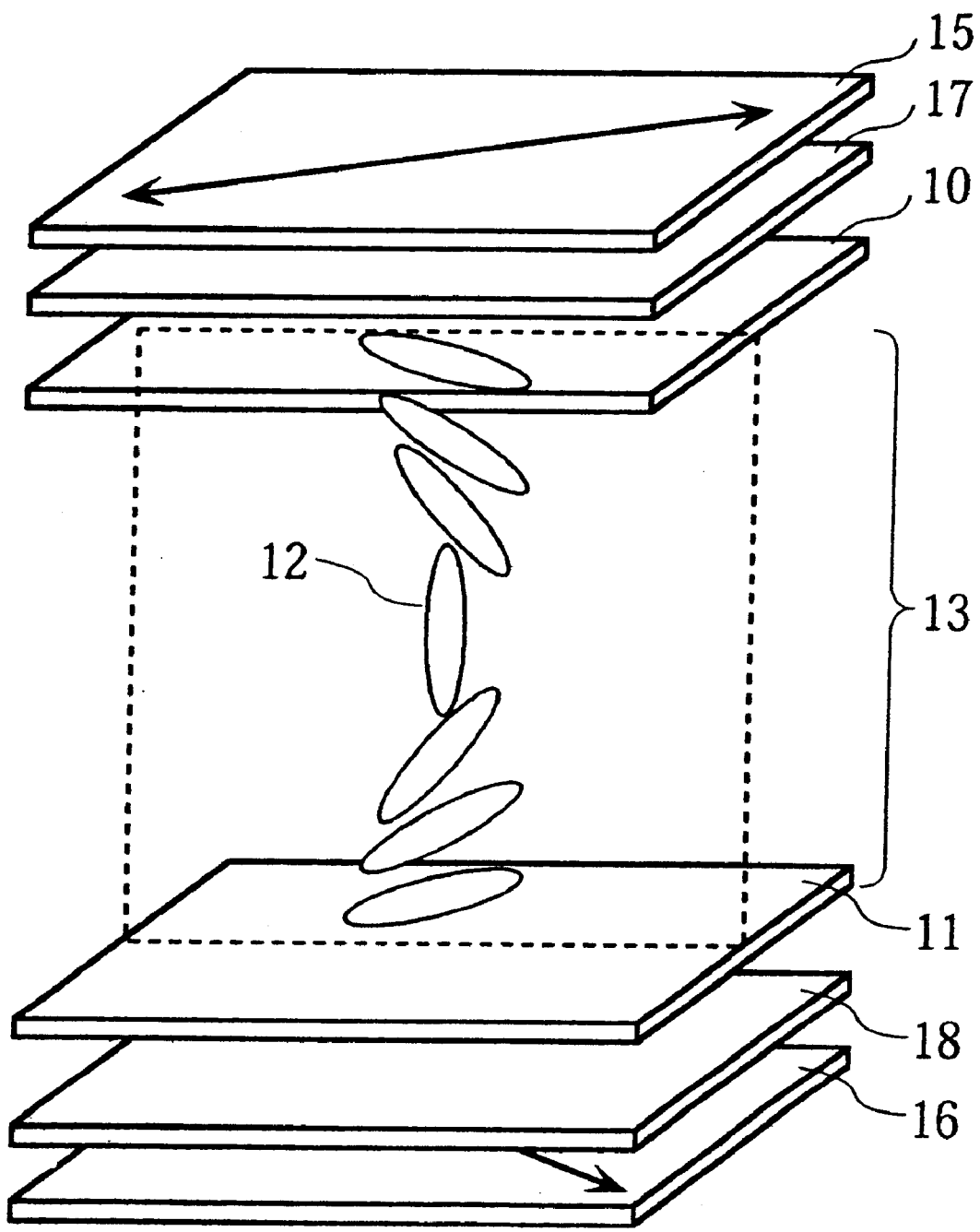
FIG. 1 is a perspective view showing a portion of a liquid crystal display device provided with a bend alignment OCB cell.

FIG. 1 is a perspective view showing a portion of a liquid crystal display device provided with OCB cells of the bend alignment type. FIG. 1 illustrates the configuration of this liquid crystal display device provided with OCB cells of the bend alignment type: A liquid crystal layer 13 including liquid crystal molecules 12 is disposed between substrates 10 and 11 arranged in parallel. Display electrodes (not shown in the drawings) for applying an electric field to the liquid crystal layer 13 and alignment films (not shown in the drawings) governing the alignment of the liquid crystal molecules are formed on opposing surfaces of the substrates 10 and 11. The alignment films pretilt the liquid crystal molecules 12 at the boundary to the substrate for ca. 5 to 7° as shown in FIG. 1, and are subjected to an alignment process leading to the same alignment orientation within the substrate plane, that is, providing parallel orientation. Further away from the surfaces of the substrates 10 and 11, the liquid crystal molecules 12 gradually rise upright, leading to a bend alignment, in which the tilt angle of the liquid crystal molecules is 90° at approximately the center in thickness direction of the liquid crystal layer 13. Polarizers 15 and 16, and optical compensators 17 and 18 are arranged on the outer sides of the substrates 10 and 11. The polarization axes of the two polarizers 15 and 16 are arranged at right angles or in parallel, such that their polarization axes and the alignment orientation of the liquid crystal molecules cross at an angle of 45°. Then, using the difference in the refractive index anisotropy in the liquid crystal layer between the ON state in which a high voltage is applied and the OFF state, in which a low voltage is applied, display is carried out while changing the polarization with the polarizers and the optical compensators, and controlling the transmissivity.

In this liquid crystal display device provided with OCB cells of the bend alignment type, the liquid crystal layer has a splay alignment before use, so that before operating the liquid crystal display, the liquid crystal layer has to be transitioned from splay alignment to bend alignment.

FIG. 2 schematically shows a mechanism for an alignment transition, in which the splay alignment of the liquid crystal layer is transitioned to a bend alignment by applying a voltage that is larger than the critical transition voltage.

FIG. 2 shows cross-sectional views of liquid crystal cells, schematically illustrating the liquid crystal molecules and diagrammatically showing the arrangement of the liquid crystal molecules when the two substrates are aligned in parallel.

FIG. 2($a$) shows the initial splay arrangement. When there is no electric field between the substrates, the liquid crystal molecules 12 take on a splay alignment with low energy, in which the major axes of the liquid crystal molecules 12 in the center of the liquid crystal layer 13 are approximately parallel to the substrate planes. Here, the liquid crystal molecules that are parallel to the substrate are marked by the reference numeral 12$a$ for illustrative reasons.

FIG. 2($b$) shows the arrangement of the liquid crystal molecules when starting to apply a high voltage to the electrodes (not shown in the drawings) formed on the substrates 10 and 11. The electric field starts to tilt slightly the liquid crystal molecules 12 in the center of the liquid crystal layer 13, and as a result, the liquid crystal molecules 12$a$ that are parallel to the substrate planes shift toward one of the substrates (in FIG. 2, toward the substrate 11).

FIG. 2($c$) shows the arrangement of the liquid crystal molecules after more time has passed after applying the voltage. The liquid crystal molecules 12 at the center of the liquid crystal layer 13 tilt further with respect to the substrate planes, and the liquid crystal molecules 12$a$ that are approximately parallel to the substrate planes are now closer to the substrate boundary, where they are subjected to the strong regulative force of the alignment film.

Figure 2A:
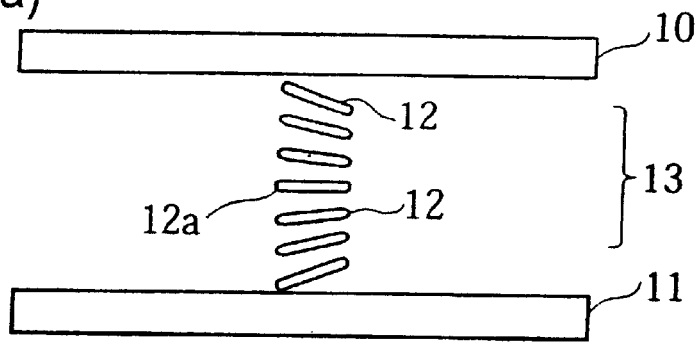
FIG. 2 is a cross-sectional view of a liquid crystal cell, illustrating the transition from splay alignment to bend alignment.
Figure 2B:
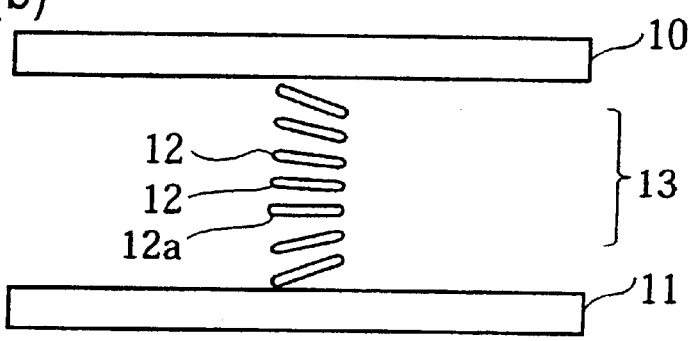
Figure 2C:
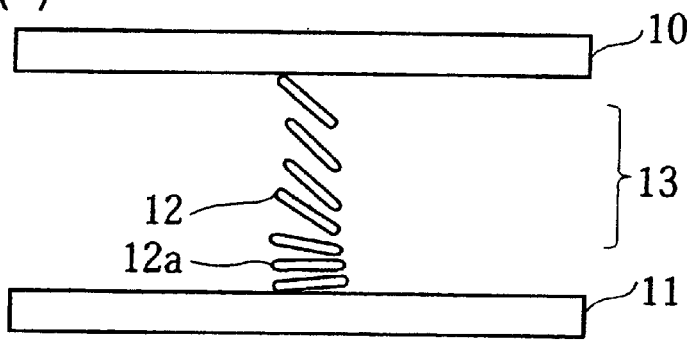

FIG. 2($d$) shows the arrangement when the liquid crystal molecules have transitioned to bend alignment, with an even higher energy state The liquid crystal molecules 12 at the center of the liquid crystal layer 13 are now perpendicular with respect to the substrate planes, and the liquid crystal molecules contacting the boundary of the alignment film (not shown in the drawings) on the substrate 10 are subjected to the strong regulative force of the alignment film, so that they retain their oblique orientation, and there are almost no more liquid crystal molecules 12a arranged in parallel to the substrate planes, as there were in FIGS. 2(a) to (c).

Figure 2D:
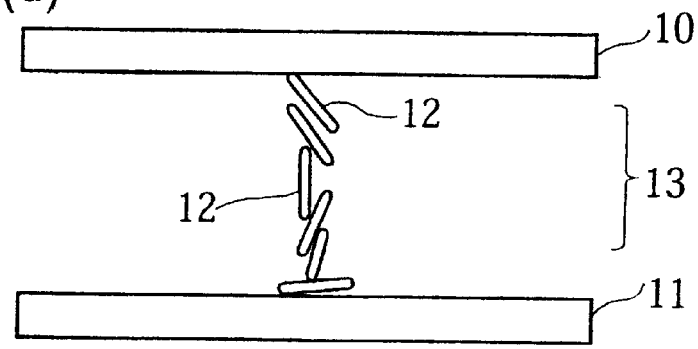

When even more time as passed from FIG. 2(d), the alignment between the substrates shifts to the bend alignment shown in FIG. 1, ending the transition.

It is believed that these are the circumstances under which the transition from splay alignment to bend alignment takes place when applying a voltage.

However, usually when the transition occurs, it does not occur at once in the entire liquid crystal layer between the substrates, but transition seeds occur around spacers distributed throughout the gap or at alignment irregularities (that is, at portions of the alignment region, at which energy transitions are easier), from which the bend alignment region spreads. Consequently, in order to achieve an alignment transition in the OCB cells, it is necessary to create transition seeds in at least some of the regions of the liquid crystal layer between the substrates, and, applying energy from the outside, to make a shift from splay alignment to the bend alignment with higher energy, and to maintain this bend alignment.

Examining this mechanism of alignment transition, the inventors conceived of a liquid crystal display device in which transition seeds appear reliably and in which transitions can be accomplished in very short time, as well as a method for manufacturing such a liquid crystal display device and a method for driving a liquid crystal display device. The specifics of the invention are explained under reference to the embodiments.

First Embodiment

Figure 3:
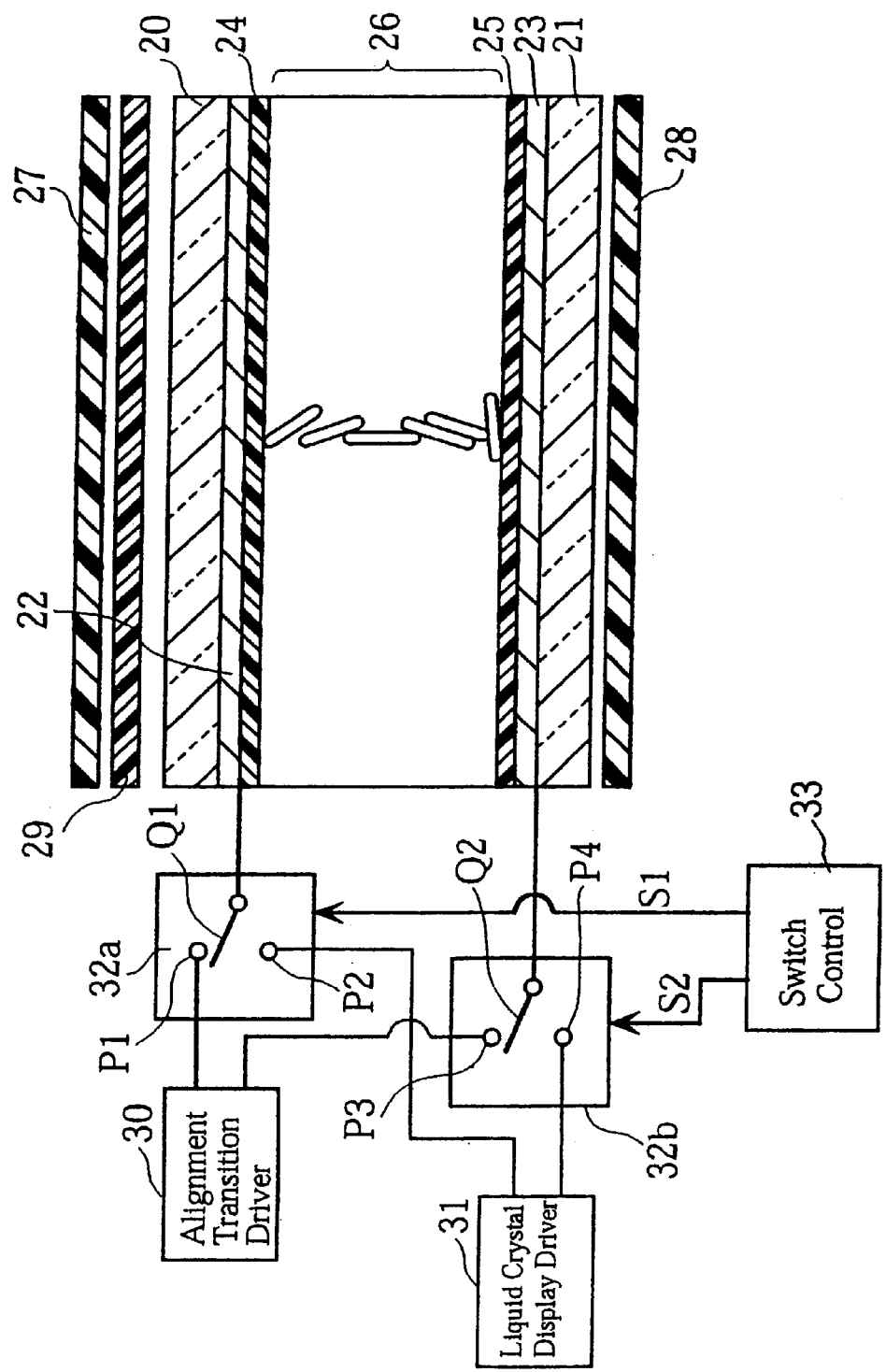
FIG. 3 is a diagram illustrating the configuration of one pixel unit for the method of driving a liquid crystal display device in accordance with a first embodiment of the present invention.

FIG. 3 is a diagram illustrating the configuration for one pixel unit in the method of driving a liquid crystal display device in accordance with a first embodiment of the present invention. First, the configuration of a liquid crystal display device associated with the driving method of the first embodiment is explained with reference to FIG. 3. Except for the configuration of the driving circuit, the liquid crystal display device of the first embodiment has the same configuration as a liquid crystal display device provided with regular OCB cells. That is to say, it has a pair of glass substrates 20 and 21, and a liquid crystal layer 26 disposed between the glass substrates 20 and 21. The glass substrates 20 and 21 are arranged in opposition with a predetermined spacing between them. A common electrode 22 made of transparent ITO is formed on the inner side of the glass substrate 20 and a pixel electrode 23 made of transparent ITO is formed on the inner side of the glass substrate 21. Alignment films 24 and 25 made of polyimide are formed on the common electrode 22 and the pixel electrode 23, and these alignment films 24 and 25 are subjected to an alignment process, for arranging their alignment directions in parallel. Then, a p-type nematic liquid crystal 26 is disposed between the alignment films 24 and 25. The pretilt angle of the liquid crystal molecules on the alignment films 24 and 25 is set to about 5°, and the critical voltage for transition from splay alignment to bend alignment is set to 2.5V. The retardation of the optical compensator 29 is selected such that the display is either white or black during the ON state. The numerals 27 and 28 in FIG. 1 denote polarizers.

In FIG. 3, numeral 30 denotes an alignment transition driving circuit and numeral 31 denotes a liquid crystal display driving circuit. Numerals 32a and 32b denote switching circuits, and numeral 33 denotes a switching control circuit for controlling the switching of the switching circuits 32a and 32b. The switching circuit 32a includes two individual contact points P1, P2, and a common contact point Q1, and the switching circuit 32b includes two individual contact points P3, P4, and a common contact point Q2. The common contact point Q1 is connected to either the individual contact point P1 or to P2 depending on the switching signal S1 from the switching control circuit 33. Similarly, the common contact point Q2 is connected to either the individual contact point P3 or to P4 depending on the switching signal S2 from the switching control circuit 33. When the common contact point Q1 is connected to the individual contact point P1, and the common contact point Q2 is connected to the individual contact point P3, then the driving voltage from the alignment transition driving circuit 30 is applied to the electrodes 22 and 23. When the common contact point Q1 is connected to the individual contact point P2, and the common contact point Q2 is connected to the individual contact point P4, then the driving voltage from the liquid crystal display driving circuit 33 is applied to the electrodes 22 and 23.

The following is an explanation of a driving method in accordance with the first embodiment.

Figure 4:
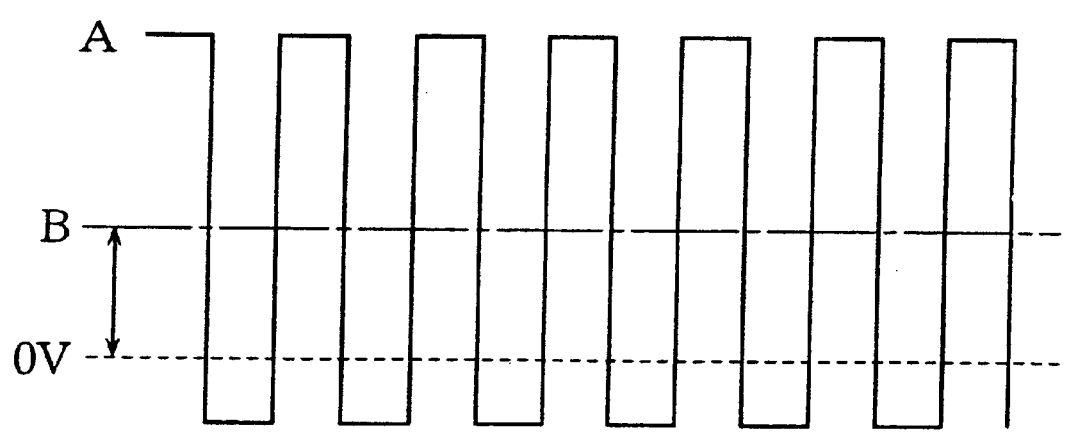
FIG. 4 illustrates the voltage pattern for alignment transition used in the first embodiment of the present invention.

Before liquid crystal display driving with a regular image signal, an initialization process is carried out for transition into bend alignment. First, when turning on the power, the switching control circuit 33 outputs the switching signals S1 and S2 to the switching circuits 32a and 32b, the common contact point Q1 is connected to the individual contact point P1, and the common contact point Q2 is connected to the individual contact point P3. Thus, the alignment transition driving circuit 30 applies the driving voltage shown in FIG. 4 to the electrodes 22 and 23. This driving voltage is an ac voltage, in which an ac square voltage A is superimposed with a bias voltage B, as shown in FIG. 4, and the driving voltage is set to a value that is larger than the critical voltage, which is the minimum voltage necessary for transition from the splay alignment to the bend alignment. Applying this driving voltage, it becomes possible to make the transition time much shorter than in the conventional examples that simply apply an ac voltage. The reasons why the transition time is shortened are explained below. Thus, the initialization process for transition into the bend alignment is terminated.

Then, after the transition time for completing the transition over the entire electrode has passed, the switching control circuit 33 outputs to the switching circuit 32a a switching signal S1 that switches the connection of the common contact point Q1 to the individual contact point P2, and to the switching circuit 32b a switching signal S2 that switches the connection of the common contact point Q2 to the individual contact point P4. Thus, the common contact point Q1 is connected with the individual contact point P2, and the common contact point Q2 is connected with the individual contact point P4, and applying a driving signal voltage with the liquid crystal display driving circuit 31 to the electrodes 22 and 23, the desired image is displayed. Here, the liquid crystal display driving circuit 31 applies a 30 Hz square voltage of 2.7V sustaining the bend alignment in the OFF state, and a 30 Hz square voltage of 7V in the ON state, thus achieving display on the OCB panel.

Then, the inventors produced a liquid crystal display device with this configuration and experimentally performed the initialization process with this driving method; the results are listed below. The experimental conditions were as follows:

The electrode area was set to 2 cm$^2$, the cell gap to ca. 6 μm, the frequency of the ac square voltage A to 30 Hz and its amplitude to ±4V.

Figure 5:
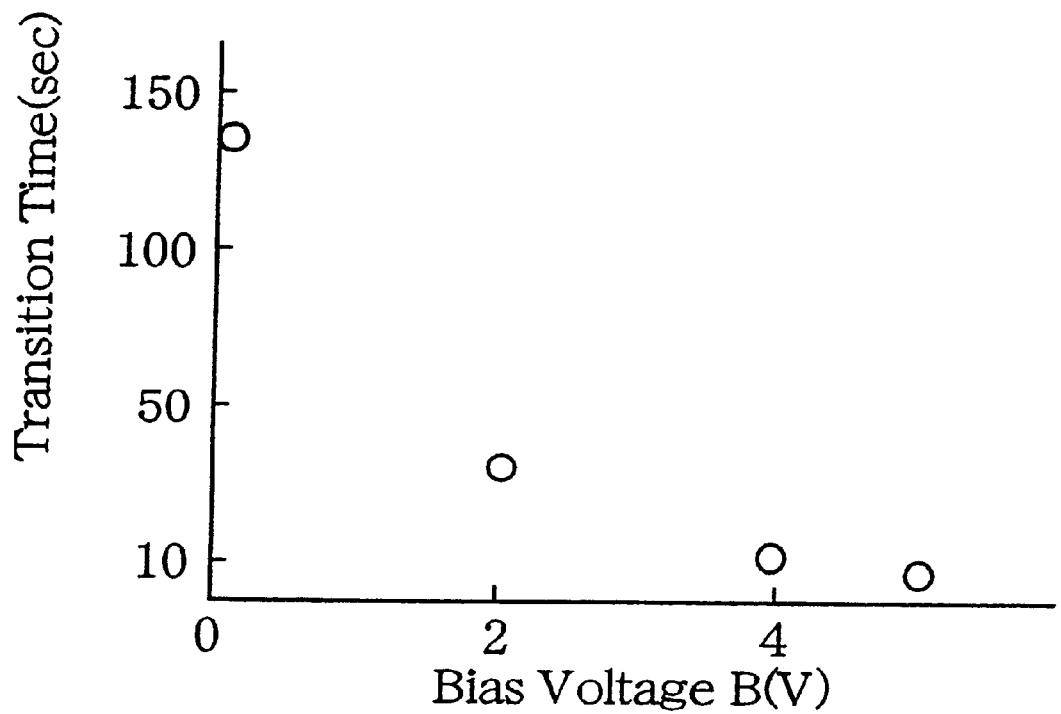
FIG. 5 is a graph showing the transition time as a function of the bias voltage in the first embodiment of the present invention.

Under these conditions, the transition times were measured for the four different bias voltages B of 0V, 2V, 4V and 5V; the results are shown in FIG. 5. Here, "transition time" means the time needed to complete the transition of the alignment for the entire region of the electrode area.

As becomes clear from FIG. 5, when the bias voltage B is 0V, a transition time of 140s is needed. On the other hand, when the bias voltage B is 4V, the transition time can be shortened to only 8s. It seems that due to the superimposition of the bias voltage, the alignment of the liquid crystal molecules in the liquid crystal layer is disturbed by the bias voltage, so that deviations occur between the substrates as shown in FIG. 2(d), leading to many transition seeds, and that the increase of the effective voltage speeds up the transition time.

Thus, by continuously applying an ac voltage superimposed with a bias voltage, the transition time can be made shorter than when simply applying an ac voltage.

In this experimental example, the ac square voltage signal had a frequency of 30 Hz and an amplitude of ±4V, but the present invention is not limited to this, and any frequency with which the liquid crystal can be operated is suitable, such as even 10 kHz, and the transition time can of course be shortened by increasing the amplitude of the ac voltage A. The transition time is shorter, the higher the superimposed bias voltage B is. However, striving for lower voltages as driving voltages, it is preferable that the bias voltage is set to a suitable voltage level depending on the desired transition time. Furthermore, a square wave was used as the waveform, but it is also possible to use an ac waveform with a different duty ratio.

Second Embodiment

Figure 6:
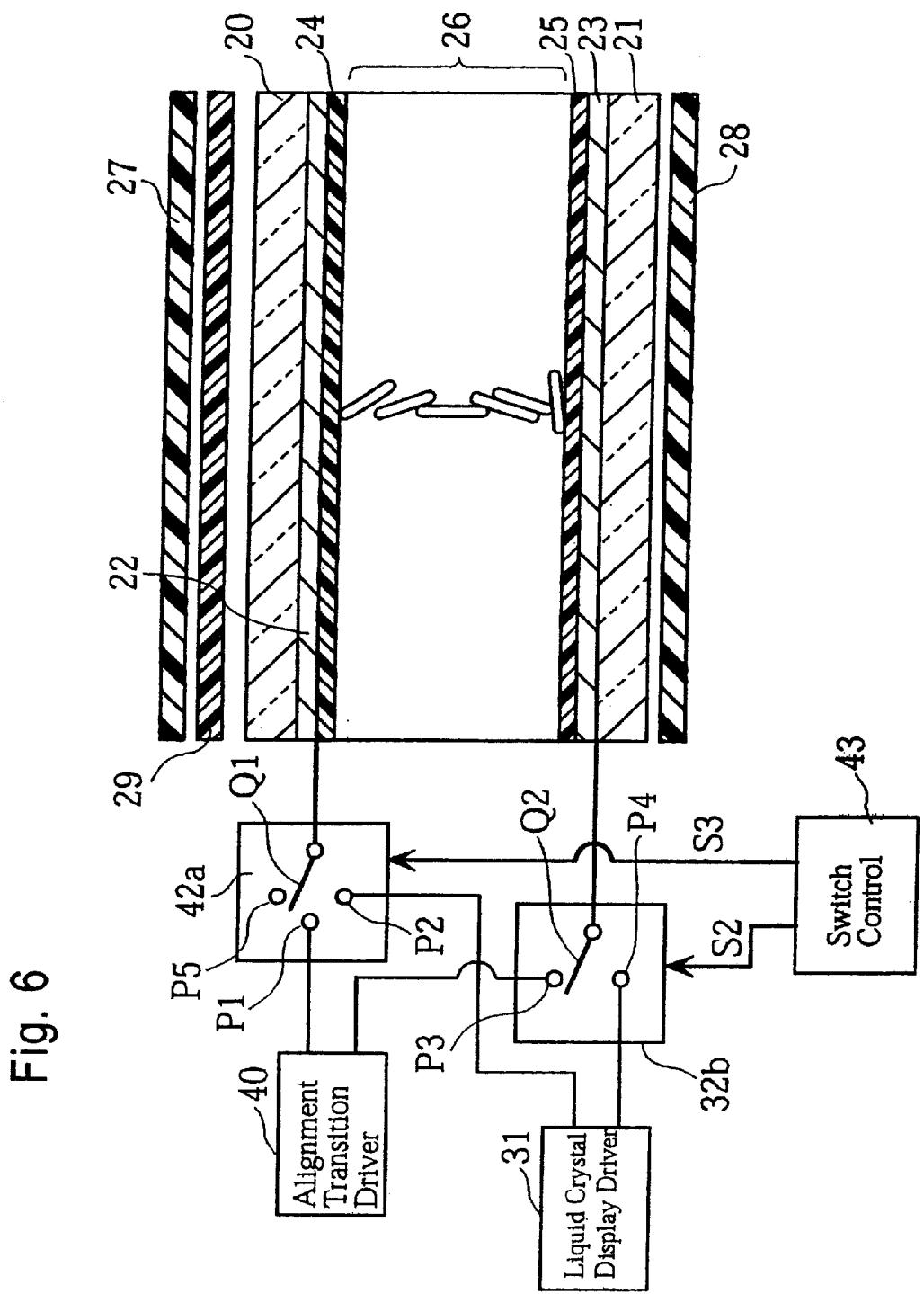
FIG. 6 is a diagram illustrating the configuration of one pixel unit for the method of driving a liquid crystal display device in accordance with a second embodiment of the present invention.

FIG. 6 is a diagram of the configuration of a liquid crystal display device in accordance with the second embodiment of the present invention for one pixel unit. The second embodiment is characterized in that transitions of the liquid crystal layer from the splay alignment to the bend alignment are caused by repeating, in alternation, a step of applying an ac voltage superimposed with a bias voltage between the substrates, and a step of putting the substrates into an electrically released state (open state).

Figure 7:
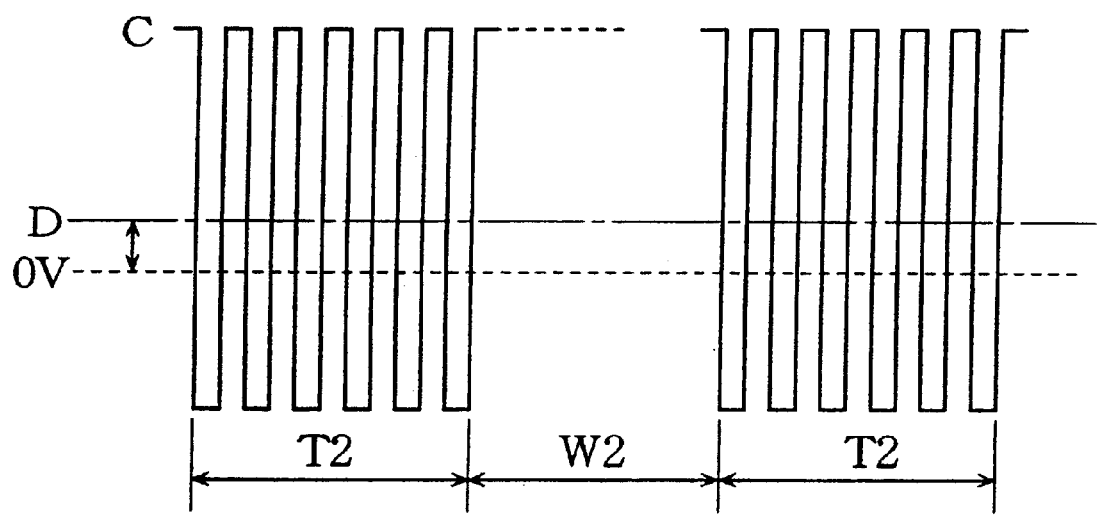
FIG. 7 illustrates the voltage pattern for alignment transition used in the second embodiment of the present invention.

Structural elements of the liquid crystal display device in accordance with the second embodiment that correspond to those in the liquid crystal display device of the first embodiment have been denoted by the same reference numerals and their further explanation has been omitted. Instead of the alignment transition driving circuit 30, the switching circuit 32a and the switching control circuit 32 of the first embodiment, the second embodiment includes an alignment transition driving circuit 40, a switching circuit 42a and a switching control circuit 43. The switching circuit 42a is a three-way switching circuit including an individual contact point P5 in addition to the individual contact points P1 and P2. The switching circuit 43 controls the switching of this switching circuit 42a. The alignment transition driving circuit 40 applies the driving voltage shown in FIG. 7 between the substrates 22 and 23. As shown in FIG. 7, this driving voltage is an ac voltage, in which an ac square voltage C is superimposed with a bias voltage D, and whose amplitude is set to a voltage that is larger than a critical voltage, which is the minimum voltage necessary for transition from the splay alignment to the bend alignment.

The common contact point Q1 of the switching circuit 42a is connected to one of the individual contact points P1, P2 or P5, depending on the switching signal S3 from the switching control circuit 42. Connecting the common contact point Q1 to the individual contact point P5 leads to an open state, in which the electrodes 22 and 23 are disconnected from the alignment transition driving circuit 40. If the common contact point Q1 is connected to the individual contact point P1 and the common contact point Q2 is connected to the individual contact point P3, then the driving voltage from the alignment transition driving circuit 40 is applied to the electrodes 22 and 23. If the common contact point Q1 is connected to the individual contact point P2 and the common contact point Q2 is connected to the individual contact point P4, then the driving voltage from the liquid crystal display driving circuit 31 is applied to the electrodes 22 and 23.

The following is an explanation of a driving method in accordance with the second embodiment.

Before liquid crystal display driving with a regular image signal, an initialization process is carried out for transition signal, into bend alignment. First, when turning on the power, the switching control circuit 43 outputs a switching signal S3 to the switching circuit 42a and a switching signal S2 to the switching circuit 32b, the common contact point Q1 is connected to the individual contact point P1, and the common contact point Q2 is connected to the individual contact point P3. Thus, the alignment transition driving circuit 30 applies the driving voltage shown in FIG. 7 to the electrodes 22 and 23. Then, after a predetermined period of time T2 has passed, the switching control circuit 43 outputs a switching signal S3 to the switching circuit 42a, and the common contact point Q1 is connected to the individual contact point P5. This leads to an open state, in which the electrodes 22 and 23 are disconnected from the alignment transition driving circuit 40. This open state is maintained for a period W2, during which the charge between the electrodes 22 and 23 is held.

When the period W2 in the open state has passed, the switching control circuit 43 outputs a switching signal S3 to the switching circuit 42a, and the common contact point Q1 is again connected with the individual contact point P1. Then, this alignment transition driving and the open state are repeated in alternation, and after a certain period of time has passed after turning on power, the entire area of the electrode has transitioned into bend alignment.

Then, after this period of time has passed, the switching control circuit 43 outputs a switching signal S3 to the switching circuit 42a and a switching signal S2 to the switching circuit 32b, so that the common contact point Q1 is connected to the individual contact P2 and the common contact point Q2 is connected to the individual contact P43, so that the liquid crystal display driving circuit 31 applies a driving signal voltage to the electrodes 20 and 21, and the desired image is displayed. Here, as in the first embodiment, the liquid crystal display driving circuit 31 applies a 30 Hz square voltage of 2.7V sustaining the bend alignment in the OFF state, and a 30 Hz square voltage of 7V in the ON state, thus achieving display on the OCB panel.

Then, the inventors produced a liquid crystal display device with this configuration and experimentally performed the initialization process with this driving method; the results are listed below. The experimental conditions were as follows:

The electrode area was set to 2 cm$^2$, the cell gap to ca. 6 μm, the bias voltage B was set to 2V, the frequency of the ac square voltage D to 30 Hz and its amplitude to ±4V, and the application time T2 was set to 2s.

Under these conditions, the transition times were measured with 0s, 0.2s, 2s and 3s for the open state period W2, repeating the voltage application state and the open state in alternation. The results are shown in FIG.

8. Here, "transition time" means the time needed to complete the transition of the alignment for the entire region of the electrode area.

Figure 8:
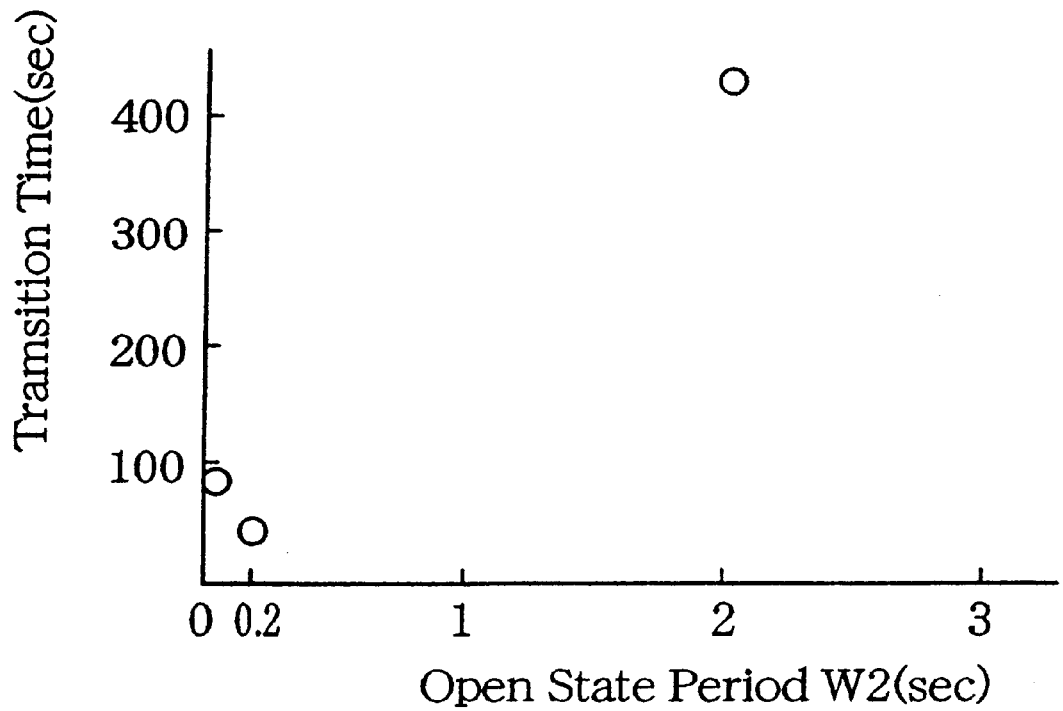
FIG. 8 is a graph showing the transition time as a function of the bias voltage in the second embodiment of the present invention.

As becomes clear from FIG. 8, when the open state period W2 was 0s, that is, when the ac voltage superimposed with the bias voltage was applied continuously, a transition time of 80s was needed. When, on the other hand, the open state period W2 was 0.2s, and alternated with the ac voltage with the superimposed bias voltage, then the transition time was shortened to 40s. However, when the open state period W2 was 2s, then the transition time became 420s long, and when W2 was 3s, then the transition could not be finished.

Furthermore, when the application time T2 was set to 0.3s and the open state period W2 to 0.3s, and the remaining conditions were as in the above example, a transition time of 28s was measured.

Favorable results were obtained when T2 was set to 2s, and W2 was at least 0.1s but not greater than 0.5s.

It seems that the shortening of the time for shifting from splay alignment to bend alignment by repeating the biased ac voltage and the open state in this manner is due to the following reasons: Applying an ac voltage with a superimposed bias, the liquid crystal molecule alignment of the liquid crystal layer is disturbed, and deviations occur between the substrates as shown in FIG. 2(d), and transition seeds are generated by switching then to a short open state, shortening the transition time.

This effect can also be attained when applying yet another voltage signal before or after the step of applying the ac voltage with the superimposed bias, and then going into the open state.

Also, the bias voltage and the ac voltage, the application time, and the time that the open state is maintained can be chosen as appropriate for the desired transition time. The frequency of the ac voltage should be a frequency at which the liquid crystal can be operated, such as even 10 kHz. A square wave was used as the waveform, but it is also possible to use an ac waveform with a different duty ratio.

Third Embodiment

Figure 9:
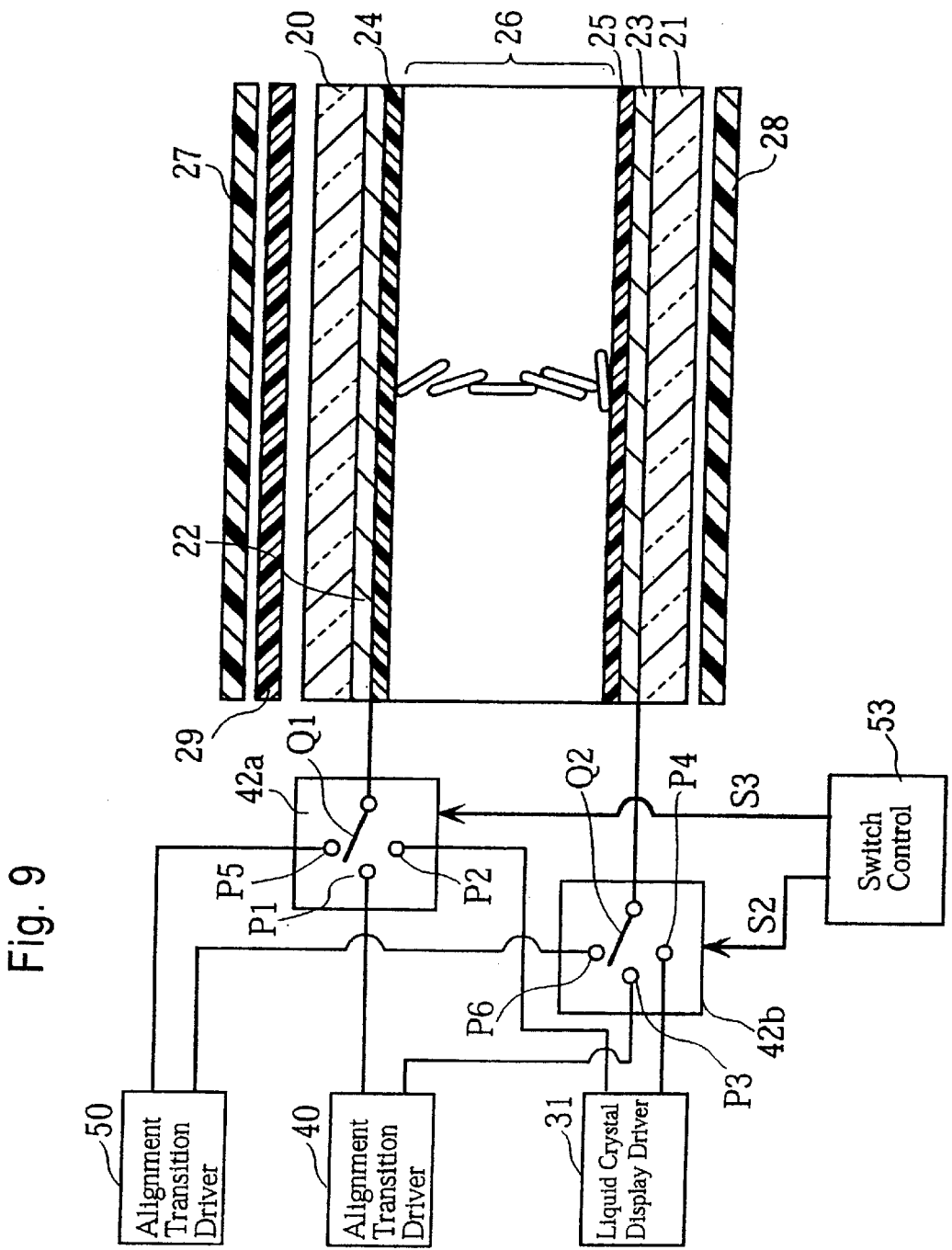
FIG. 9 is a diagram illustrating the configuration of one pixel unit for the method of driving a liquid crystal display device in accordance with a third embodiment of the present invention.

FIG. 9 is a diagram of the configuration of a liquid crystal display device in accordance with the third embodiment of the present invention for one pixel unit. The third embodiment is characterized in that transitions of the liquid crystal layer from the splay alignment to the bend alignment are caused by repeating, in alternation, a step of applying an ac voltage superimposed with a bias voltage to the substrates, and a step of applying no voltage or a low voltage to the substrates.

Structural elements of the liquid crystal display device in accordance with the third embodiment that correspond to those in the liquid crystal display device of the second embodiment have been denoted by the same reference numerals and their further explanation has been omitted. Instead of the switching circuit 32b and the switching control circuit 43 of the second embodiment, the third embodiment uses a switching circuit 42b and a switching control circuit 53. Also, in addition to the alignment transition driving circuit 40, the third embodiment is provided with an alignment transition driving circuit 50 for applying a low voltage to the electrodes 22 and 23.

The switching circuit 42b is a three-way switching circuit including an individual contact point P6 in addition to the individual contact points P3 and P4. The switching circuit 53 controls the switching of this switching circuit 42b. The switching signal S4 from the switching control circuit 53 connects the common contact point Q2 of the switching circuit 42b to the individual contact points P3, P4, and P6.

When the common contact point Q1 is connected to the individual contact point P5 and the common contact point Q2 is connected to the individual contact point P3, then the driving voltage from the alignment transition driving circuit 40 is applied to the electrodes 22 and 23. When the common contact point Q1 is connected to the individual contact point P5 and the common contact point Q2 is connected to the individual contact point P6, then the driving voltage from the alignment transition driving circuit 50 is applied to the electrodes 22 and 23. Furthermore, when the common contact point Q1 is connected to the individual contact point P2 and the common contact point Q2 is connected to the individual contact point P4, then the driving voltage from the liquid crystal display driving circuit 31 is applied to the electrodes 22 and 23.

The following is an explanation of a driving method in accordance with the third embodiment.

Figure 10:
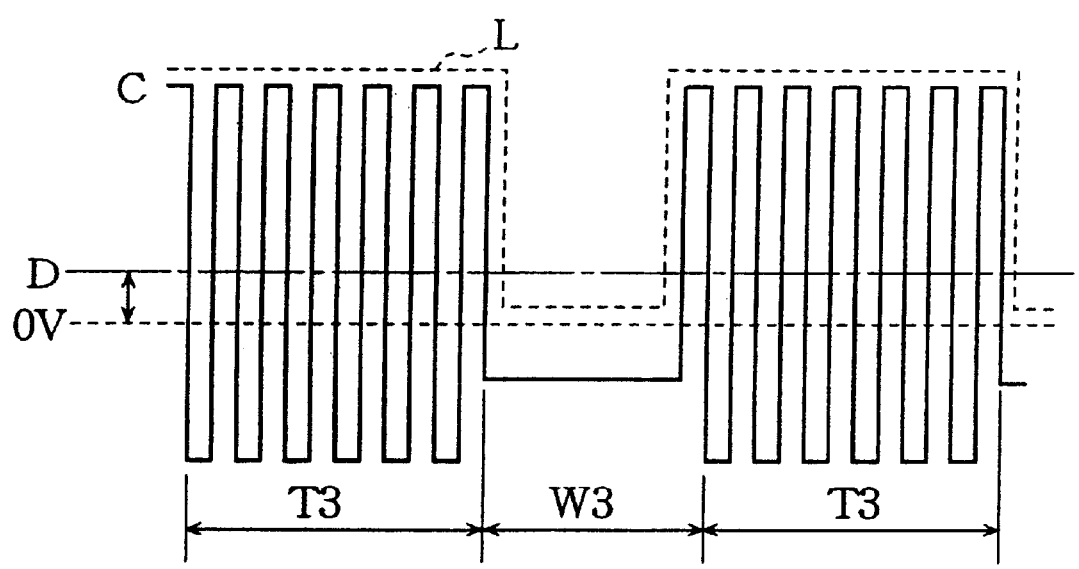
FIG. 10 illustrates the voltage pattern for alignment transition used in the third embodiment of the present invention.

Before liquid crystal display driving with a regular image signal, an initialization process is carried out for transition into bend alignment. First, when turning on the power, the switching control circuit 53 outputs a switching signal S3 to the switching circuit 42a and a switching signal S4 to the switching circuit 42b, the common contact point Q1 is connected to the individual contact point P1, and the common contact point Q2 is connected to the individual contact point P3. Thus, the alignment transition driving circuit 40 applies the driving voltage shown in FIG. 10 to the electrodes 22 and 23. Then, after a predetermined period of time T3 has passed, the switching control circuit 53 outputs a switching signal S3 to the switching circuit 42a and a switching signal S4 to the switching circuit 42b, so the common contact point Q1 is connected to the individual contact point P5, and the common contact point Q2 is connected to the individual contact point P6. Thus, the low voltage shown in FIG. 10 is applied by the alignment transition driving circuit 50 to the electrodes 22 and 23. This low voltage stays applied for a period W3.

When the low voltage application period W3 has passed, the switching control circuit 53 outputs a switching signal S3 to the switching circuit 42a and a switching signal S4 to the switching circuit 42b, so the common contact point Q1 is again connected with the individual contact point P1 and the common contact point Q2 is again connected with the individual contact point P3. Then, this ac voltage application step and the low-voltage application step are repeated in alternation, and after a certain period of time has passed after turning on power, the entire area of the electrode has passed into bend alignment.

Then, after this period of time has passed, the switching control circuit 53 outputs a switching signal S3 to the switching circuit 42a and a switching signal S4 to the switching circuit 42b, so that the common contact point Q1 is connected to the individual contact P2 and the common contact point Q2 is connected to the individual contact P43. Thus, the liquid crystal display driving circuit 31 applies a driving signal voltage to the electrodes 20 and 21, and the desired image is displayed. Here, as in the first embodiment, the liquid crystal display driving circuit 31 applies a 30 Hz square voltage of 2.7V sustaining the bend alignment in the OFF state, and a 30 Hz square voltage of 7V in the ON state, thus achieving display on the OCB panel.

Then, the inventors produced a liquid crystal display device with this configuration and experimentally performed the initialization process with this driving method; the results are listed below. The experimental conditions were as follows:

The electrode area was set to 2 cm$^2$, the cell gap to ca. 6 μm, the bias voltage D was set to 2V, the frequency of the ac square voltage C to 30 Hz and its amplitude to ±4V, and the application time T3 was set to 1s. Furthermore, the voltage applied during the low voltage application period W3 was set to a dc voltage of −2V.

Under these conditions, the transition times were measured for several low voltage application periods W3, repeating the voltage application state and the application voltage application state in alternation. The results are shown in FIG. 11.

Figure 11:
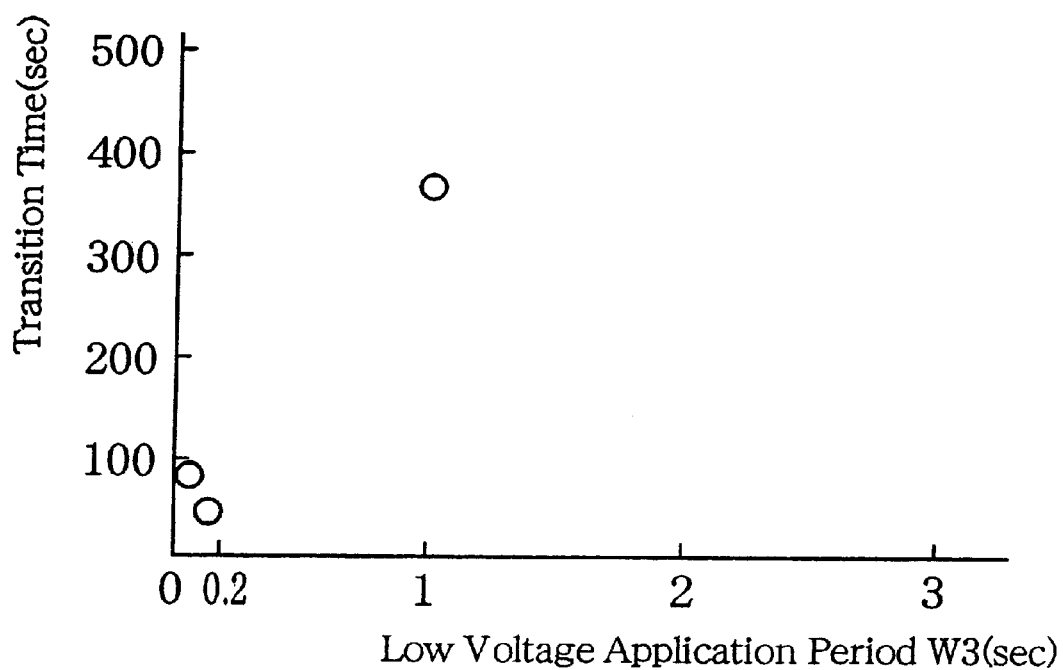
FIG. 11 is a graph showing the transition time as a function of the bias voltage in the third embodiment of the present invention.

As becomes clear from FIG. 11, when the low voltage application time is 0s, that is, when the ac voltage superimposed with the bias voltage was applied continuously, a transition time of ca. 80s was needed. When, on the other hand, the low voltage application period W3 was set to 0.1s and repeated in alternation with the ac voltage superimposed with the bias voltage, then the transition time was shortened to 60s. However, when the low voltage application period W3 was set to 1s, then the transition time became 360s long, and when W3 was set to 3s, then the transition could not be finished.

Furthermore, repeatedly switching between an ac voltage of ±4V superimposed with a bias voltage of 2V and a dc voltage of 0V, the transition was completed within 50s in the shortest case. Also, repeatedly switching between an ac voltage of ±4V superimposed with a bias voltage of 2V and an ac voltage of ±2V, the transition was completed within 50s in the shortest case.

Favorable results were obtained when T3 was set to 1s, and W2 was at least 0.1s but not greater than 0.5s.

The transition time for shifting from splay alignment to bend alignment when repeating application of the biased ac voltage and of the low voltage is shorter than when simply applying a continuous ac voltage superimposed with a bias voltage. It seems that this is, because applying an ac voltage with a bias superimposed on it, the liquid crystal molecule alignment in the liquid crystal layer is disturbed, and deviations occur between the substrates as shown in FIG. 2(d), and transition seeds are created by switching then to a short low voltage application state, shortening the transition time.

Also, the bias voltage and the ac voltage, and their application time, as well as the low voltage and its application time can be chosen as appropriate for the desired transition time. The frequency of the ac voltage should be a frequency at which the liquid crystal can be operated, such as 10 kHz. A square wave was used as the waveform, but it is also possible to use an ac waveform with a different duty ratio.

Moreover, in the low voltage application period W3, a low voltage of −2V was applied, but it is also possible to apply 0V.

The following is a discussion of the ratio between the ac voltage application period T3 and the low voltage application period W3, and the number of times the ac voltage application and the low voltage application are repeated per second. The voltage during the low voltage application period W3 is 0V, and the ac voltage application is repeated in alternation with this application of 0V, which, for illustrative reasons, is regarded as one transition voltage as indicated by the broken line L in FIG. 10. In that case, to shorten the transition time, the frequency of the transition voltage L should be set within a region of 0.1 Hz to 100 Hz and the duty ratio of the transition voltage L should be set within a region of 1:1 to 1000:1. It is preferable that the frequency of the transition voltage L is within a range of 0.1 Hz to 10 Hz, and that the duty ratio of the transition voltage L is set within a region of 2:1 to 1000:1. The following explains the reasons for this.

When the duty ratio of the repeatedly applied voltage is in the range of 1:1 to 1:10, transition seeds may appear during the pulses in which voltage is applied, but between the pulses, when no voltage is applied, the transition returns to splay alignment within a certain relaxation time, and the transition never completes. In order to enlarge the transition region, the duty ratio should be set to a range of 1:1 to 1000:1, preferably 2:1 to 100:1, so that the pulse width is broader than the interval between pulses. It seems that above 1000:1 toward continuous dc, as there is almost no pulse repetition left, there are fewer opportunities for transition seeds to form, and the transition takes somewhat longer.

Also, for the repetition frequency of the transition voltage application, a frequency between continuous application and about 100 Hz is suitable, but preferable is a frequency from 10 Hz, at which a pulse width of at least about 100 ms can be attained for transition enlargement, to 0.1 Hz, at which a pulse interval of at least about 10 ms is attained at a duty ratio of 1000:1.

The inventors measured the transition time applying an alternation a voltage of −15V dc and 0V to the liquid crystal cell and changing the repetition frequency and the duty ratio. The results are shown in Table 1.

TABLE 1

| duty | frequency | | | |
| --- | --- | --- | --- | --- |
| | 0.1 Hz | 1 Hz | 10 Hz | 100 Hz |
| 1:1 | 300 | 180 | 150 | 220 |
| 2:1 | 40 | 30 | 25 | 35 |
| 10:1 | 15 | 10 | 8 | 15 |
| 100:1 | 10 | 10 | 12 | 18 |
| 1000:1 | 10 | 12 | 15 | 18 |
| dc | 20 | | | |

(unit: sec)

As can be seen from Table 1, when the frequency is in the range of 0.1 Hz to 10 Hz and the duty ratio is in the range of 2:1 to 1000:1, the transition time is very short, and also when the frequency is in the range of 0.1 Hz to 100 Hz and the duty ratio is in the range of 1:1 to 1000:1, the transition time is still sufficiently short.

Fourth Embodiment

Figure 12:
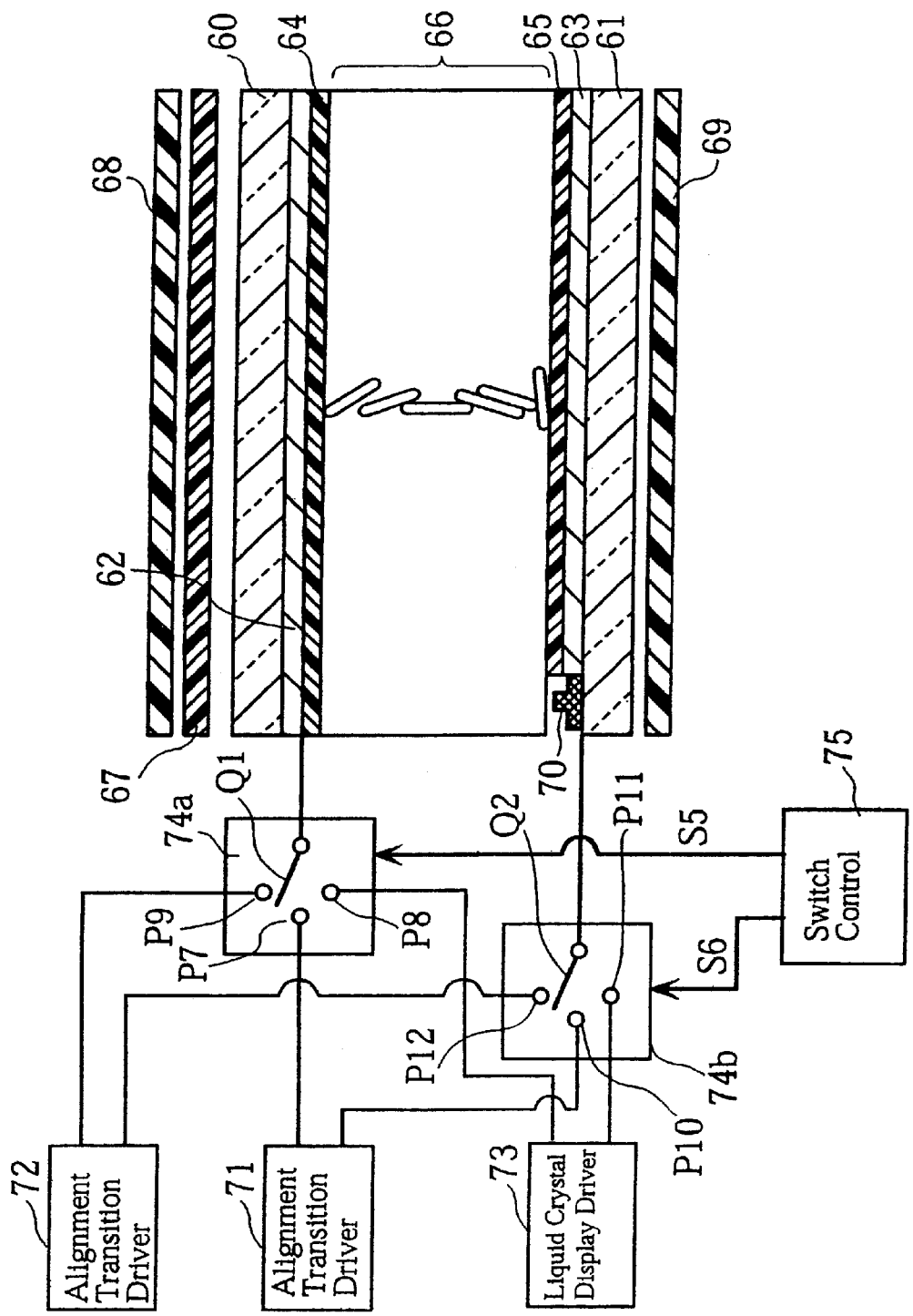
FIG. 12 is a diagram illustrating the configuration of one pixel unit for the method of driving a liquid crystal display device in accordance with the third embodiment of the present invention.

FIG. 12 is a diagram of the configuration of a liquid crystal display device in accordance with the fourth embodiment of the present invention for one pixel unit. The fourth embodiment illustrates an example, in which the present invention is applied to a method for driving an active matrix liquid crystal display device.

First, the configuration of a liquid crystal display device associated with the driving method of the fourth embodiment is explained with reference to FIG. 12. Except for the configuration of the driving circuit, the liquid crystal display device in accordance with the fourth embodiment has the same configuration as an active matrix liquid crystal display device with regular OCB cells. That is to say, it has a pair of glass substrates 60 and 61, and a liquid crystal layer 66 interposed between the glass substrates 60 and 61. The glass substrates 60 and 61 are arranged in opposition to one another at a certain spacing. A common electrode 62 made of transparent ITO is formed on the inner side of the glass substrate 60, a thin film transistor (TFT) 70 serving as a pixel switching element and a pixel electrode 63 made of transparent ITO and connected to the TFT 70 are formed on the inner side of the glass substrate 61. Alignment films 64 and 65 of polyimide are formed on the common electrode 62 and the pixel electrode 63, and these alignment films 64 and 65 are subjected to an alignment process so as to arrange their alignment directions in parallel. Then, a p-type nematic liquid crystal layer 66 is disposed between the alignment films 64 and 65. The pretilt angle of the liquid crystal molecules on the alignment films 64 and 65 is set to about 5°, and the critical voltage for transition from splay alignment to bend alignment is set to 2.6V. The retardation of the optical compensator 67 is selected such that the display is either white or black during the ON state. The numerals 67 and 68 in FIG. 12 denote polarizers.

Figure 13:
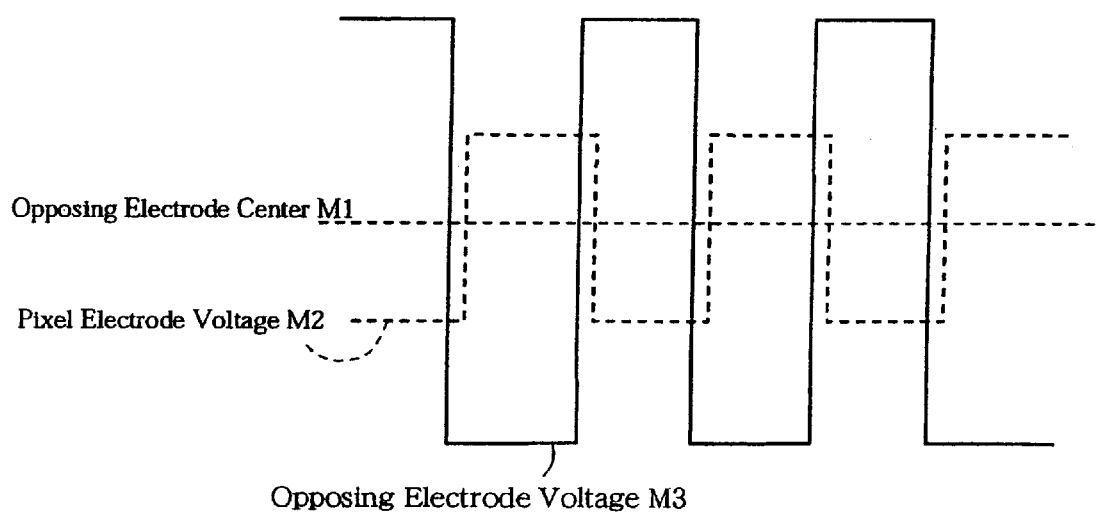
FIG. 13 illustrates the regular driving voltage pattern of the liquid crystal display device in a fourth embodiment of the present invention.

In FIG. 12, numerals 71 and 72 denote alignment transition driving circuits. The function of the alignment transition driving circuit 71 is to apply a driving voltage to the common electrode 62, taking the potential of the common electrode in FIG. 14 as a center reference, and to apply 0V to the pixel electrode 63. The function of the other alignment transition driving circuit 72 is to apply 0V to the common electrode 62 and the pixel electrode 63. Numeral 73 denotes a liquid crystal display driving circuit. The function of the liquid crystal display driving circuit 73 is to apply a driving voltage with the voltage pattern shown in FIG. 13 to the common electrode 62 and the pixel electrode 63. That is to say, the liquid crystal display driving circuit 73 applies the voltage marked M1 in FIG. 13 to the pixel electrode 63, and the voltage marked M2 in FIG. 13 to the common electrode 62. This means that in this configuration, during the alignment transition period, 0V is applied to the pixel electrode 63, but it is also possible to apply a pixel electrode voltage with the liquid crystal display driving circuit 73 during the alignment transition period.

Numerals 74a and 74b denote switching circuits, and numeral 75 denotes a switching control circuit for controlling the switching of the switching circuits 74a and 74b. The switching circuit 74a includes three individual contact points P7, P8, P9, and a common contact point Q1, and the switching circuit 74b includes three individual contact points P10, P11, P12, and a common contact point Q2. When the common contact point Q1 is connected to the individual contact point P7, and the common contact point Q2 is connected to the individual contact point P10, then the driving voltage from the alignment transition driving circuit 71 is applied to the electrodes 62 and 63. When the common contact point Q1 is connected to the individual contact point P2, and the common contact point Q2 is connected to the individual contact point P4, then the driving voltage from the liquid crystal display driving circuit 73 is applied to the electrodes 62 and 63.

The following is an explanation of a driving method in accordance with the fourth embodiment.

Before liquid crystal display driving with a regular image signal, an initialization process is carried out for transition into bend alignment. First, when turning on the power, the switching control circuit 75 outputs a switching signal to the switching circuit 74a and a switching signal to the switching circuit 74b, the common contact point Q1 is connected to the individual contact point P7, and the common contact point Q2 is connected to the individual contact point P10. Thus, the alignment transition driving circuit 71 applies the driving voltage shown in FIG. 14 to the common electrode 62. This means, an ac voltage synchronized with the vertical synchronization signal, to which a bias voltage -GV is superimposed, is applied to the common electrode 62, taking the potential of the common electrode as a center reference. 0V is applied to the pixel electrode. Then, this ac voltage is maintained for the period T4.

Figure 14:
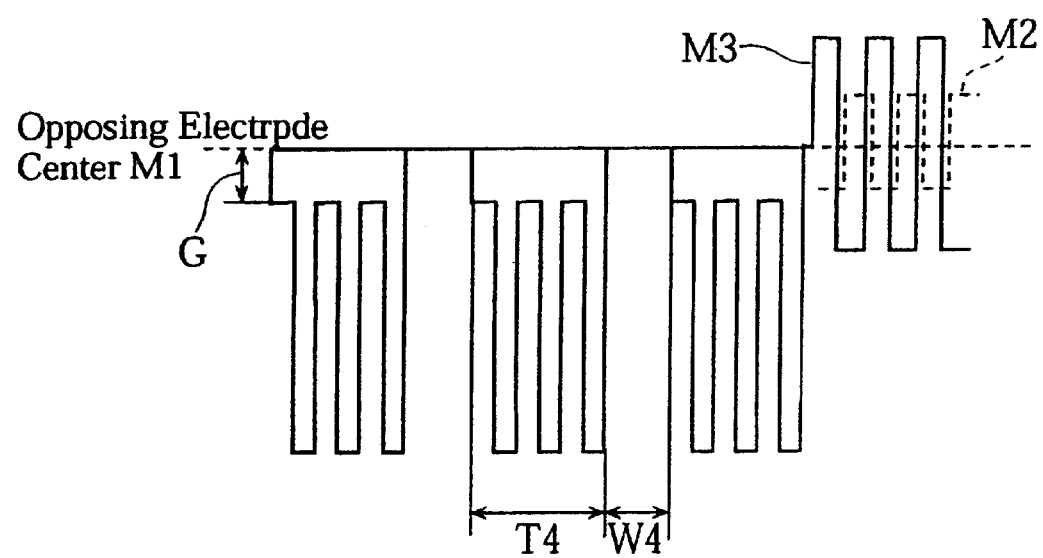
FIG. 14 illustrates the voltage pattern for alignment transition used in the fourth embodiment of the present invention.

Then, after this ac voltage application period T4 has passed, the switching control circuit 75 outputs a switching signal to the switching circuit 74a and a switching signal to the switching circuit 74b, such that the common contact point Q1 is connected to the individual contact point P9, and the common contact point Q2 is connected to the individual contact point P12. Thus, the alignment transition driving circuit 72 applies 0V to the common electrode 62 and the pixel electrode 63, as shown in FIG. 14. This 0V voltage stays applied for a period W4.

When the 0V voltage application period W4 has passed, the switching control circuit 75 outputs a switching signal to the switching circuit 742a and a switching signal to the switching circuit 74b, so the common contact point Q1 is again connected with the individual contact point P7 and the common contact point Q2 is again connected with the individual contact point P10. Then, this ac voltage application step and the 0V voltage application step are repeated in alternation, and after a certain period of time has passed after turning on power, the entire area of the electrode has passed into bend alignment.

Then, after this certain period of time has passed, the switching control circuit 75 outputs a switching signal to the switching circuit 74a and a switching signal to the switching circuit 74b, so that the common contact point Q1 is connected to the individual contact P8 and the common contact point Q2 is connected to the individual contact P11. Thus, the liquid crystal display driving circuit 73 applies a driving signal voltage to the electrodes 62 and 63, and the desired image is displayed. Here, the liquid crystal display driving circuit 73 applies a driving voltage of at least 2.7V sustaining the bend alignment in the OFF state, and a voltage of 7V as an upper limit in the ON state, thus achieving display on the OCB panel.

With this driving method, a high-quality bend alignment display device with a broad viewing angle and very fast response was attained, without any alignment defects in the OCB active matrix liquid crystal display device.

Then, the inventors produced a liquid crystal display device with this configuration and experimentally performed the initialization process with this driving method; the results are listed below. The experimental conditions were as follows:

The cell gap was set to ca. 6 $\mu$m, the bias voltage G was set to -6V, the frequency of the ac square voltage D to 7.92 Hz and its amplitude to ±10V, and the application time T3 was set to 0.5s. Moreover, the 0V voltage application period W4 was set to 0.5s.

According to the experimental results, the alignment transition in all the pixels in the panel of the liquid crystal display device was finished within approximately 2s.

When no bias voltage was superimposed, then about 20s were necessary for the transition of the alignment of the entire display. Thus, it can be appreciated that also in the fourth embodiment, the driving with a superimposed bias voltage accomplishes a shortening of the transition time.

Fifth Embodiment

Figure 15:
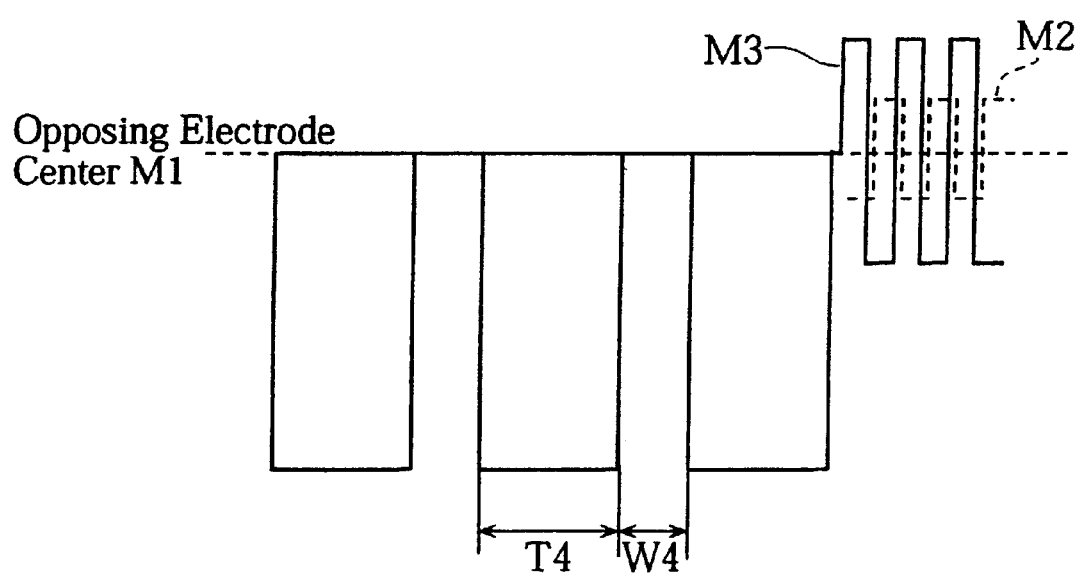
FIG. 15 illustrates the voltage pattern for alignment transition used in a fifth embodiment of the present invention.

Instead of the driving voltage pattern shown in FIG. 14, it is also possible to use the driving voltage pattern in FIG. 15 for driving the alignment transition of an OCB-mode active matrix liquid crystal display device. That is to say, during the ac voltage application period T4, a dc voltage of -15V is applied for 0.5s to the common electrode 62, taking the potential of the common electrode as a center reference. After that, during the 0V voltage application period W4, 0V is applied for 0.2s. Then, the application of -15V dc and the application of 0V are repeated in alternation. Also with this driving method, the transition is carried out reliably and in a very short time.

Carrying out experiments with this driving method, the inventors found that a transition time of less than 2s can be attained.

Sixth Embodiment

Instead of the active matrix liquid crystal display device used in the fourth and fifth embodiments, the sixth embodiment applies the driving method of the fourth and fifth embodiments to a liquid crystal display device with a flattened film configuration, in which a flattening film is arranged on the switching element, and the pixel electrode is formed on the flattening film. To give a specific example of this driving method, the alignment transition voltage superimposed with the bias voltage in the fourth embodiment was applied for 0.5s, and then the open state was held for 0.5s, which was repeated in alternation. With this driving method, the transition went even smoother, with a transition time of less than 1s. It seems that this is, because with the flattening film configuration, the pixel electrode interval becomes smaller, so that a smoother transition from the splay alignment to the bend alignment is possible.

Other Considerations

① In the above embodiments, an ac voltage superimposed with a bias voltage is applied, but it is also possible to apply a dc voltage, in which case the driving circuit can be simplified, because only voltages of one polarity are applied. ② In the above embodiments, in the ac voltage signal superimposed with the bias voltage, the bias voltage was described as a dc signal, but it is also possible to use a low-frequency ac signal in order to increase reliability. ③ The optimum ranges for the frequency and the duty ratio of the repeated voltage can also be applied to the other embodiments besides the third embodiment. ④ In the above embodiments, the method for driving a liquid crystal display device of the present invention was described for a transmission-type liquid crystal display device, but it can also be used for a reflection-type liquid crystal display device. It can also be used for a full-color liquid crystal display device using a color filter, or a liquid crystal display device without color filter.

Seventh Embodiment

Figure 16:
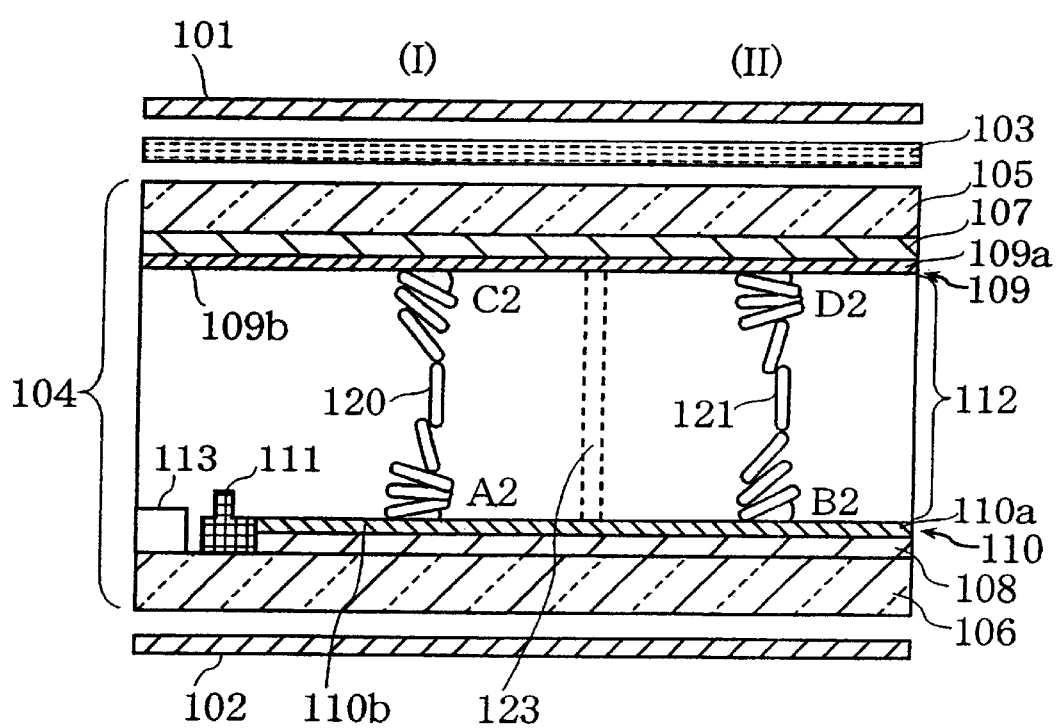
FIG. 16 is a diagrammatic cross-sectional view of a liquid crystal display device in accordance with a seventh embodiment of the present invention.
Figure 17:
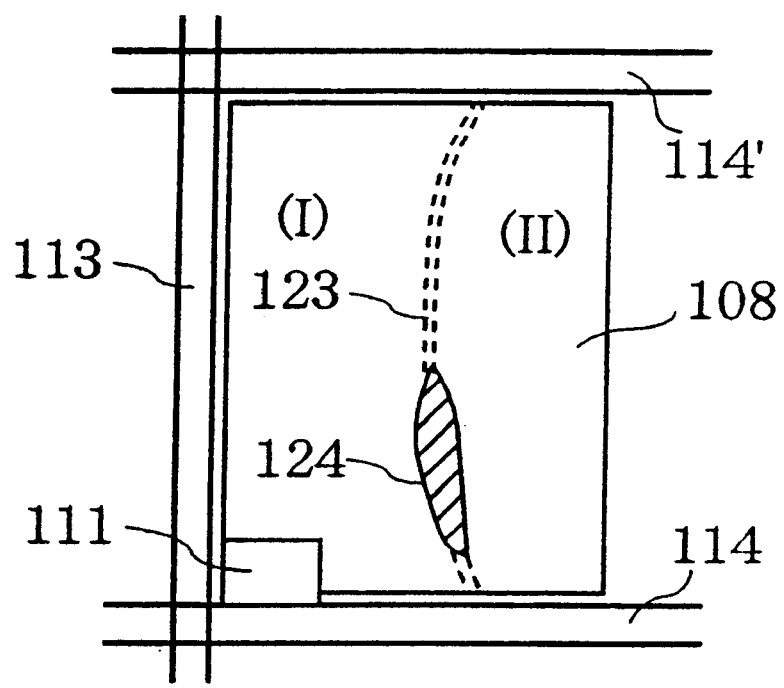
FIG. 17 is a diagrammatic plan view of a liquid crystal display device in accordance with the seventh embodiment of the present invention.

FIG. 16 is a diagrammatic cross-sectional view of a liquid crystal display device in accordance with the seventh embodiment of the present invention, and FIG. 17 is a diagrammatic plan view thereof.

The liquid crystal display device shown in FIG. 16 includes polarizers 101 and 102, a phase compensator 103 for optical compensation disposed on an inner side of the polarizer 101, and an active matrix liquid crystal cell 104 arranged between the polarizers 101 and 102.

The liquid crystal cell 104 includes an array substrate 106 made, for example, of glass, and an opposing substrate 105 in opposition to the array substrate 106. Transparent pixel electrodes 108 are formed on the inner surface of the array substrate 106, and the common electrode 107 is formed on the inner surface of the opposing substrate 105. Moreover, an alignment film 110 is formed on the pixel electrode 108, and an alignment film 109 is formed on the pixel electrodes 107.

Switching element 111 made for example of an a-Si TFT are arranged on the array substrate 106, and these switching element 111 are connected to the pixel electrodes 108.

Furthermore, spacers of 5 μm diameter (not shown in the drawings) and a liquid crystal layer 112 made of a nematic liquid crystal material with positive dielectric anisotropy are arranged between the alignment films 109 and 110. Moreover, the alignment films 109 and 110 are subjected to a parallel alignment process, such that the pretilt angles of the liquid crystal molecules on their surfaces have opposite signs, and the alignment films 109 and 110 are arranged substantially in parallel. Consequently, the liquid crystal layer 112 has a so-called splay alignment, in which the liquid crystal molecules are arranged in alignment regions that widen up diagonally when no voltage is applied.

The alignment film 110 includes an alignment film 110a with a larger pretilt angle B2 (third pretilt angle) and an alignment film 110b with a smaller pretilt angle A2 (first pretilt angle). Moreover, the alignment film 109 includes an alignment film 109a with a smaller pretilt angle D2 (fourth pretilt angle) and an alignment film 109b with a larger pretilt angle C2 (second pretilt angle). The pretilt angle C2 is arranged in opposition to the pretilt angle A2, and the pretilt angle D2 is arranged in opposition to the pretilt angle B2.

The orientation films 109 and 110 are subjected to a parallel alignment process by rubbing with a rubbing cloth in a direction substantially perpendicular to the signal electrode lines 113, and in the same direction for the upper and the lower substrate (that is, from left to right in FIG. 16).

The following is an explanation of a method for manufacturing this liquid crystal display device.

First, signal scanning lines 113, switching elements 111 and pixel electrodes 108 are formed the inner side of an array electrode 106.

Then, a polyimide alignment film material of polyamic acid type (by Nissan Chemical Industries, Ltd.), having a large pretilt angle B2 of about 5° as the third pretilt angle, is spread on the pixel electrode 108, dried and baked, thereby forming the alignment film 110a on the pixel electrode 108.

Then, the region on the left side in the paper plane of the alignment film 110a is irradiated with UV light to reduce the pretilt angle A2 (first pretilt angle) by about 2°, thereby forming the alignment film 110b.

The common electrode 107 is formed on the inner side of the opposing substrate 105.

Then, a polyimide alignment film material of polyamic acid type (by Nissan Chemical Industries, Ltd.) imparting a large pretilt angle C2 of about 5° as the second pretilt angle to the liquid crystal molecules at the boundary is spread on the common electrode 107, dried and baked, thereby forming the alignment film 109b on the common electrode 107.

Then, the region on the right side in the paper plane of the alignment film 109b (that is, the region in opposition to the larger pretilt angle B2) is irradiated with UV light to reduce the pretilt angle D2 (fourth pretilt angle) by about 2°, thereby forming the alignment film 109a.

In this manner, a smaller pretilt angle A2 (first pretilt angle) is formed in opposition to a larger pretilt angle C2 (second pretilt angle), and a larger pretilt angle B2 (third pretilt angle) is formed in opposition to a smaller pretilt angle D2 (fourth pretilt angle), as shown in FIG. 16

Figure 18A:
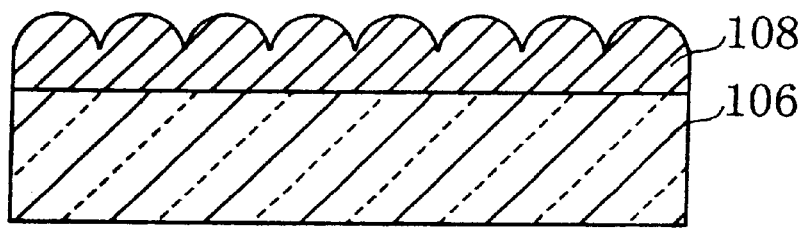
FIG. 18 illustrates a method for manufacturing the liquid crystal display device in accordance with the seventh embodiment of the present invention.

The pretilt angles can also be controlled as follows:

As shown in FIG. 18(a), an active matrix switching element (not shown in the drawings) made for example of an a-Si TFT and a pixel electrode 108 connected to this switching element are formed on the array substrate 106.

Figure 18B:
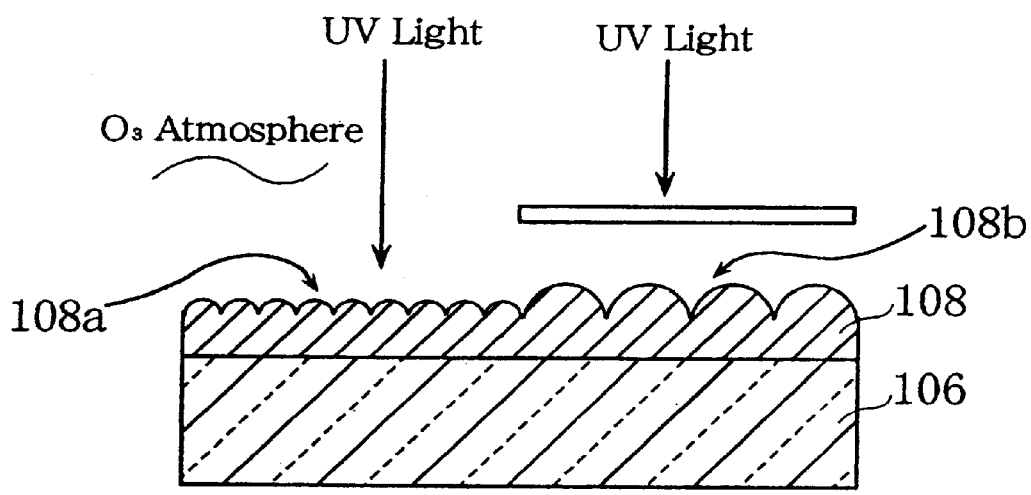

Then, as shown in FIG. 18(b), the left region of the pixel electrode 108 is irradiated with UV light under an ozone atmosphere, and is made flatter than the right region of the pixel electrode 108, thus forming a flattened region 108a.

Figure 18C:
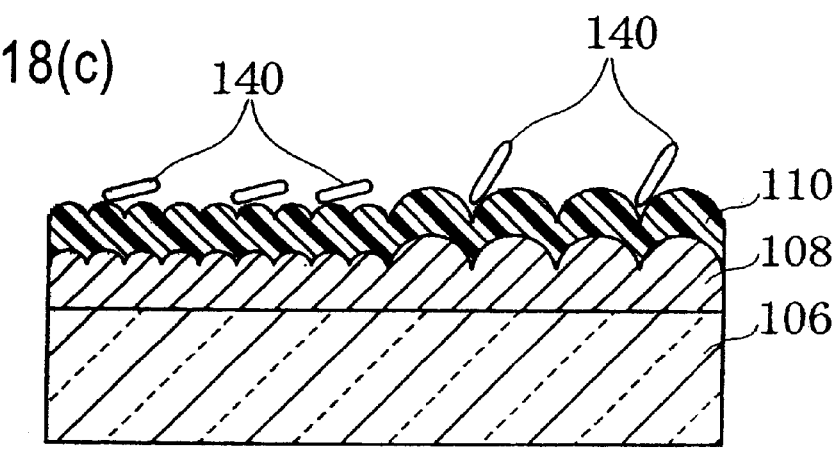

Then, as shown in FIG. 18(c), a pre-imide polyimide alignment material by JSR Corp. is spread on the pixel electrode 108, and dried and baked, to form the alignment film 110.

In this manner, the pretilt angle of the liquid crystal molecules 140 arranged on the flattened region 108a of the pixel electrode 108 can be made smaller than the pretilt angle of the liquid crystal molecules 140 arranged on the non-flattened region 108*b*. Furthermore, by performing the same process with the common electrode as well, a liquid crystal display device is attained that has the first liquid crystal cell region and the second liquid crystal cell region shown in FIG. 16 within the same pixel.

Then, as shown in FIG. 16, the surface of the alignment film 109 and of the alignment film 110 formed as above and provided with small and large pretilt angles in opposition to one another, is subjected to a parallel alignment process by rubbing with a rubbing cloth in a direction perpendicular to the signal electrode lines 113 and in the same direction for the upper and the lower substrate (that is, from left to right in FIG. 16), arranging the liquid crystal layer 112 of positive nematic liquid crystal material.

In the liquid crystal display device manufactured in this manner, the smaller pretilt angle A2 is arranged toward the alignment origin (near the source of the rubbing movement) of the pixel electrode 108, and the larger pretilt angle C2 is arranged in opposition to the pretilt angle A2. Applying a first voltage of 2.5V between the common electrode 107 and the pixel electrode 108, a b-splay alignment 120, in which the liquid crystal molecules are splay aligned on the side of the array substrate 106, forms easily in the region (I) of the pixel in FIG. 16 (first liquid crystal cell region), and a t-splay alignment 121, in which the liquid crystal molecules are splay aligned on the side of the opposing substrate 105, forms easily in the region (II) of the pixel (second liquid crystal cell region).

As shown in FIG. 16 and 17, when applying a first voltage of 2.5V between the common electrode 107 and the pixel electrode 108 through the switching element 111 of the liquid crystal cell 104, a b-splay alignment region (first liquid crystal region) and a t-splay alignment region (second liquid crystal region) are formed in the pixel, and at the border between the two, a disclination line 123 is clearly formed along the signal electrode line 113 and straddling the gate electrode lines 114 and 114' (disclination line forming step).

Repeatedly applying a −15V voltage pulse as a second voltage between the common electrode 107 and the pixel electrode 108, transition seeds were created starting at the disclination line 123 as shown in FIG. 17, and spreading the transition to bend alignment 124, all of the TFT panel pixels transitioned swiftly in three seconds (alignment transition step).

It seems that in the disclination line region at the border between regions of b-splay alignment and t-splay alignment, the bending energy is higher than in the surrounding regions, and when in this state, even more energy is directed to it by applying a high voltage to the upper and lower electrodes, the splay alignment transitions into bend alignment.

Eighth Embodiment

Figure 19A:
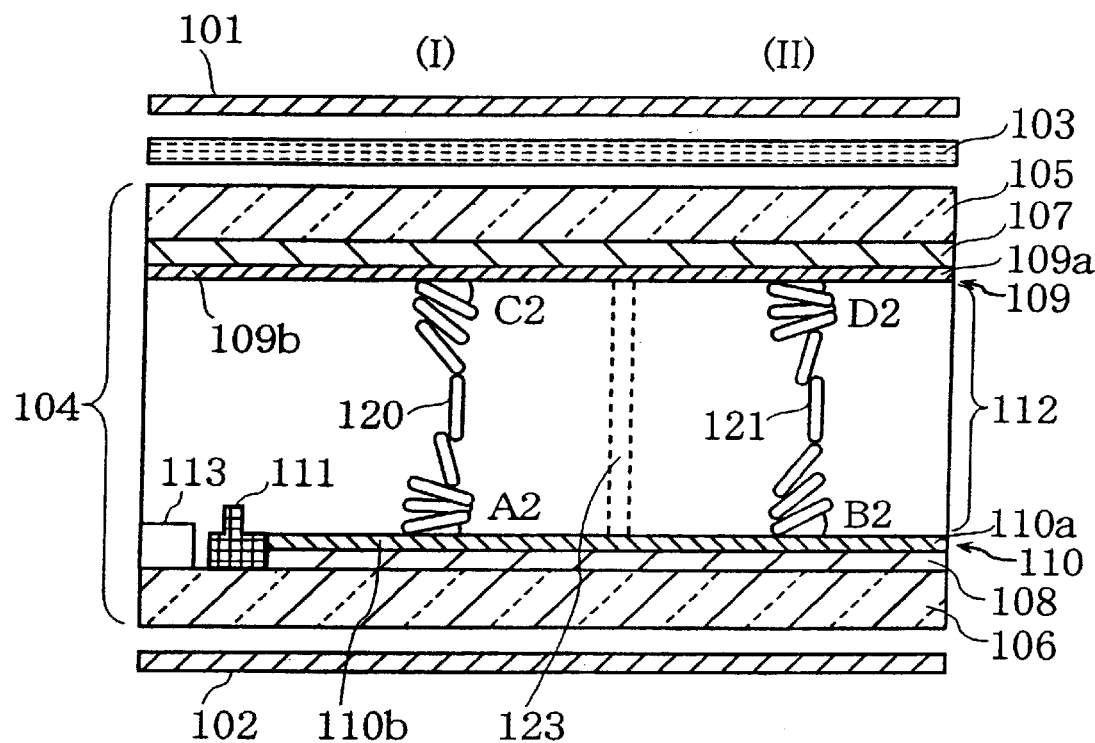
FIG. 19(a) is a diagrammatic cross-sectional view of the liquid crystal display device, and 19(b) is a diagrammatic plan view of the liquid crystal display device.
Figure 19B:
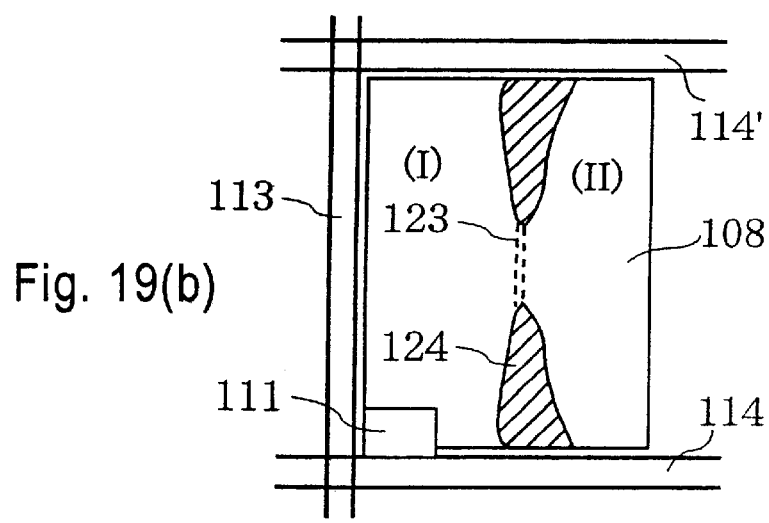
FIG. 19 illustrates a liquid crystal display device in accordance with the eighth embodiment of the present invention.

FIG. 19 shows a diagrammatic drawing of a liquid crystal display device in accordance with the eighth embodiment of the present invention.

During regular display, the gate electrode lines are scanned line by line and turned on, but before regular display, the gate electrode lines are turned on one by one, and repeatedly applying a −15V voltage pulse as a second voltage between the common electrode 107 and the pixel electrode 108 generates a transversal electric field caused by the potential difference between the pixel electrode 108 and the gate electrodes 114 and 114'. Then, due to this transversal field, transition seeds appear starting near the disclination line 123 and the gate electrode lines 114 and 114' as shown in FIG. 19, spreading the transition into bend alignment, and all of the TFT panel pixels transition swiftly within about one second (alignment transition step).

It seems that in the disclination line region at the border between regions of b-splay alignment and t-splay alignment, the bending energy is higher than in the surrounding regions, and directing even more energy to the disclination line by applying a transversal field from the transversally arranged gate electrode lines in this state leads to a swift transition. After the transition is finished, the gate electrode lines 114 and 114' are returned to their regular scanning state.

It should be noted that it is also possible to apply the second voltage between the pixel electrode and the common electrode continuously. Also, the effect of speeding up the transition can be attained when a pulse-shaped voltage is applied repeatedly, if its frequency is in a range of 0.1 Hz to 100 Hz, and the duty ratio of the second voltage is at least 1:1 to 1000:1.

Other Considerations

In the seventh and eighth embodiments, the pretilt angle D2 in the pre-alignment region of the common electrode that was aligned first was set to a smaller value, but it can also be set to a larger value. Moreover, the pretilt angle B2 in the region of the pixel electrode that was aligned first was set to a larger value, but an effect can also be attained with a small value, because t-splay alignment is assumed due to the influence of the transversal electric field.

Moreover, the pretilt angle A2 was set to 2° on one substrate and the pretilt angle C2 was set to 5° on the opposing substrate, and making this ratio is larger has the effect of shortening the transition time, so that the transition time can be made even faster.

Moreover, in the preceding embodiments, the value of the smaller pretilt angle A2 was set to 2°. In order to achieve an easy transition from b-splay alignment to bend alignment, it is sufficient if the smaller pretilt angles A2 and D2 are not larger than 3°, and the larger pretilt angles B2 and C2 are at least 4°.

Moreover, the upper and lower substrates have been subjected to a parallel alignment process in which the alignment processing direction was in the same direction perpendicular to the signal electrode lines 113, but it is also possible to perform a parallel alignment process in which the alignment processing direction is the same direction perpendicular to the gate electrode lines 114 (that is, in a direction perpendicular to the paper plane of FIG. 16). In that case, the disclination line is formed at a different location.

Moreover, if the alignment processing direction forms an angle of for example about 2° with the direction perpendicular to the electrode lines along the pixel electrodes, then the transversal electric field is applied at an angle from the electrodes to the disclination line in the pixel, so that the force twisting the splay aligned liquid crystal molecules increases, assisting the transition into the bend alignment, leading to a liquid crystal display device with a reliable and swift transition.

For the first voltage, a voltage is sufficient that is equal to or higher than the voltage at which the disclination line can be formed. Also, a second voltage was applied between the pixel electrode and the common electrode, but the second voltage can also be applied to the common electrode.

Moreover, a polyimide material was used as the material for the alignment film, but it is also possible to use another material, such as a monomolecular layer.

It is also possible to make the substrates in the liquid crystal display device of plastic, for example. Furthermore, it is also possible to use a reflecting substrate, such as silicon, for one substrate.

Ninth Embodiment

In this embodiment, interfitting protrusions and recesses are formed with the signal electrode lines and pixel electrodes, as well as with the gate electrode lines and the pixel electrodes.

Figure 20A:
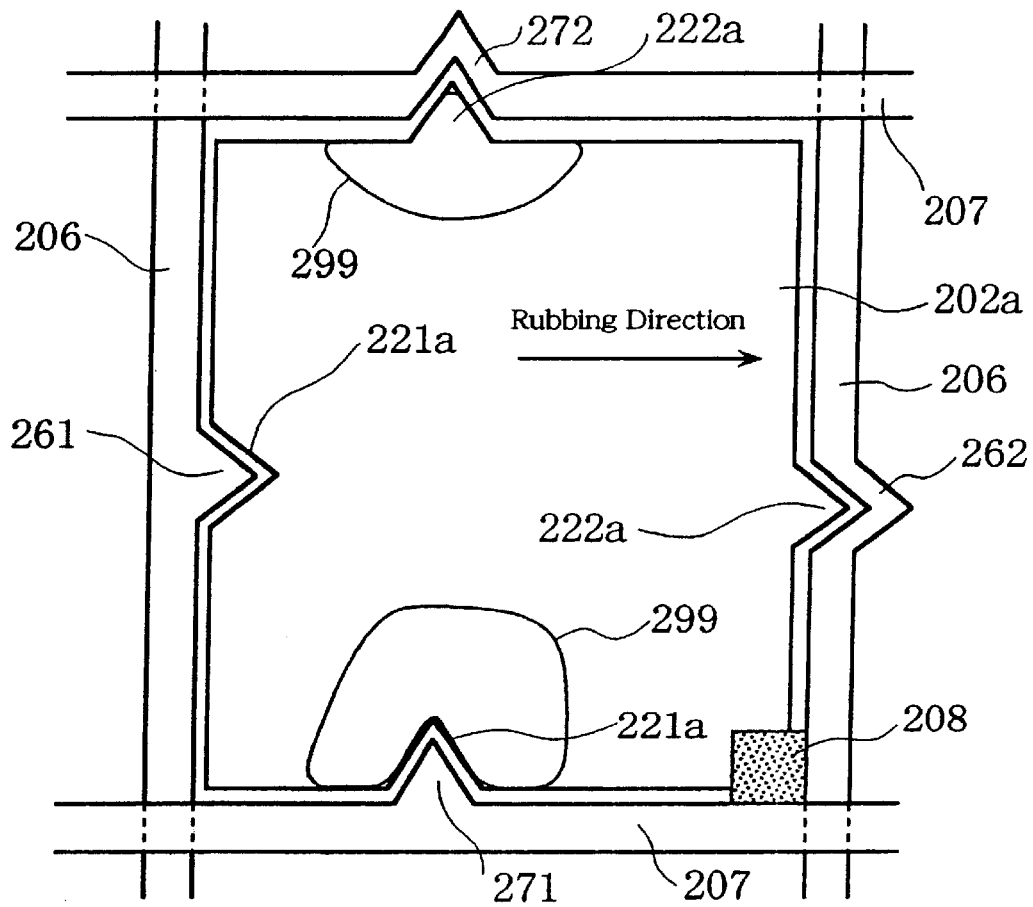
FIG. 20(a) is a diagrammatic plan view of the liquid crystal display device, and 20(b) is a diagrammatic cross-sectional view of the liquid crystal display device.
Figure 20B:
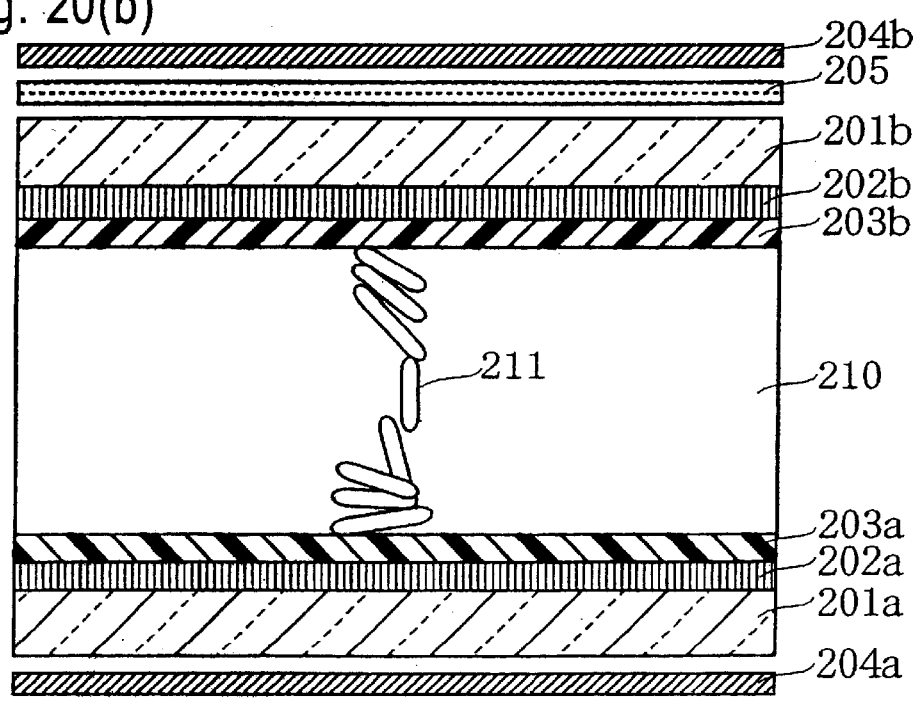
FIG. 20 schematically illustrates the configuration of a liquid crystal display device in accordance with the ninth embodiment of the present invention.
Figure 21:
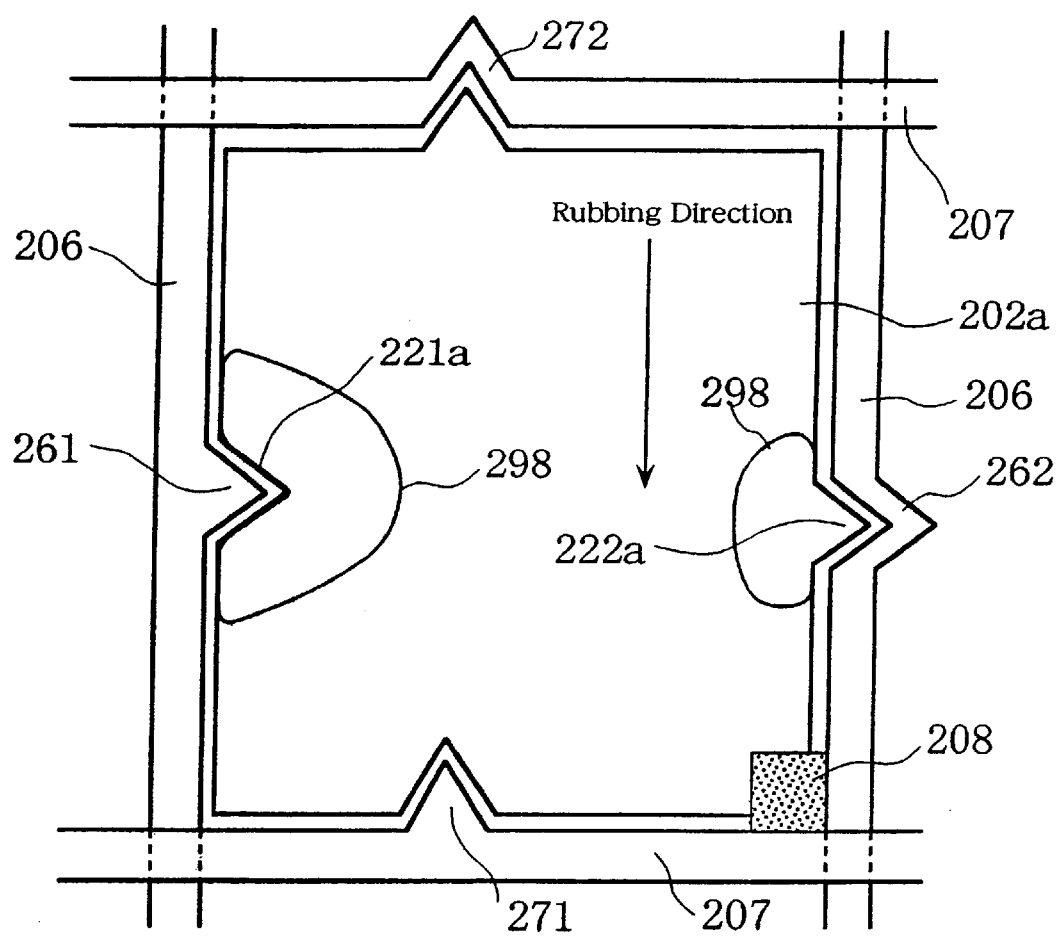
FIG. 21 also schematically illustrates the configuration of a liquid crystal display device in accordance with the ninth embodiment of the present invention.

FIGS. 20 and 21 diagrammatically illustrate the main elements of a liquid crystal display device of this embodiment.

These drawings show a pixel of an active matrix OCB-mode liquid crystal display device, taken from above the display (on the user's side).

In FIG. 20, numeral 206 denotes signal electrode lines (bus lines), numeral 207 denotes gate electrode lines, and numeral 208 denotes a switching transistor (element).

In these drawings, the signal electrode lines 206 intersect with the gate electrode lines 207, but needless to say, they are arranged as skew lines with an insulating film (not shown in the drawings) interposed between them.

Moreover, in these drawings, the switching transistor 208, which is a TFT, is connected to a substantially square pixel electrode 202a. Function, operation and effect of the signal electrode lines 206, the gate electrode lines 207, the switching transistor 208, and the pixel electrode 202a are as in a OBC-mode or other conventional liquid crystal display device.

And as in conventional liquid crystal display devices, the upper and lower alignment films 203a and 203b are subjected to an alignment process using, for example, a rubbing cloth to put the liquid crystal molecules 211 initially into splay alignment.

Moreover, as in conventional liquid crystal display devices, light and dark display is achieved by the effect of the polarizers 204a and 204b, and the effect of the transition of all the liquid crystal molecules in the pixels between the opposing substrates from splay alignment to bend alignment.

However, as shown in FIG. 20(a), recesses 221a and protrusions 222a are formed approximately at the center of the sides of the approximately square pixel electrode 202a. Complementary to that, the adjacent signal electrode lines 206 and the gate electrode lines 207 are deformed and provided with protrusions 261 and 271 and recesses 262 and 272 fitting into the recesses 221a and protrusions 222a. Thus, different from conventional liquid crystal display devices, the upper and lower sides and the left and right sides (with respect to the paper plane of FIG. 20(a)) of the pixel electrodes 202a are provided with deformed transition-inducing transversal electric field application portions.

The following is an explanation of a method for manufacturing this liquid crystal display device.

A polyimide alignment film material of polyamic acid type (by Nissan Chemical Industries, Ltd.), having a large pretilt angle of about 5° is spread on the surface of the pixel electrode 202a with the transversal electric field application portions and the common electrode 202b, dried and baked, thereby forming the alignment films 203a and 203b on these electrode surfaces on the side of the liquid crystal layer 210.

Then, the surfaces of the alignment films 203a and 203b are both subjected to an alignment process by rubbing with a rubbing cloth in a direction substantially perpendicular to the signal electrode lines 206, as shown in FIG. 20(a).

Then, a positive nematic liquid crystal material was vacuum injected between the upper and the lower substrate, forming the liquid crystal layer 210.

Thus, although this is not shown in the drawings, on the surface of the upper and lower alignment films 203a and 203b, the pretilt angles of the liquid crystal molecules 211 have opposite signs, and the molecules are aligned with the long axis direction substantially in parallel, so that when the liquid crystal layer 210 is in the so-called non-voltage application state, the liquid crystal molecules are spread obliquely in so-called splay alignment.

The following explains how display with this liquid crystal display device works.

A pulse-shaped voltage of −15V, which is a relatively high voltage in the field of liquid crystals, is applied repeatedly between the common electrode 202b and the pixel electrode 202a, and the gate electrode lines 207 are either put into the regular scanning state or almost all gate electrode lines 207 are put into the ON state. Due to the transversal electric field application portions, a transversal electric field, that is larger than the usual transversal electric field around it, is applied between the gate electrode lines 207, the signal electrode lines 206 and the pixel electrode 202a. As a result, if the splay alignment region within the pixel region has been rubbed in a direction that is substantially perpendicular to the signal electrode lines 206, transition seeds for a transition toward bend alignment in the liquid crystal layer 299 appear, starting mainly at the transversal electric field application portions between the gate electrode lines 207 and the pixel electrode 202a. Moreover, if the splay alignment region has been rubbed in a direction that is perpendicular to the gate electrode lines 207, transition seeds for a transition toward bend alignment in the liquid crystal layer 298 appear, starting mainly at the transversal electric field application portions between the signal electrode lines 206 and the pixel electrode 202a, as shown in FIG. 21.

Furthermore, as a result of the spreading of the bend alignment region around these transition seeds, transition into the bend alignment could be accomplished in about 0.5s for the entire pixel region.

The entire TFT panel transitioned swiftly within about 2s.

It seems that with this configuration, applying a high voltage between the upper and the lower electrodes, the liquid crystal layer 210 assumes b-splay alignment as shown in FIG. 20(b), the bending energy becomes higher than in the surrounding areas, and since the transversal electric field application portions apply a transversal field that is substantially perpendicularly (that is, perpendicularly to the plane of FIG. 20(b)) to the alignment of the liquid crystal molecules in this state, the liquid crystal molecules on the lower substrate side in b-splay alignment in FIG. 20(b) are twisted, leading to the creation of transition seeds.

Figure 22:
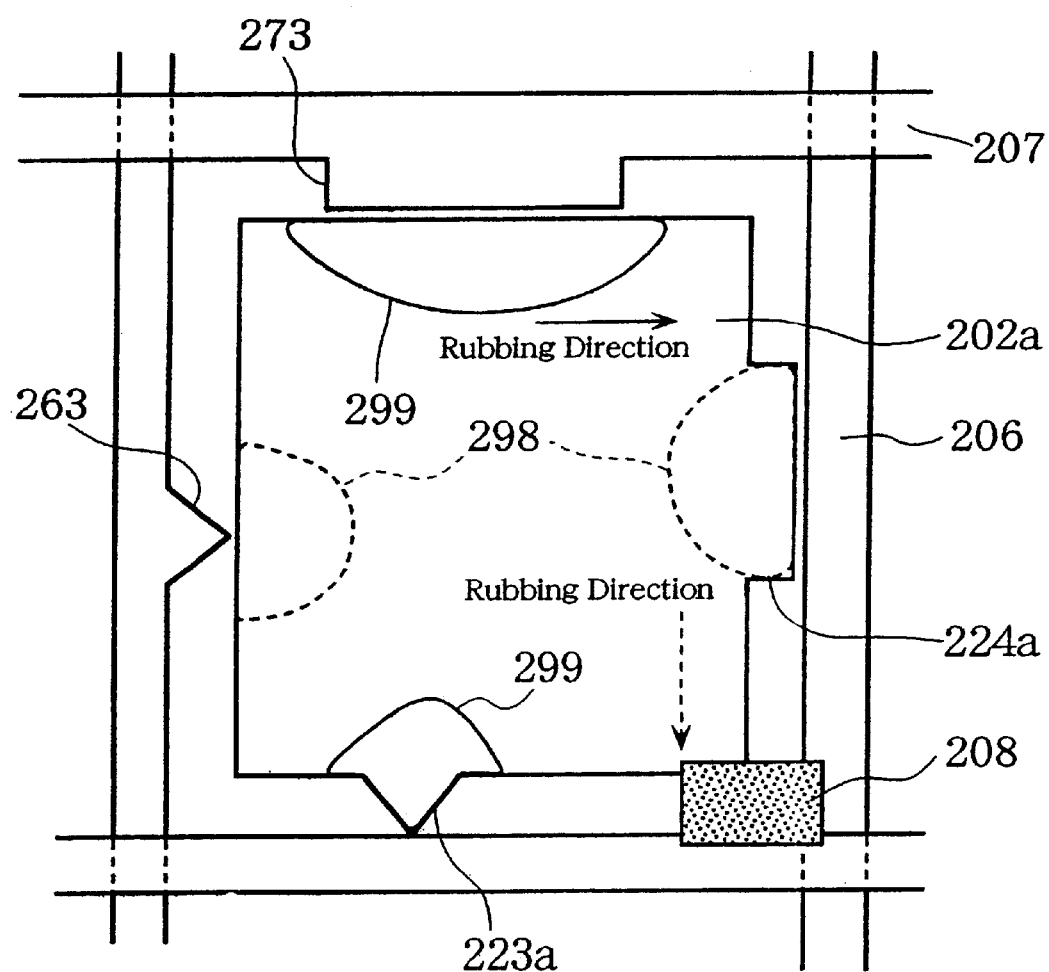
FIG. 22 shows another example of a liquid crystal display device in accordance with the ninth embodiment of the present invention.

In the foregoing explanation, the transversal electric field application portions were formed such that that the recesses and protrusions in the deformed pixel electrode fitted into the recesses and protrusions of the signal electrode lines, but as shown in FIG. 22, it is of course also possible to form the transversal electric field application portions only in the pixel electrode 202a, only in the signal electrode lines 206, or only in the gate electrode lines 207.

That is to say, the difference between in FIG. 22 and FIG. 20 is that in FIG. 22, the protrusions do not fit into the recesses, and there is only one of the protrusion 263 in the signal electrode line 206, the protrusion 273 in the gate electrode line 207, and the protrusions 223a and 224a in the pixel electrode 202a.

Furthermore, the planar shape of the protrusions and recesses can be triangular or rectangular as shown in FIGS. 20 and 22, but it can of course also be trapezoid, semicircular, circular, or elliptical, for example.

Moreover, in FIGS. 20 and 22, the transversal electric field application portions are provided at a total of four locations, namely at top and bottom as well as left and right, but in accordance with for example the size of the pixel, it is also possible to provide them only at two locations or even only one location, and needless to say, it is also possible to form protrusions and recesses continuously along the electrode edges. Also, in the preceding, the rubbing direction was substantially perpendicular to either the signal electrode line or the gate electrode line, but the rubbing direction can also be diagonal. In that case, the transition into bend alignment will start at the liquid crystal layer at the transversal electric field application portions between the signal and gate electrode lines and the pixel electrode. It is also preferable that each pixel is provided with at least one transversal electric field application portion that can apply a transversal electric field in at least a direction substantially perpendicular to the rubbing direction.

Since FIGS. 20 and 22 are plan views, both types of electrode lines (signal electrode lines 206 and gate electrode lines 207) and the pixel electrode 202a appear to be in the same plane, but at least one type of electrode lines can be arranged at a different height from the pixel electrode on the array substrate.

Thus, the transversal electric field application portions made of electrode deformations, in which a portion of the sides of the pixel electrode is deformed to protrusions and recesses within a plane that is parallel to the substrate plane, are separated by about 0.5 to 10 $\mu$m in vertical direction, and the transversal electric field is generated due to the presence of the protrusions of the signal electrode lines or gate electrode lines on the sides of the transversal electric field application portions and the recesses with dents of about 0.5 to 10 $\mu$m.

Tenth Embodiment

In this embodiment, electrode lines are provided for application of the transversal electric field.

The following explains this embodiment with reference to FIG. 23.

Figure 23A:
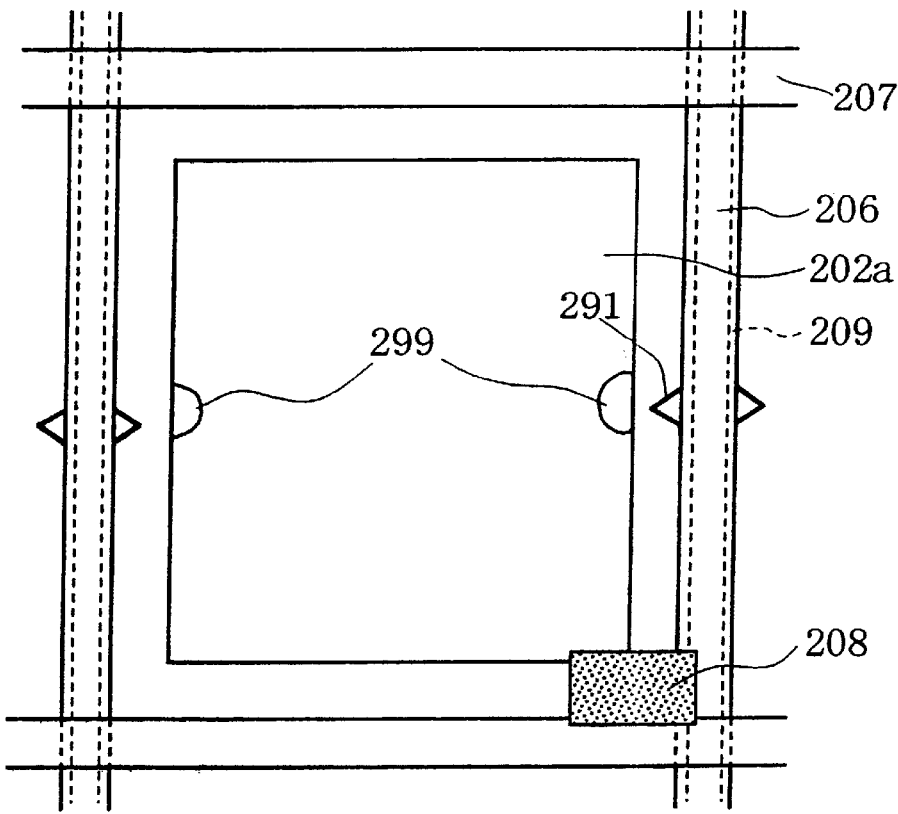
FIG. 23(a) is a diagrammatic plan view of the liquid crystal display device.
Figure 23B:
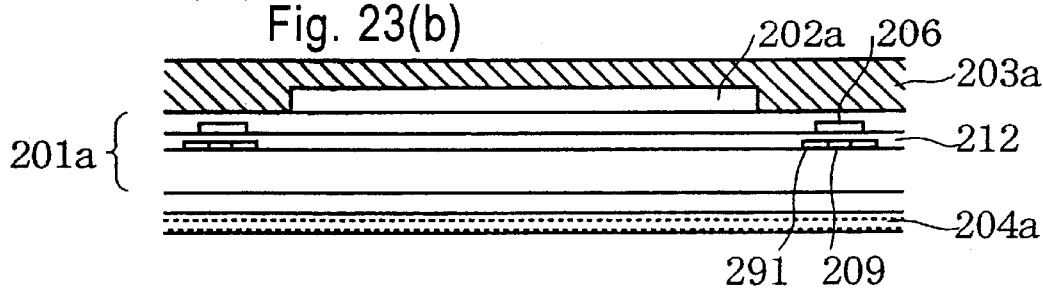
FIG. 23(b) is a diagrammatic cross-sectional view of the liquid crystal display device.

FIG. 23(a) is a plan view taken from above the substrate. FIG. 23(b) is a cross-sectional view taken in parallel to the gate electrode lines 207 of the liquid crystal display device.

In FIGS. 23(a) and 23(b), numeral 209 denotes electrode lines dedicated to application of a transversal electric field and arranged approximately directly below the signal electrode lines 206 on the array substrate 201a. Numeral 212 denotes a transparent insulating film for insulating the transversal electric field application lines 209 from the signal electrode lines 206 and the gate electrode lines 207. Consequently, when viewing this pixel from above (that is, from a user's viewing direction perpendicular to the display screen), protrusions 291 of triangular shape (when viewed from above) project from the transversal electric field application lines 209 toward the signal electrode lines 206 at the center on the left and right of the pixel, as shown in FIG. 23(a). It should be noted that the signal electrode lines 206 and the pixel electrode 202a are the same as in the prior art.

The transversal electric field application lines 209 are connected to a driving circuit connected to the signal electrode lines 206 or the gate electrode lines 207, and during regular liquid crystal display after the alignment transition, the transversal electric field application lines 209 are disconnected from the driving circuit.

It is also possible to arrange the transversal electric field application lines 209 as signal electrode lines above the signal electrode lines 206, near the pixel electrodes and separated from the pixel electrodes by a transparent insulating film, increasing the effect of the transversal field application, and to electrically connect them collectively by contact holes (not shown in the drawings) in the transparent insulating film. In that case, the redundancy is increased as there are two signal electrode lines, and there is also the effect of reduced electrical resistance.

Figure 23C:
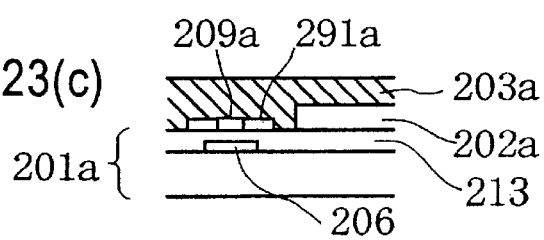
FIG. 23(c) is a diagrammatic cross-sectional view of another example of the liquid crystal display device.

That is to say, the transversal electric field application lines 209a are provided directly above the signal electrode lines 206, separated by the transparent insulating film 213, as shown in FIG. 23(c). Also in this case, protrusions 291a that are triangular when viewed from above protrude toward the pixel center.

Figure 23D:
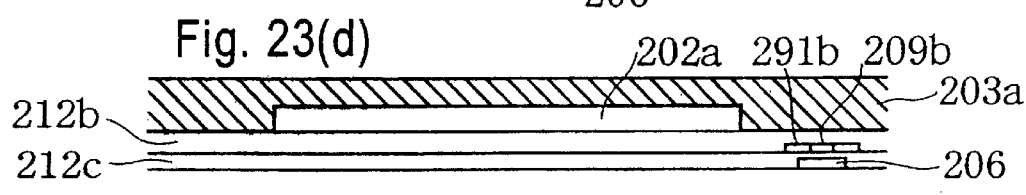
FIG. 23(d) is a diagrammatic cross-sectional view of yet another example of the liquid crystal display device.

FIG. 23(d) shows another example of this embodiment. As shown in FIG. 23(d), the transversal electric field application lines 209b are covered by a transparent flattening insulating film 212b, below the dedicated lines 209b, the signal electrode lines 206 are covered by a transparent flattening insulating film 212c, and the pixel electrode 202a is arranged on the transparent flattening insulating film 212b. Also in this case, protrusions 291b that are triangular when viewed from above protrude toward the pixel center.

In the drawings, the protrusions of the dedicated lines for transversal electric field application are triangular, but it is of course also possible to provide the protrusions continuously along the entire portion in opposition to the pixel electrodes, to provide protrusions that have a three-dimensional structure, projecting upward for example.

It is also possible to provide the dedicated lines for transversal electric field application not directly below the signal electrode lines, but directly below the gate electrode lines. Furthermore, they can also be provided directly below both types of electrode lines.

Eleventh Embodiment

In this embodiment, defect portions are formed, in which cutouts are provided at least at one location in the pixel electrodes.

Figure 24A:
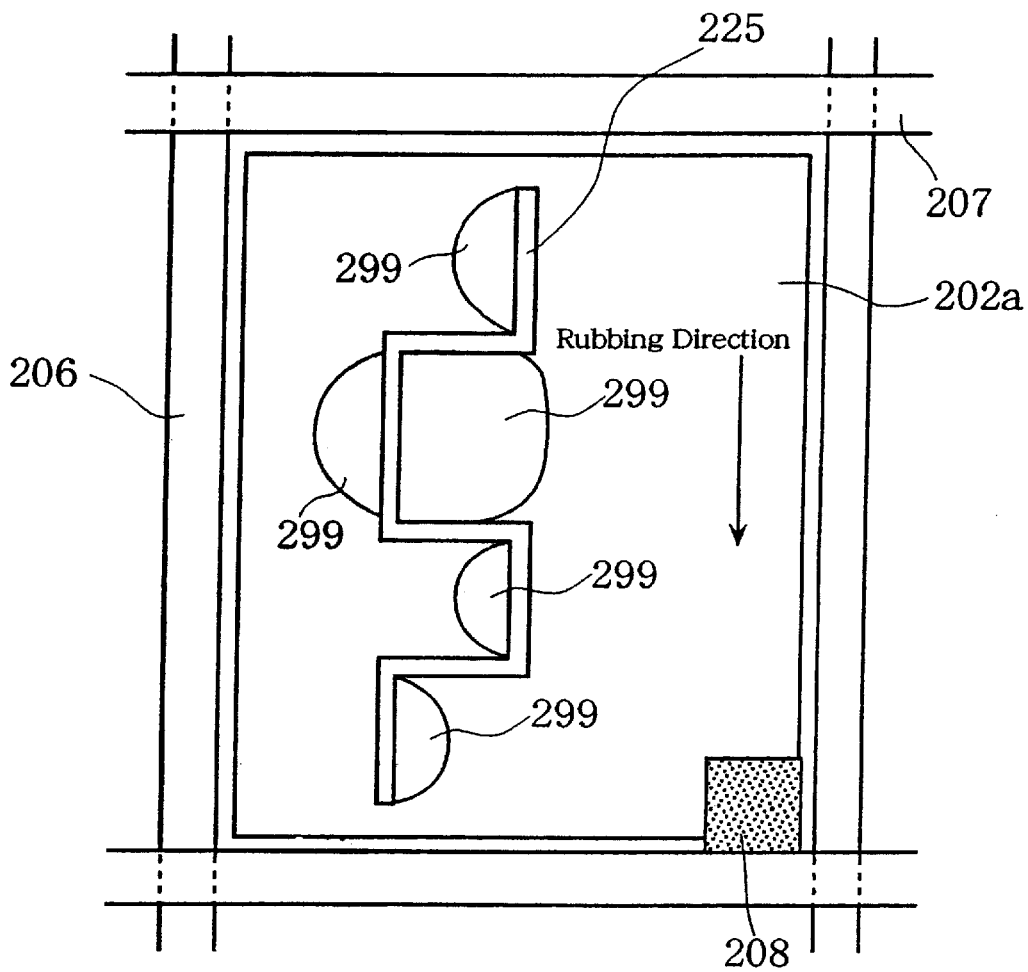
FIG. 24(a) is a diagrammatic plan view of the liquid crystal display device, and 24(b) is a diagram illustrating how the electric field bends.

FIG. 24 diagrammatically shows a plan view of one pixel unit in a liquid crystal display device in accordance with this embodiment. As shown in FIG. 24, a portion of several $\mu$m width is etched away from the pixel electrode 202a made of an ITO film, forming a electrode defect portion 225 that is crank-shaped when viewed from above.

A polyimide alignment film material of polyamic acid type (by Nissan Chemical Industries, Ltd.), having a pretilt angle of about 5° is spread on the surface of the pixel electrode 202a including this electrode defect portion 225 and on the surface of the common electrode (not shown in the drawings), dried and baked, thereby forming alignment films (not shown in the drawings). Then, the surfaces of these alignment films are both subjected to an alignment process by rubbing with a rubbing cloth in a direction perpendicular to the gate electrode lines 207, so that the pretilt angles of the liquid crystal molecules have opposite signs, and the molecules are aligned substantially in parallel, which is the same as in the ninth and tenth embodiments.

Consequently, the liquid crystal layer also has so-called liquid crystal cells in splay alignment, made of regions in which the liquid crystal molecules widen up diagonally when no voltage is applied.

Figure 24B:
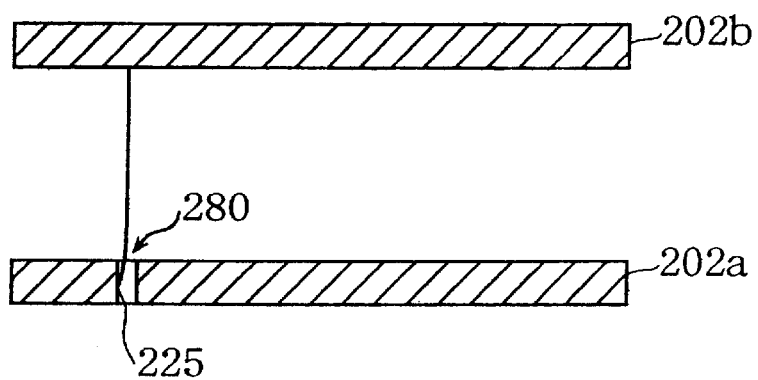
FIG. 24 schematically illustrates the configuration of a liquid crystal display device in accordance with an eleventh embodiment of the present invention.

However, if, before display, a voltage pulse of 15V is applied repeatedly between the common electrode and the pixel electrode of the pixel, or a voltage pulse of -15V is applied repeatedly to the common electrode, and the gate electrodes are either put into the regular scanning state or almost all gate electrodes are put into the ON state, then, due to the electrode cutout portions 225 in each pixel unit, a strongly bent diagonal transverse electric field 280 is generated at the edge of the electrode cutout portions 225, as shown in FIG. 24(b).

Therefore, seeds for transition into the bend alignment appear in the liquid crystal layer 299 of these electrode cutout portions 225, these bend alignment regions spread, and the splay alignment in the pixel region transitions completely into bend alignment in about 0.5s for the entire pixel region. The entire TFT panel transitions swiftly within about 2s.

It seems that as a strong transversal electric field is generated at the transversal electric field application portions made of these electrode cutout portions 225 and the liquid crystal molecules nearby are aligned horizontally in the substrate plane in a so-called b-splay alignment, the bending energy becomes higher than in the surrounding areas, and as a result of applying even more energy with the high voltage applied between the upper and lower electrodes in this situation, transition seeds appear at the electrode defect portions 225, and the bend alignment regions spread.

Only one electrode defect portion 225 that is crank-shaped when viewed from above is formed in FIG. 24, but it is of course also possible to form two or more.

Also, its form can of course also be straight, angular, circular, elliptical, or triangular, for example.

Furthermore, the electrode cutout portions 225 can also be formed on the side of the common electrode.

Needless to say, they can also be formed on both the pixel electrode and the common electrode.

Twelfth Embodiment

In this embodiment, a transverse electric field is generated, and regions with different tilt angles in the pixel plane are formed accordingly.

Figure 25A:
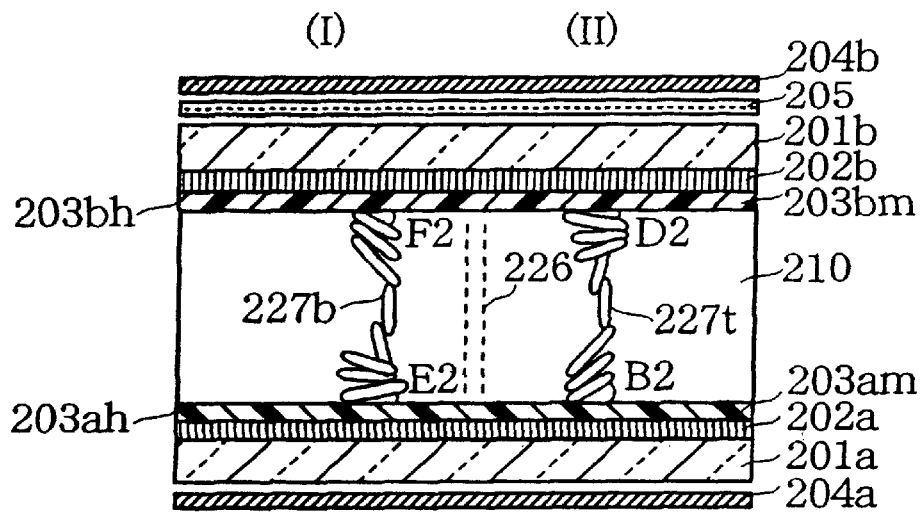
FIG. 25(a) is a diagrammatic cross-sectional view of the liquid crystal display device, and 25(b) is a diagrammatic plan view.

FIG. 25 diagrammatically illustrates the configuration and features of one pixel unit in a liquid crystal display device of this embodiment. FIG. 25(a) is a cross-sectional view of the pixel, taken in parallel to the gate electrode lines, and shows how the tilt angles are different within the same pixel in region (I) on the left side and region (II) on the right side.

Figure 25B:
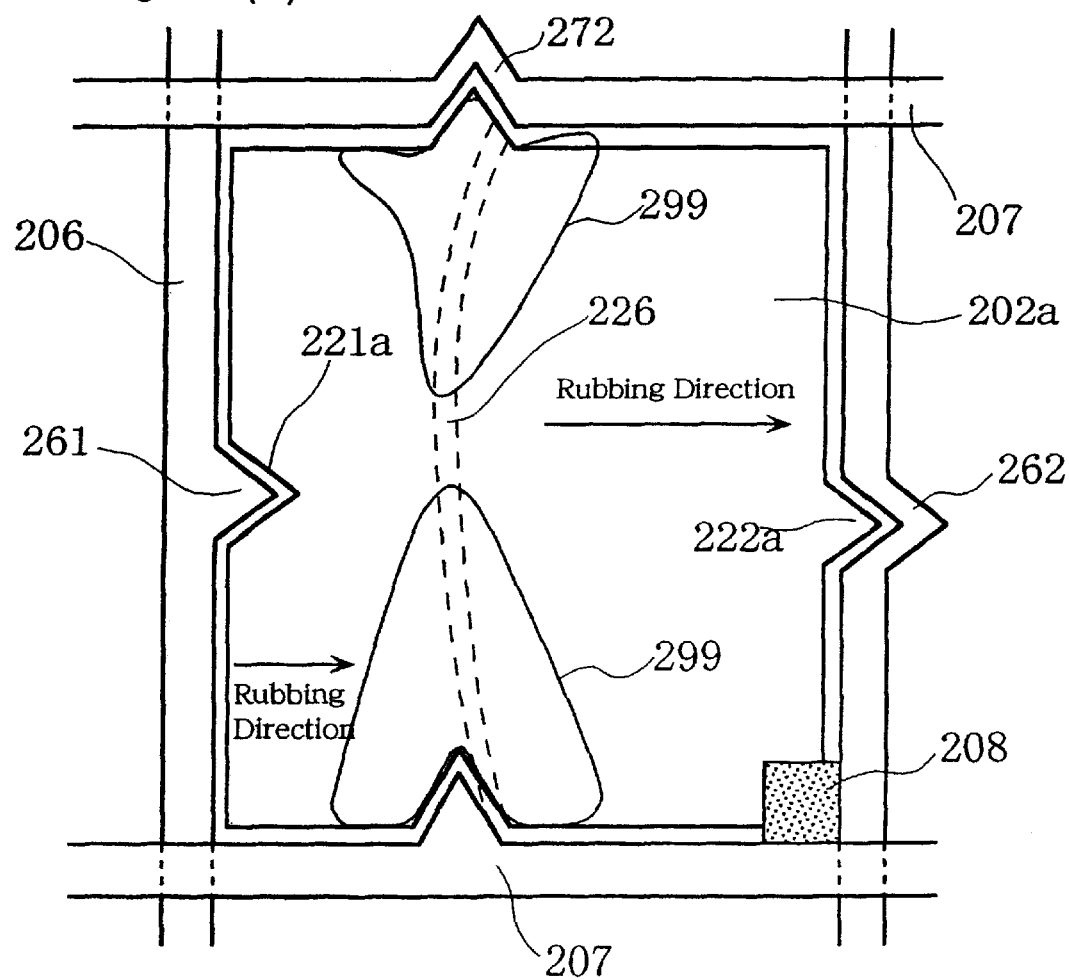
FIG. 25 schematically illustrates the configuration of a liquid crystal display device in accordance with a twelfth embodiment of the present invention.

FIG. 25(b) is a plan view of the pixel taken from above (where the user is). Recesses and protrusions 221a and 222a are provided at top and bottom as well as left and right of the pixel electrode 202a, and recesses and protrusions 261, 262, 271 and 272 fitting into the recesses and protrusions 221a and 222a are provided at corresponding positions of the signal electrode lines 206 and the gate electrode lines 207. As in the seventh embodiment explained above, a disclination line 226 is formed at the border between the regions (I) and (II) in FIG. 25 when applying a first voltage of 2.5V.

The following is an explanation of a method for manufacturing the liquid crystal display device of this embodiment.

Alignment films 203am and 203bm are formed on the inner faces of opposing substrates for active matrix liquid crystal cells. These alignment films 203am and 203bm are subjected to a process forming a splay alignment when no voltage is applied to the liquid crystal layer 210, and transition-inducing transversal electric field application portions are formed for example at the pixel electrodes 202a and the gate electrode lines 207 arranged nearby, which is the same as in the first embodiment.

However, the processing of the alignment films is different. That is to say, in FIG. 25(a), a polyimide alignment film material of polyamic acid type (by Nissan Chemical Industries, Ltd.), having a large pretilt angle B2 of about 5° is spread on the surface of the pixel electrode 202a with the transversal electric field application portions, dried and baked, thereby forming the alignment film 203am.

Then, only the left region 203ah of the alignment film 203am, that is, only the region (I) is irradiated with UV light to decrease the pretilt angle E2 to a smaller angle of about 2°.

On the other hand, a polyimide alignment film material of polyamic acid type (by Nissan Chemical Industries, Ltd.), providing the boundary liquid crystal molecules with a large pretilt angle F2 of about 5° is spread on the opposing substrate 201b, dried and baked, thereby forming the alignment film 203bh on the common electrode 202b.

Then, only the right region 203bm of the alignment film 203bh, that is, only the region (II) is irradiated with UV light to decrease the pretilt angle D2 to a smaller angle of about 2°.

Thus, a smaller pretilt angle E2 is formed in the alignment film 203ah on the left half of the array substrate 201a in opposition to a larger pretilt angle F2 in the alignment film 203bh in the left half of the opposing substrate 201b as shown in region (I) in FIG. 25(a), and a larger pretilt angle B2 is formed in the alignment film 203am in the right half of the array substrate 201a in opposition to a smaller pretilt angle D2 in the alignment film 203bm in the right half of the opposing substrate 201b as shown in region (II).

Moreover, the surfaces of the alignment films, provided with small and large pretilt angles arranged like this in opposition to one another, are both subjected to a parallel alignment process by rubbing with a rubbing cloth in a direction substantially perpendicular to the signal electrode lines 6 in the same direction for the upper and the lower substrate, as shown in FIG. 25(b). Then, a positive nematic liquid crystal material is filled in, forming the liquid crystal layer 210.

With this configuration, the smaller pretilt angle E2 is arranged toward the alignment origin (toward the source of the rubbing movement) in the pixel electrode 202a, and the larger pretilt angle F2 is arranged in opposition to this pretilt angle E2, and a b-splay alignment 227b, in which the liquid crystal molecules are splay aligned at the lower substrate forms more readily in the pixel region (I) in FIG. 25(a), and a t-splay alignment 227t, in which the liquid crystal molecules are splay aligned at the upper substrate forms more readily in the pixel region (II).

Then, applying a voltage of 2.5V, which is near the transition critical voltage, to the opposing electrodes through the switching transistors 208 of the liquid crystal cells, a b-splay alignment region and a t-splay alignment region were formed in the same pixel (for the reasons explained above), and a disclination line 226 was formed clearly at the border of these alignment regions along the signal electrode lines 206, straddling the gate electrode lines 207.

Repeatedly applying a −15V voltage pulse between the common electrode and the pixel electrode in this pixel, transition seeds appeared starting at the liquid crystal layer 299 near the disclination line 226 and near the transversal electric field application portions as shown in FIG. 25(b), the transition to bend alignment regions spread, and all of the TFT panel pixels transitioned swiftly within about one second.

It seems that in the region of the disclination line 226 at the border between regions of b-splay alignment and t-splay alignment, the bending energy is higher than in the surrounding regions, and due to the transversal electric field generated at the transversal field application portions in addition to this state, the splay alignment is twisted and transitions more readily, and applying a high voltage between the upper and lower electrodes, even more energy is directed to it, leading to the transition into bend alignment.

Above, several embodiments of the present invention have been explained, but it is to be understood that these embodiments are in no way intended to limit the present invention. For example, the following variations are possible:

1) The voltage is applied between pixel electrode and common electrode is continuous or an intermittent.
2) When the high voltage pulse is applied repeatedly, its frequency is in the range from 0.1 Hz to 100 Hz, and the duty ratio of the second voltage is in the range of at least 1:1 to 1000:1, selecting values that accelerate the transition.
3) Plastic is used for the substrates, and organic conducting films are used for the electrodes.
4) One of the substrates is a reflective substrate, having reflecting electrodes of silicon or aluminum for example, for a reflective liquid crystal display device.
5) As an additional measure, the pixel electrodes and the common electrode are provided with protrusions for the generation of a strong electrode electric field in a direction perpendicular to the substrate plane.
6) As an additional measure, protrusions instead of globular glass or silica beads are provided to keep a predetermined distance between the substrates, and these protrusions also have the function to arrange the liquid crystal molecules.
7) The upper portions or the lower portions of these protrusions also serve as the protrusions for strong electrode generation.
8) The shape of the pixel electrodes is oblong or triangular, instead of square.
9) The pixels are partitioned not into two regions but into three or four regions with different liquid crystal alignments.
10) As a measure for imparting small and large pretilt angles, the surface constitution of the transparent electrodes is changed by $O_2$ ashing, and alignment films are formed on these transparent electrodes.

Thirteenth Embodiment

Figure 26:
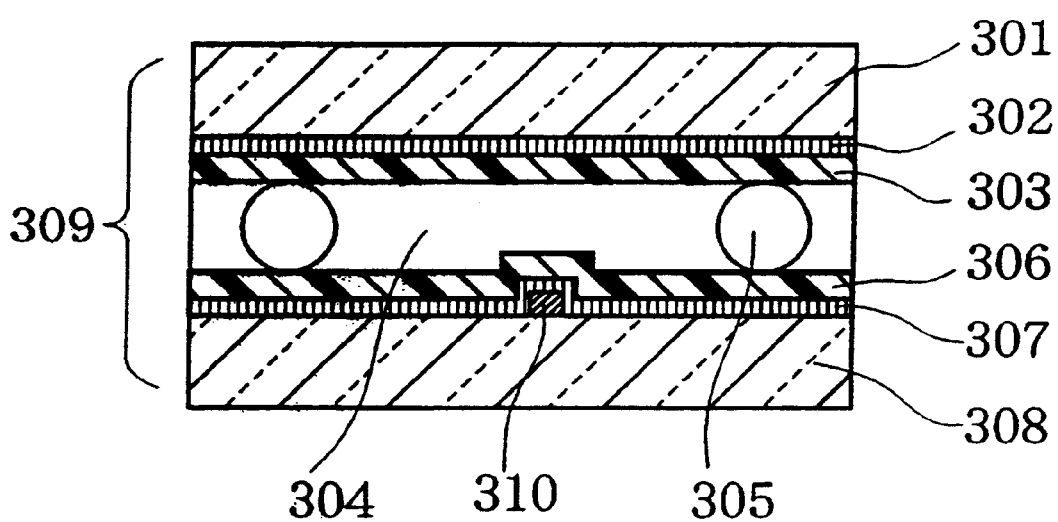
FIG. 26 schematically illustrates the cross-sectional configuration of a liquid crystal display device in accordance with a thirteenth embodiment of the present invention.
Figure 28:
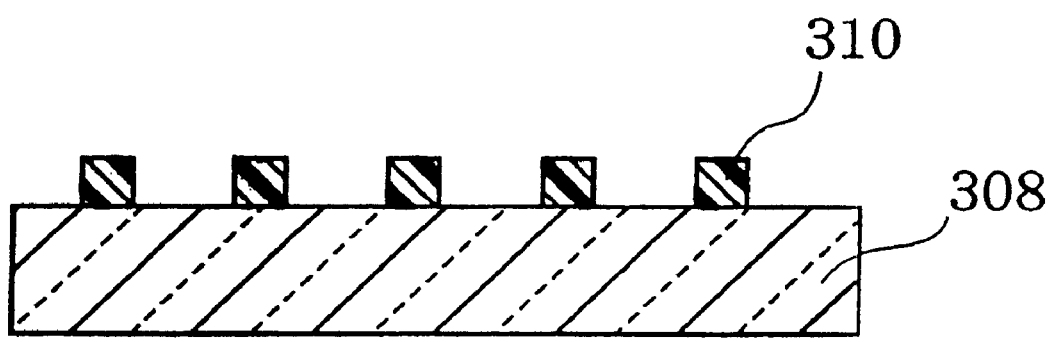
FIG. 28 illustrates the continuation of the process for manufacturing bump-shaped protrusions in FIG. 27 in accordance with the present invention.

FIG. 26 shows a diagram of the configuration of a test cell used to test the splay—bend transition time in a liquid crystal display device of the present invention. FIGS. 27 and 28 show parts of the manufacturing process and illustrate how the bump-shaped protrusions are made.

A PC resist material (by JSR Corp.) is spread on a glass substrate 308, forming a resist thin film of 1 µm thickness. Then, collimated UV light 323 is irradiated through a photo mask 321 with rectangular apertures 322 to expose the resist thin film 320. The resist thin film 320 that has been exposed with the collimated light is developed, rinsed, and pre-baked at 90° C., forming bump-shaped protrusions 310 with a cross-section as shown in FIG. 28.

Figure 29:
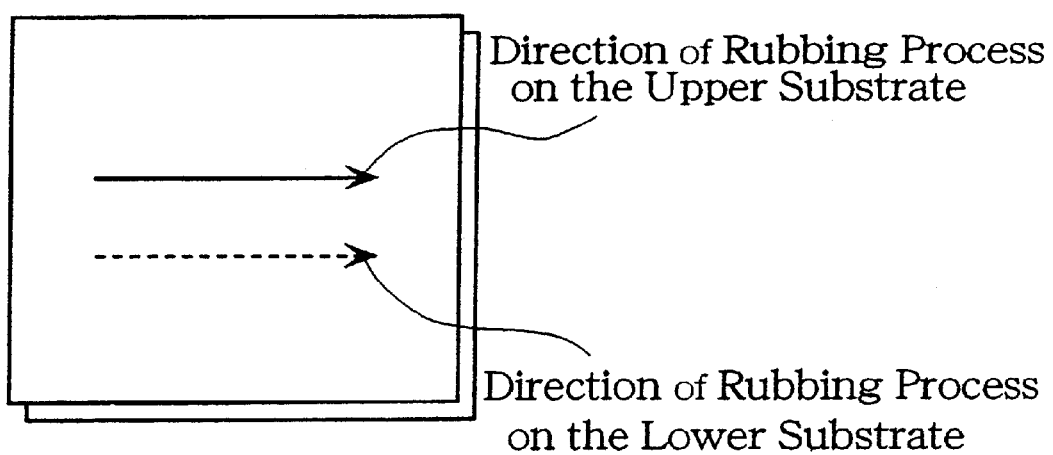
FIG. 29 illustrates the rubbing direction on the substrate used in the thirteenth embodiment of the present invention.

Then, ITO electrodes 7 of 2000A thickness are formed on this substrate with one of the usual methods, forming a glass substrate 308 with electrodes. Subsequently, an alignment film coating (SE-7492 by Nissan Chemical Industries, Ltd.) is spread by spin-coating on a glass substrate 301 with transparent electrodes 302 and on the glass substrate 308 provided with the bump-shaped protrusions, and cured for one hour in a thermostatic bath at 180° C., thus forming the alignment films 303 and 306. Then, a rubbing process is carried out, rubbing with a rubbing cloth by Toho Rayon Co., Ltd. in the direction shown in FIG. 29, and using spacers 5 by Sekisui Fine Chemical Corp. and Struct Bond 352A (tradename for a sealing resin by Mitsui Toatsu Chemicals, Inc.), the substrates were laminated together at a spacing of 6.51 µm, thus producing a liquid crystal cell 309 (referred to as "liquid crystal cell A" in the following).

The rubbing process was carried out such that the pretilt angle of the liquid crystal was about 5° at the boundaries to the alignment film.

Then, a liquid crystal MJ96435 (with a refractive index anisotropy of Δn=0.138) was vacuum injected into the liquid crystal cell A, thus yielding the test cell A.

Then, polarizers were laminated on the test cell A, such that the polarization axes of the polarizers formed an angle of 45° with the direction of the rubbing process, and the polarization axes crossed at right angles. Applying a 7V square voltage pattern and observing the transition from splay alignment to bend alignment, the transition from splay alignment to bend alignment took about 5s for the entire electrode region.

In the regions where the bump-shaped protrusions 310 are formed, the liquid crystal layer is thinner than in the surrounding regions, effectively increasing the strength of the electric field, so that a reliable bend transition starting at these portions can be ensured. The bend alignment then spreads swiftly to the other regions.

That is to say, a reliable and fast splay→bend transition can be achieved.

The cross-section of the bump-shaped protrusions can of course also be trapezoid, triangular, or semicircular, instead of rectangular as in the present embodiment.

As a comparative example, a splay alignment liquid crystal cell R was manufactured with the same process as above, except that a glass-substrate with transparent electrodes, but without the bump-shaped protrusions 310 was used, into which liquid crystal MJ96435 was filled, thus yielding a test cell R. Applying a 7V square voltage pattern to the test cell R, the time needed for the transition from splay alignment to bend alignment for the entire electrode region was 42s, which clearly demonstrates the effect that the present invention has.

Fourteenth Embodiment

Figure 30:
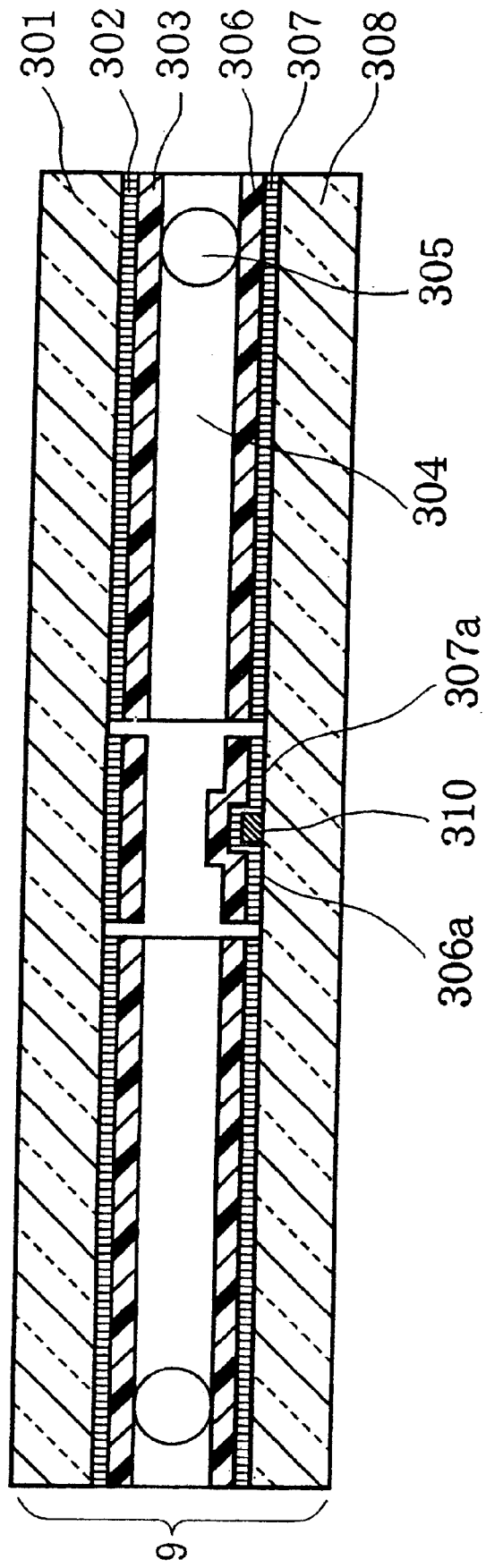
FIG. 30 is a diagram of the configuration in a fourteenth embodiment.
Figure 31:
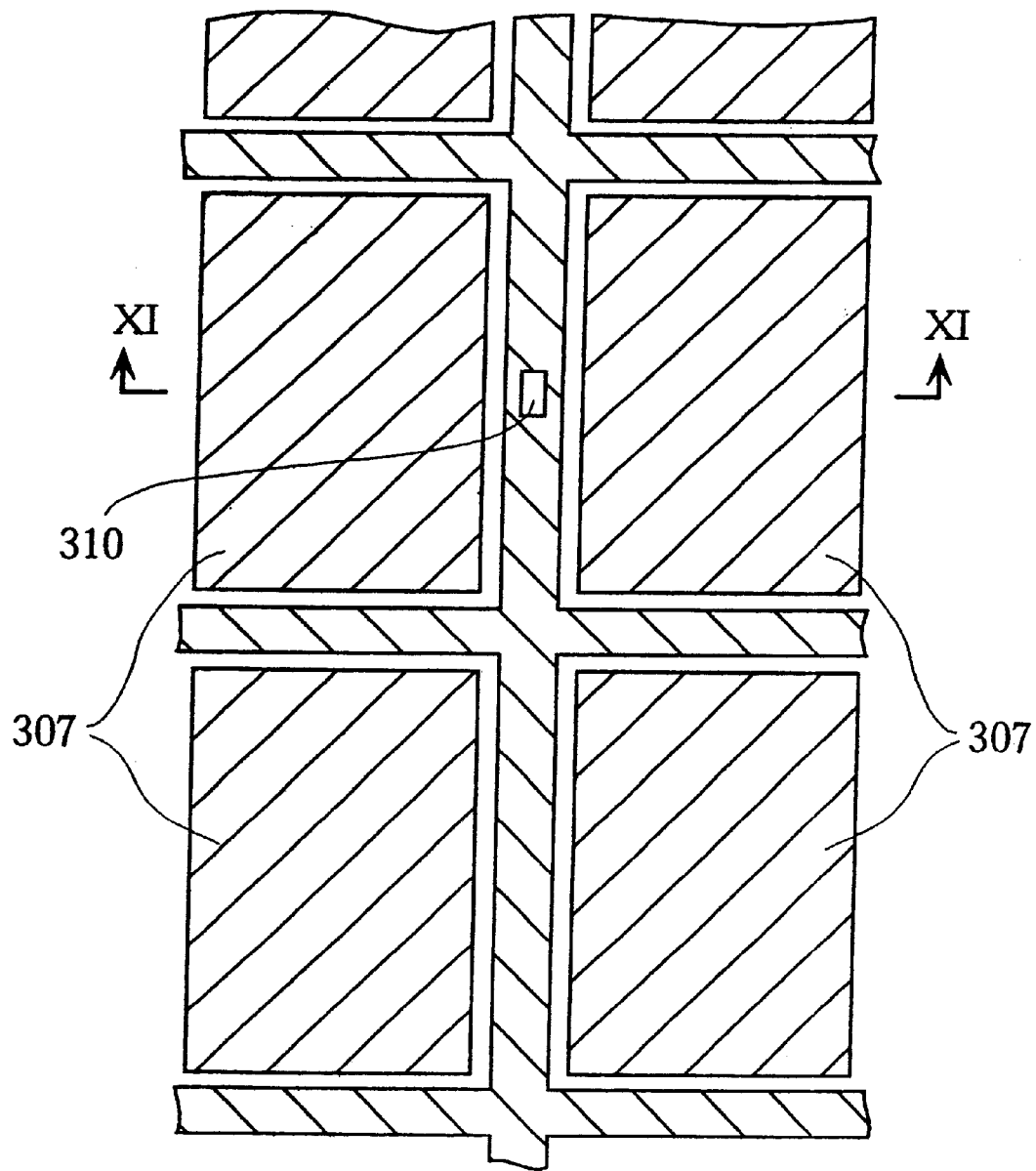
FIG. 31 is a plan view of the fourteenth embodiment.

FIG. 30 shows a diagram of the configuration of a test cell used to test the splay—bend transition time in a liquid crystal display device of the present invention, and FIG. 31 is a plan view thereof. FIG. 30 is a cross-sectional view taken from the direction of the arrows X1—X1 in FIG. 31. The fourteenth embodiment is characterized in that the bump-shaped protrusions 310 are provided on a transparent electrode 307a, which is formed outside the display pixel region. The following explains a procedure for manufacturing the same.

An alignment film coating (SE-7492 by Nissan Chemical Industries, Ltd.) is spread by spin-coating on the glass substrate 301 with transparent electrodes 302 and on the glass substrate 308 provided with the bump-shaped protrusions, and cured for one hour in a thermostatic bath at 180° C., thus forming the alignment films 303, 306 and 306a. Then, a rubbing process is carried out, rubbing with a rubbing cloth by Toho Rayon Co., Ltd. in the direction shown in FIG. 29, and using spacers 305 by Sekisui Fine Chemical Corp. and Struct Bond 352A (tradename for a sealing resin by Mitsui Toatsu Chemicals, Inc.), the substrates were laminated together at a spacing of 6.5 µm, thus producing a liquid crystal cell (referred to as "liquid crystal cell B" in the following). The rubbing process was carried out such that the pretilt angle of the liquid crystal was about 5° at the boundaries to the alignment films.

Then, a liquid crystal MJ96435 (with a refractive index anisotropy of Δn=0.138) was vacuum injected into the liquid crystal cell B. Then, polarizers were laminated on the test cell B, such that the polarization axes of the polarizers formed an angle of 45° with the direction of the rubbing process for the alignment films, and the polarization axes crossed at right angles. Applying a 7V square voltage pattern and observing the transition from splay alignment to bend alignment, the transition from splay alignment to bend alignment took about 7s for the entire electrode region.

In this embodiment, the bumps-shaped protrusions are provided outside the display pixel regions, and the bend transition seeds appear outside the display pixel regions, but it could be confirmed that the bend alignment spreads swiftly from outside the display pixel regions into the display pixel regions.

There is a region in which no electric field is applied between the display pixel region and the electrode region for the creation of bend seeds (region without electrode portion), but if this region is small, then the bend alignment can expand beyond this region.

Fifteenth Embodiment

Figure 32:
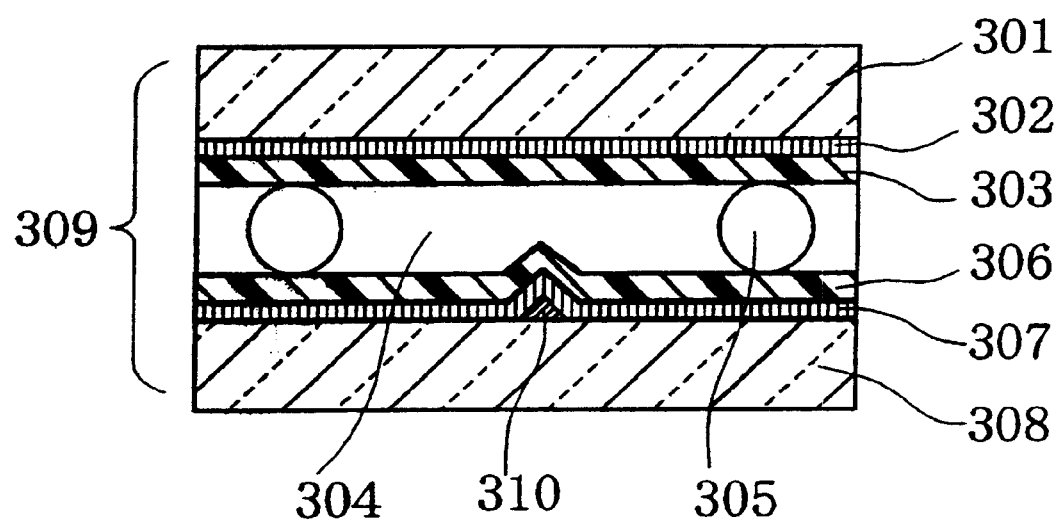
FIG. 32 is a diagram of the configuration of a test cell used to test the splay—bend transition time in a liquid crystal display device in a fifteenth embodiment of the present invention.
Figure 33:
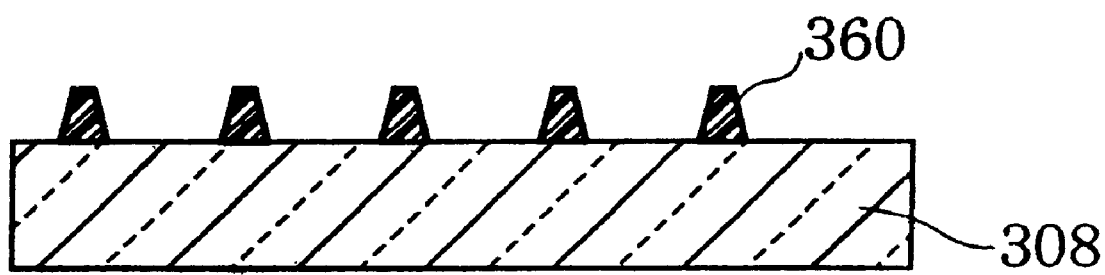
FIG. 33 illustrates a process for manufacturing bump-shaped protrusions in the liquid crystal display device of the fifteenth embodiment of the present invention.

FIG. 32 is a diagram of the configuration of a test cell used to test the splay—bend transition time in a liquid crystal display device of the present invention. FIGS. 27, 28 and 33 show parts of the manufacturing process and illustrate how the bump-shaped protrusions are made.

A PC resist material (by JSR Corp.) is spread on a glass substrate 308, forming a resist thin film of 1 $\mu$m thickness. Then, collimated UV light 323 is irradiated through a photo mask 321 with rectangular apertures 322 to expose the resist thin film 20. The resist thin film 20 that has been exposed with the collimated light is exposed, rinsed, and pre-baked at 90° C., forming bump-shaped protrusions 310 with a cross-section as shown in FIG. 28.

Then, the resist thin film 320 is post-baked at 150° C., which is above the glass transition point of the resist thin film material, to slope the shoulders of the bump-shaped protrusions 310 gently downward, and the bump-shaped protrusions 310 are provided with a triangular cross-section as shown in FIG. 32.

Then, ITO electrodes of 2000A thickness are formed on this substrate with one of the usual methods, forming a glass substrate 308 with electrodes. Subsequently, an alignment film coating (SE-7492 by Nissan Chemical Industries, Ltd.) is spread by spin-coating on the glass substrate 301 with the transparent electrodes 302 and on the glass substrate 308 provided with the bump-shaped protrusions, and cured for one hour in a thermostatic bath at 180° C., thus forming the alignment films 303 and 306. Then, a rubbing process is carried out by rubbing with a rubbing cloth by Toho Rayon Co., Ltd. in the direction shown in FIG. 29, and using spacers 305 by Sekisui Fine Chemical Corp. and Struct Bond 352A (tradename for a sealing resin by Mitsui Toatsu Chemicals, Inc.), the substrates were laminated together at a spacing of 6.5 $\mu$m, thus producing a liquid crystal cell 309 (referred to as "liquid crystal cell C" in the following).

The rubbing process was carried out such that the pretilt angle of the liquid crystal was about 5° at the boundary to the alignment film.

Then, a liquid crystal MJ96435 (with a refractive index anisotropy of $\Delta n=0.138$) was vacuum injected into the liquid crystal cell C, thus yielding the test cell C.

Then, polarizers were laminated on the test cell C, such that the polarization axes of the polarizers formed an angle of 45° with the direction of the rubbing process, and the polarization axes crossed at right angles. Applying a 7V square voltage pattern and observing the transition from splay alignment to bend alignment, the transition from splay alignment to bend alignment took about 7s for the entire electrode region.

In this test cell C, concentrations of the electric field occur at the triangular tips, and bend alignment starts from these portions. Moreover, above the triangular portions 60, there are portions that are rubbed downward and portions that are rubbed upward in the rubbing process, so that as a result, regions are formed in which the liquid crystal pretilt angle has the opposite sign. That is to say, near the bump-shaped protrusions, the liquid crystal directors are horizontal in the substrate plane, and this seems to contribute to a fast splay-bend transition.

In this embodiment, the electric field concentration portions are provided within the pixel regions, but a similar effect could be confirmed when providing them outside the pixel regions. Also, in this embodiment, the electric field concentration portions were provided only on one of the two substrate sides, but it is also possible to provide them on both substrate sides.

Sixteenth Embodiment

Figure 34:
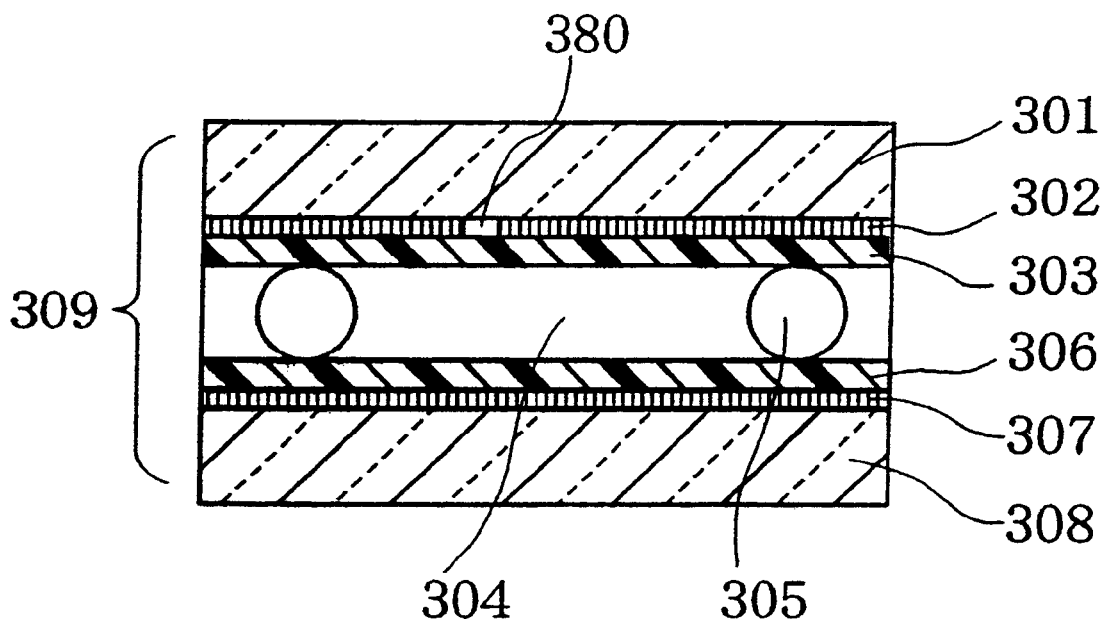
FIG. 34 schematically illustrates the cross-sectional configuration of a liquid crystal display device in a sixteenth embodiment of the present invention.
Figure 35:
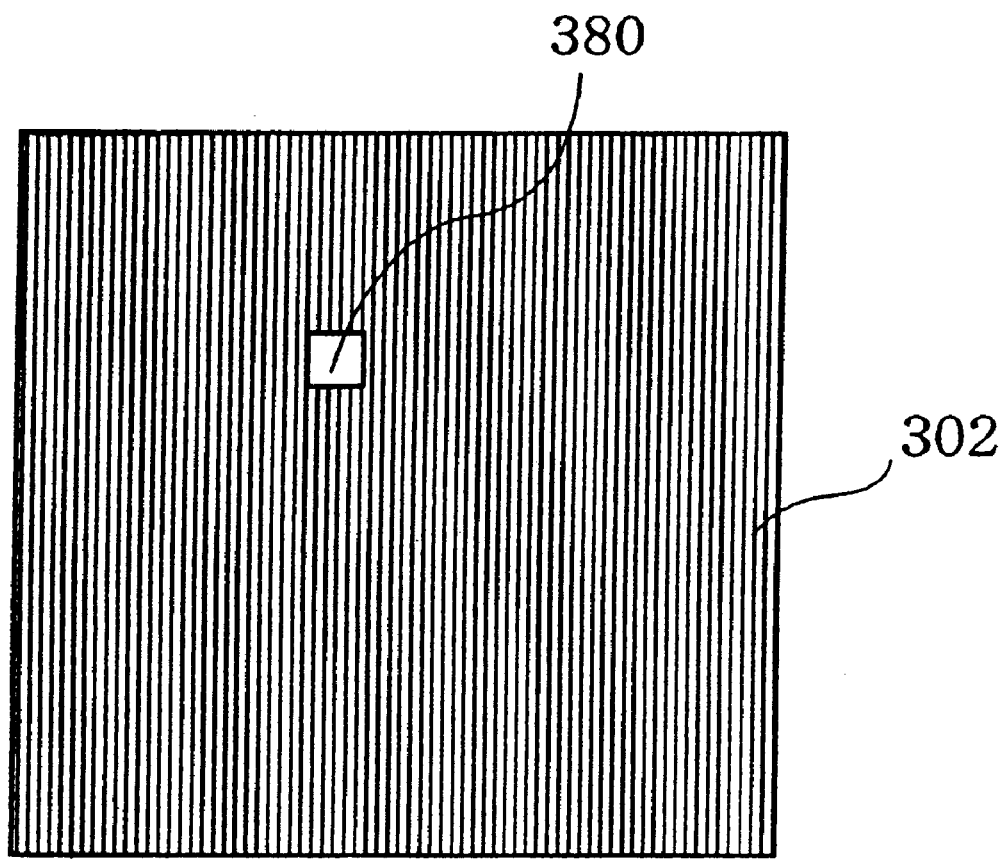
FIG. 35 schematically illustrates the pattern of the transparent electrodes used in the liquid crystal display device of the sixteenth embodiment.

FIG. 34 is a diagram of the configuration of a test cell used to test the splay—bend transition time in a liquid crystal display device of the present invention. FIG. 35 illustrates the electrode pattern of the glass substrate 302 used in this example.

An alignment film coating (SE-7492 by Nissan Chemical Industries, Ltd.) is spread by spin-coating on and on a glass substrate 301 provided with a transparent electrode 302 having an aperture portion 380 and on a glass substrate 308 provided with a transparent electrode 307 without aperture portion, and cured for one hour in a thermostatic bath at 180° C., thus forming the alignment films 303 and 306. Then, a rubbing process is carried out, rubbing with a rubbing cloth by Toho Rayon Co., Ltd. in the direction shown in FIG. 29, and using spacers 305 by Sekisui Fine Chemical Corp. and Struct Bond 352A (tradename for a sealing resin by Mitsui Toatsu Chemicals, Inc.), the substrates were laminated together at a spacing of 6.5 $\mu$m, thus yielding a liquid crystal cell 309 (referred to as "liquid crystal cell D" in the following).

The rubbing process was carried out such that the pretilt angle of the liquid crystal was about 5° at the boundaries to the alignment films.

Then, a liquid crystal MJ96435 (with a refractive index anisotropy of $\Delta n=0.138$) was vacuum injected into the liquid crystal cell D, thus yielding the test cell D.

Then, polarizers were laminated on the test cell D, such that the polarization axes of the polarizers formed an angle of 45° with the direction of the rubbing process for the alignment films, and the polarization axes crossed at right angles. Applying a voltage, the transition from splay alignment to bend alignment was observed.

In this test cell D, when a square voltage of 2V and 30 Hz was applied to the electrode on the side of the glass substrate 8, and a square voltage of 7V and 30 Hz was applied to the electrode on the side of the glass substrate 1, the transition from splay alignment to bend alignment took about 5s for the entire electrode region, so that a very fast bend transition could be achieved.

In this embodiment, an electric field of 5V (=7V−2V) is applied to the liquid crystal layer disposed between the two electrodes, but since an effective field of 7V (=7V−0V) is applied to the liquid crystal layer at the electrode aperture portion, bend alignment occurs at that portion.

In this embodiment, the aperture portion was rectangular, but of course it can also have another shape, such as circular or triangular.

Seventh Embodiment

Figure 36:
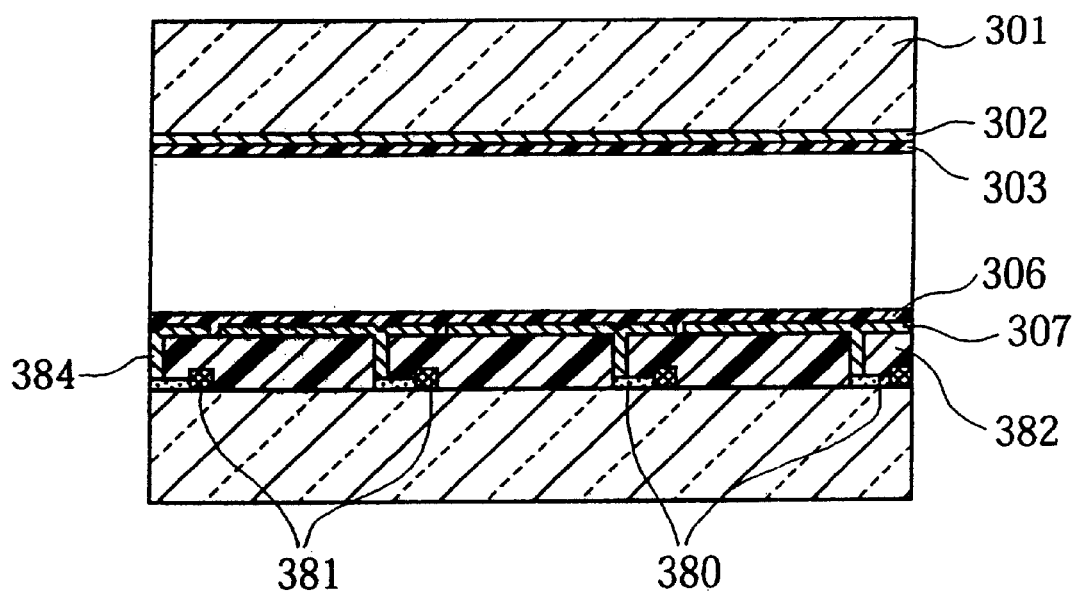
FIG. 36 is a cross-sectional view showing the main portions of a liquid crystal display device in accordance with a seventeenth embodiment.
Figure 37:
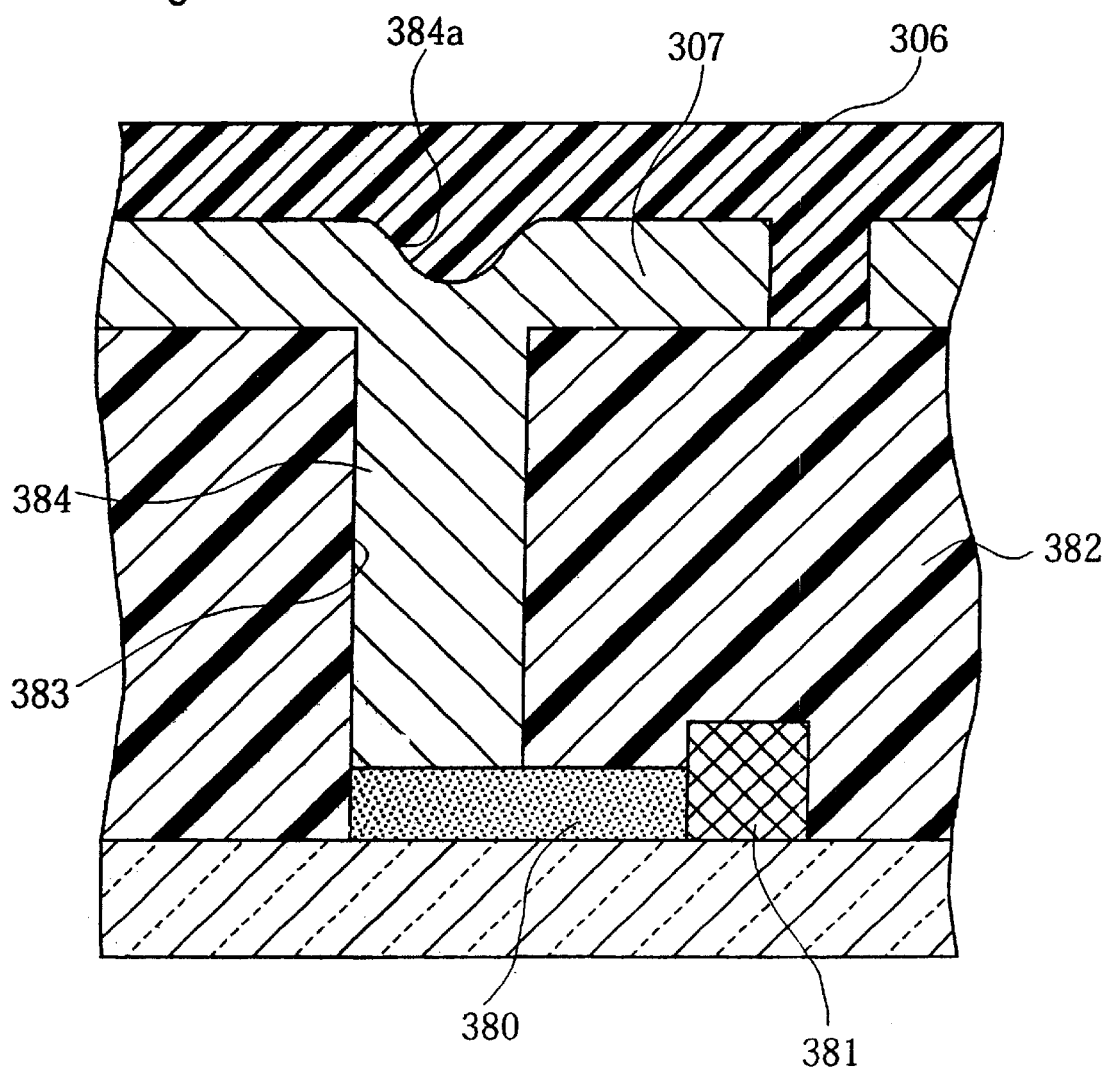
FIG. 37 is a partial magnification of FIG. 36.

FIG. 36 is a cross-sectional view showing the main portions of a liquid crystal display element in accordance with the seventeenth embodiment. FIG. 37 is a magnification of a portion of FIG. 36. This liquid crystal display device has pixel switching elements 380, signal electrode lines 381, and gate signal lines (not shown in the drawings) formed on the glass substrate 308, and flattening films 382 cover the switching elements 380, the signal electrode lines 381 and the gate signal lines. Display electrodes 307 are formed on the flattening films 382, and the display electrodes 307 and the switching elements 380 are electrically connected by relay electrodes 384 passing through contact holes 383 in the flattening films 382. In the portions on the upper aperture side of the contact holes 383, the relay electrodes 384 are provided with recesses 384a, as shown in FIG. 37. These recesses 384a form apertures in the display electrodes 307, and electric field concentrations can be attained near these recesses 384a. Consequently, a shortening of the transition time can be achieved.

Eighteenth Embodiment

Figure 38:
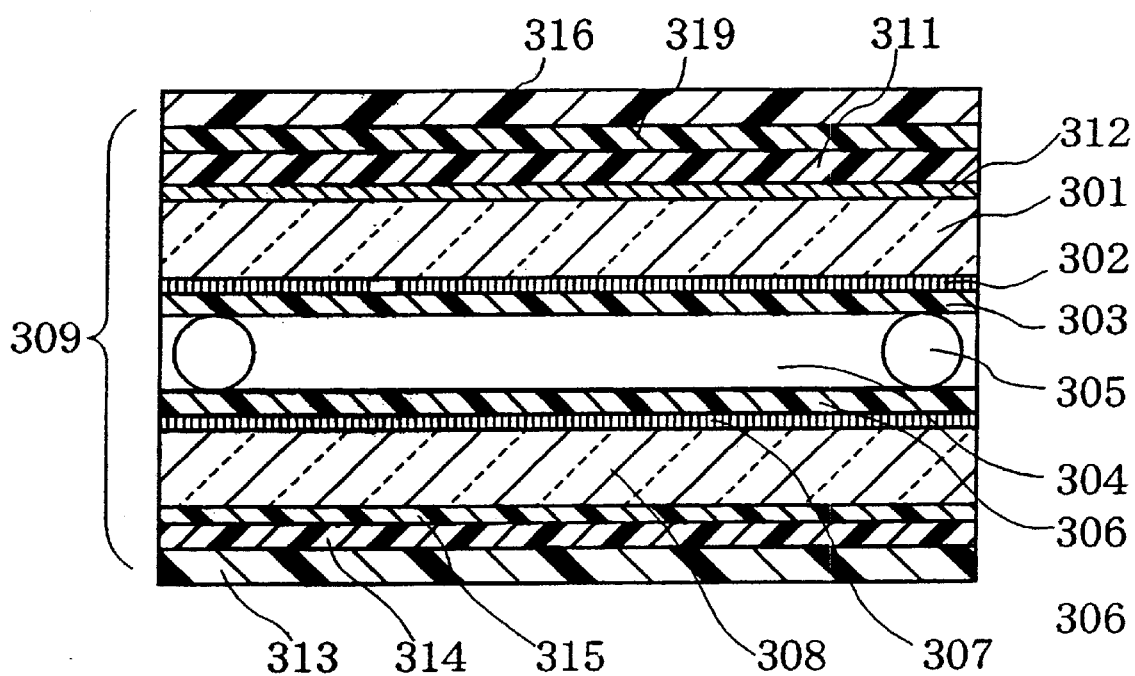
FIG. 38 is a cross-sectional view showing the main portions of a liquid crystal display device in accordance with an eighteenth embodiment.

FIG. 38 diagrammatically shows the configuration of a liquid crystal display element in accordance with the present invention.

Figure 39:
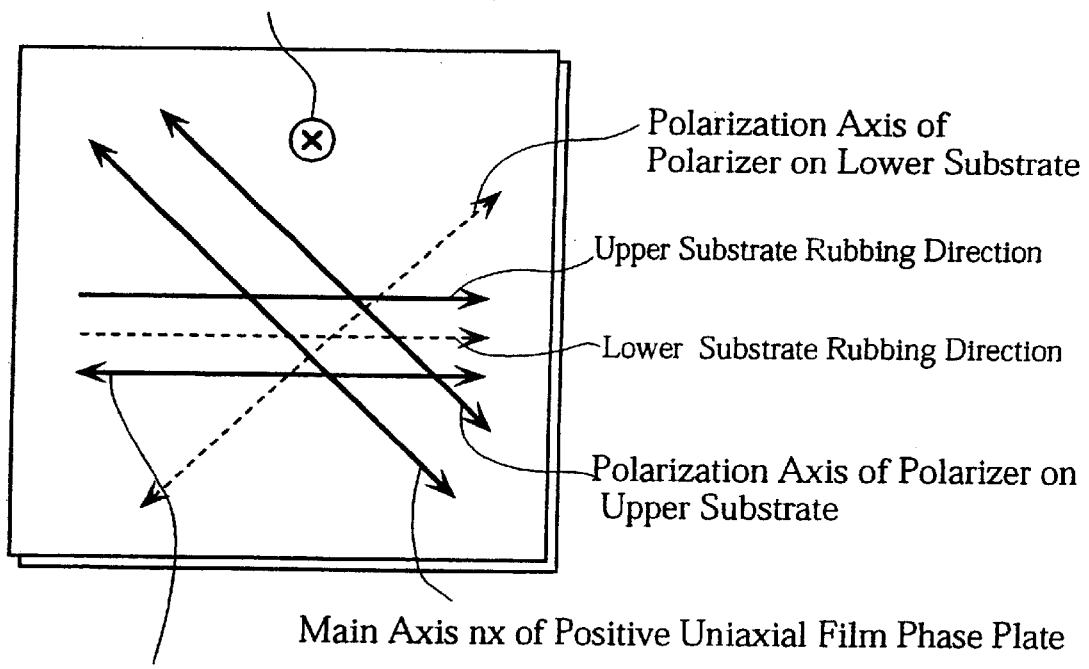
FIG. 39 illustrates the orientation of the optical elements in the liquid crystal cells used in the liquid crystal display device of the eighteenth embodiment.

Phase difference plates 312 and 315 made of an optical medium with negative refractive index anisotropy whose main axes are in hybrid arrangement, negative uniaxial phase difference plates 311 and 314, a positive uniaxial phase difference plate 319, and polarizers 313 and 316 are laminated in the configuration shown in FIG. 39 onto the test cell D made in the third embodiment, thus yielding a liquid crystal display element D.

The retardation of the phase difference plates 312, 315, 311, 314, and 319 is 26 nm, 26 nm, 350 nm, 350 nm, and 150 nm, respectively, for light of 550 nm wavelength.

Figure 40:
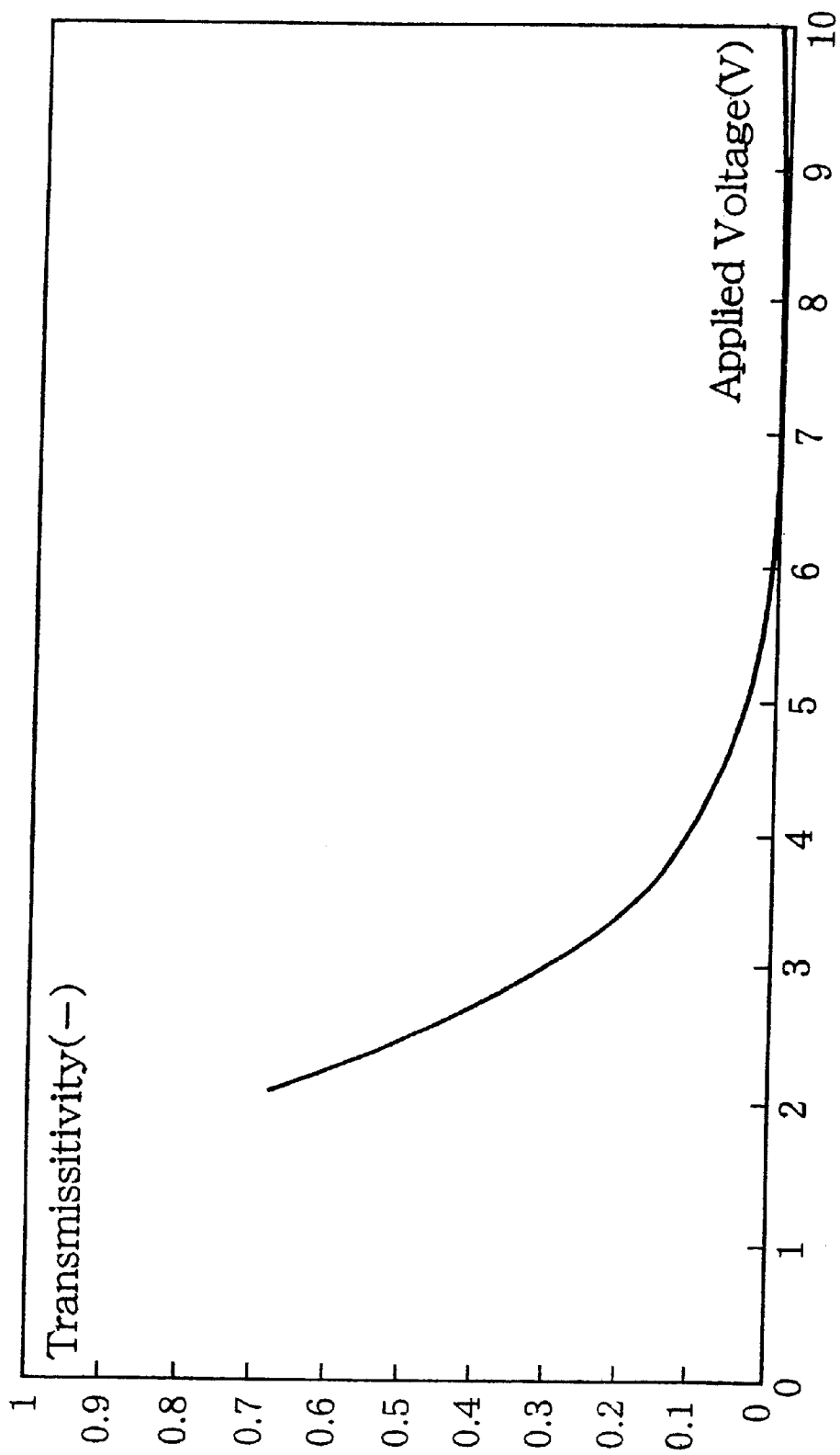
FIG. 40 shows the voltage—transmissivity characteristics of the liquid crystal cells used in the liquid crystal display device of the eighteenth embodiment.
Figure 42:
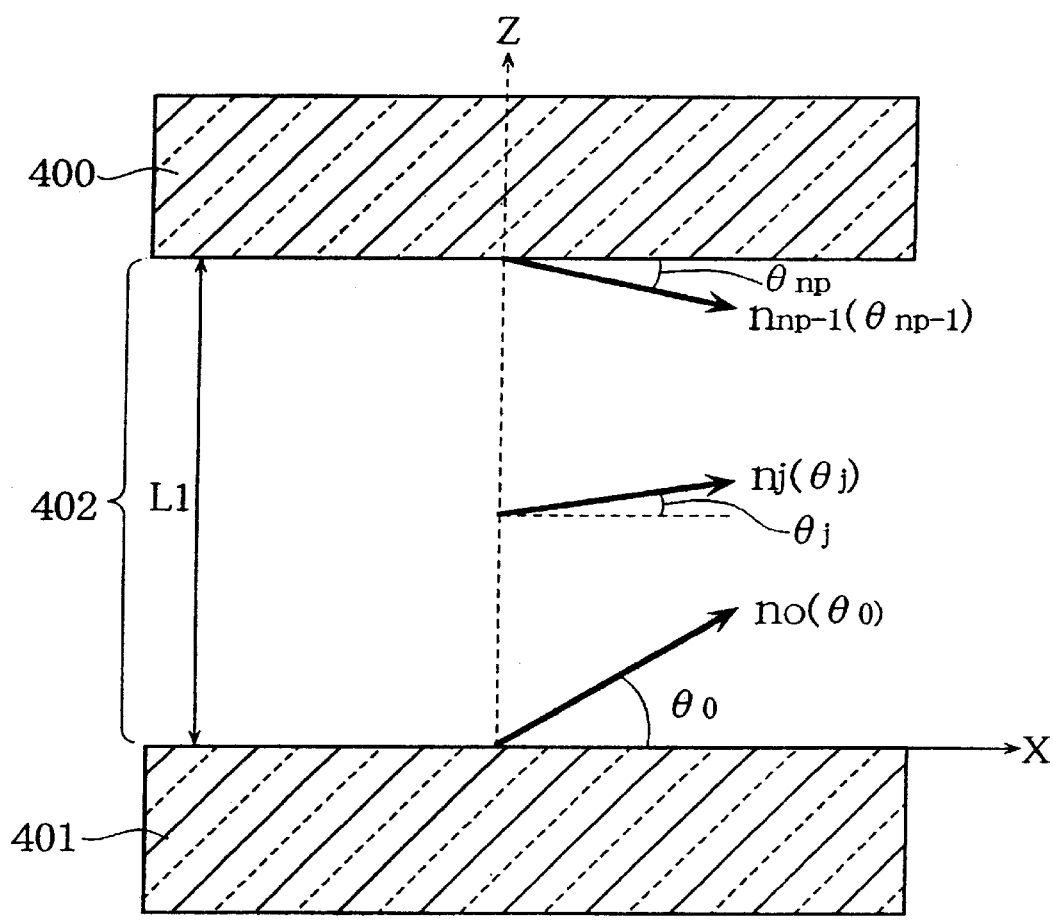
FIG. 42 is a diagram illustrating the directors of the liquid crystal layer.
Figure 43:
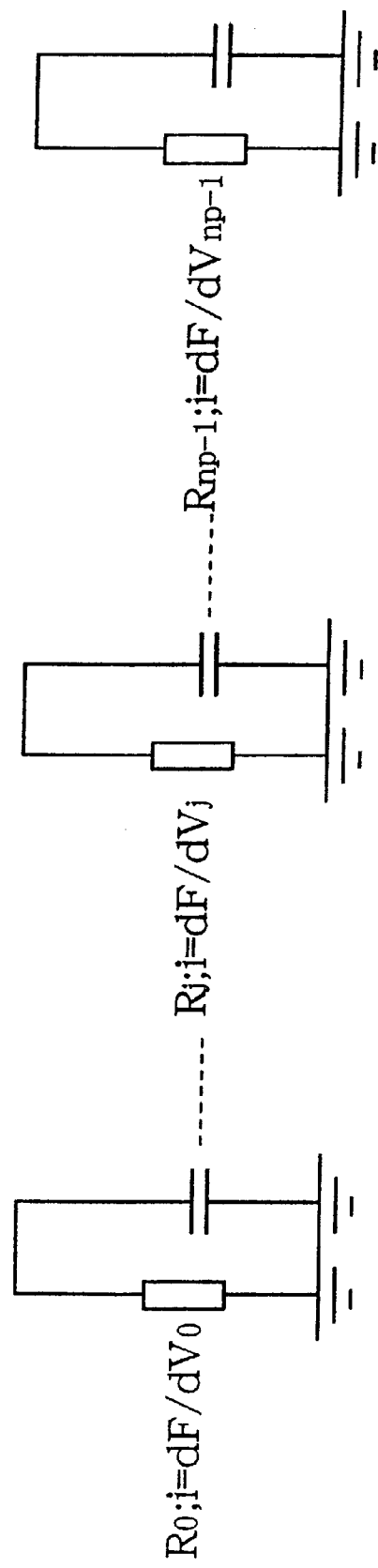
FIG. 43 is a schematic of an equivalent CR circuit.

FIG. 40 shows the voltage-transmissivity characteristics for the front face of the liquid crystal display element D at 25° C. The measurement was performed while lowering the voltage after applying a 10V square voltage for 10s and confirming bend alignment. In this liquid crystal display element, the transition from bend alignment to splay alignment occurs at 2.1V, so that display has to be performed effectively at a voltage of at least 2.2V.

Then, it was measured how the contrast ratio depends on the viewing angle for a white level voltage of 2.2V and a black level voltage of 7.2V, and it was determined that a contrast ratio of at least 10:1 is attained over a range of 126° vertical and 160° horizontal. It was also confirmed that a sufficiently broad viewing angle could be maintained when providing portions in which the orientation of the liquid crystal directors on the substrate alignment films differs from surrounding portions. Furthermore, alignment defects and defects in the display quality could not be observed with the bare eye.

When the response time for 3V to 5V was measured, the rise time was 5 ms, and the fall time was 6 ms.

As becomes clear from the above, with the liquid crystal display device of the present invention, a fast splay-bend alignment transition can be achieved without sacrificing the broad viewing angle characteristics or the response characteristics of the conventional OCB-mode, which is very valuable in practice.

Nineteenth Embodiment

FIG. 41 is a cross-sectional view of the main elements of a liquid crystal display device of the nineteenth embodiment, and FIG. 41(a) is a schematic diagram showing the alignment in the initial state when no electric field is applied. The liquid crystal cell, which functions as a bend alignment cell, has two parallel substrates 400 and 401 and a liquid crystal layer 402 filled between the substrates, constituting a so-called sandwich cell. Usually, transparent electrodes are formed on one substrate, and thin film transistors are formed on the other substrate.

FIG. 41(a) is a schematic diagram showing the alignment in the initial state when no electric field is applied. The alignment in the initial state is a homogenous alignment, which means that the molecular axes of the liquid crystal molecules are aligned substantially in parallel and practically homogenous while being slightly tilted with respect to the planes of the substrates 400 and 401. The liquid crystal molecules at the boundaries to the substrates are tilted in opposite directions at the upper substrate 400 and the lower substrate 401. This means that the alignment angles $\theta_1$ and $\theta_2$ of the liquid crystal molecules at the boundaries to the substrates (that is, the pretilt angles) have been adjusted to have opposite signs. In the following explanations, the alignment angle and the pretilt angle represent the tilt of the molecular axis of the liquid crystal molecules with respect to a plane parallel to the substrates, and are positive in counterclockwise direction, taking a plane parallel to the substrates as the reference.

When an electric field that is stronger than the value in the direction perpendicular to the substrate plane is applied to the liquid crystal layer 402 in the state shown in FIG. 41(a), the alignment of the liquid crystal changes, and the liquid crystal transitions into the alignment shown in FIG. 41(b).

The alignment shown in FIG. 41(b) is called bend alignment. The tilt of the liquid crystal molecule axes with respect to the substrate plane near the substrate surfaces, that is, the absolute value of the alignment angle, is small, and the absolute value of the alignment angle of the liquid crystal molecules at the center of the liquid crystal layer 402 is large. Furthermore, the liquid crystal molecules are practically not twisted across the entire liquid crystal layer.

Observing the transition from homogenous alignment to bend alignment in detail, it can be seen that bend alignment seeds appear in portions of the liquid crystal layer 402, and these seeds grow successively larger while eroding other regions that are still in homogenous alignment, until finally the entire liquid crystal layer is in bend alignment In other words, for the transition of the liquid crystal layer into bend alignment, the creation of seeds, that is, the transition of microscopic regions from homogenous alignment into bend alignment is necessary.

The inventors have analyzed the transition of these microscopic regions into bend alignment by solving the kinetic equations of the unit vector (referred to as "director" below) for the liquid crystal molecule alignment, and have found conditions, under which the seeds can appear more readily. This approach is explained in the following.

The alignment of the liquid crystal is expressed by the director. The direction n can be written as follows:

$$n(x) = (n_x(x,y,z), n_y(x,y,z), n_z(x,y,z))$$ (Equation 1)

As is shown in Equation 2, the free energy density f of the liquid crystal can be expressed as a function of the director n.

$$f = \frac{1}{2}\{k_{11}(divn)^2 + k_{22}(n \times rotn)^2 + k_{33}(n \times rotn)^2\} \frac{1}{2}\Delta\varepsilon(E \cdot n)^2$$ (Equation 2)

In this equation, $k_{11}$, $k_{22}$ and $k_{33}$ are the Frank elastic constants, representing the elastic constants for splay, twist and bend. $\Delta\epsilon$ is the difference of the dielectric constant in the direction of the liquid crystal molecule axis and the dielectric constant in directions perpendicular thereto, that is, the dielectric anisotropy. E is the external electric field.

In Equation 2, the first, second and third terms represent the elastic energies for splay, twist and bend deformations of the liquid crystal. The fourth term represents the electrical energy due to the electrical interaction between the external electric field and the liquid crystal. If $\Delta\epsilon > 0$, then the electrical energy is minimal when n is parallel to E and if $\Delta\epsilon<0$, then the electrical energy is minimal when n is perpendicular to E. Consequently, when applying an electric field E above a certain strength, the liquid crystal molecules align with their molecule axis in parallel to the electric field if $\Delta\epsilon>0$, and perpendicular to the electric field if $\Delta\epsilon<0$.

The total free energy F of the liquid crystal when the alignment of the molecules in the initial state is deformed by an external electric field can be expressed as the volume integral over f:

$$F=\int f(n(x))dx \qquad \text{(Equation 3)}$$

As shown in Equation 3, the total free energy F is a function defined by taking the unknown function $n(x)$ of the director as a variable (that is, a functional). The alignment of the liquid crystal under application of an external electric field is expressed by the $n(x)$ at which the total free energy F becomes minimal for appropriate boundary conditions. This means, when the $n(x)$ is determined at which F is minimal, then it is possible to predict the alignment of the liquid crystal. Furthermore, if the time-dependent director $n(x, t)$ can be found at which F becomes minimal for appropriate boundary conditions, then it is possible to predict the behavior of the device, such as its optical constants. In physical terms, this is a typical example of the principle of least action, and in optical terms, this is a variational minimization problem with boundary conditions.

Equation 3 can be solved theoretically. However, it is difficult to determine a functional form for the director $n(x)$, because analytic methods, such as using Euler's equation, lead to complicated non-linear equations.

In order to facilitate the solving of Equation 3, the following approach is pursued. First, the integral space is subjected to discretization by a method such as the finite element method. That is to say, the total integral space is partitioned into np elements, and expressed as the sum of the integrals over all elements:

$$F = \int_V f(n(x))dx = \sum_{j=0}^{np-1} \int_{\Delta V} f(n(x))dx \qquad \text{(Equation 4)}$$

The following approximation is performed for the director $n(x)$ in the partial integral space $\Delta V$. As shown in Equation 2, $n_x$, $n_y$, and $n_z$ are actually functions of x, y, and z, but it is assumed that they are constant in $\Delta V$. Furthermore, $dn_{x,j}/dx$ is approximated as $dn_{x,j}/dx=(n_{x,j+1}-dn_{x,j})/\Delta x$. Here, $n_{x,j}$ is the $n_x$ in the $j^{th}$ element, which is constant in $\Delta V$ as explained before, but which is unknown. This approximation of $n(x)$ in the partial integral space $\Delta V$ is coarse, but making the partitions of the integral space smaller can compensate this and improve the approximation.

With this approximation, $n_{x,j}$, $n_{y,j}$, and $n_{z,j}$ are constants within each element in Equation 4, so that it is easy to calculate the integral itself. However, at this stage, a number of higher order terms and non-linear terms of the unknown $n_{x,j}$, $n_{y,j}$, and $n_{z,j}$ proportional to the number of partitions are present in the equation for the total free energy F, so that this equation is still difficult. However, the values $n_{x,0}$, $n_{y,0}$, and $n_{z,0}$, can be easily given as the boundary conditions.

With the above approximation, the free energy F takes on the form:

$$F=F(n_{x,j},n_{y,j},n_{z,j}) \ (0 \leq j \leq np-1) \qquad \text{(Equation 5)}$$

That is to say, the free energy F is converted from a functional with the unknown function $n(x)$ as a variable to a function of the unknown $n_{x,j}$, $n_{y,j}$, and $n_{z,j}$. The unknown $n_{x,j}$, $n_{y,j}$, and $n_{z,j}$ are the values minimizing the function F in multi-dimensional parameter space.

As mentioned above, the bend alignment of the liquid crystal is a structure practically without twisting. As mentioned before, the director n is actually a function of x, y, and z, but it can be expressed as a function of the alignment angle. In that case, the director n in the bend alignment can be expressed as:

$$n=(\cos\theta,0,\sin\theta) \qquad \text{(Equation 6)}$$

Here, $\theta$ is the tilt of the liquid crystal molecules with respect to a plane parallel to the substrates, that is, the alignment angle. Furthermore, $\theta$ is dependent only on the distance z of the liquid crystal molecules to the substrates. FIG. 2 is a schematic diagram illustrating these directors.

Inserting Equation 6 into Equation 4, and performing partitioning and discretization into np elements, the $\theta j$ minimizing F is determined for each element. This means, for each element, the $\theta j$ satisfying $$\frac{\partial F}{\partial \theta j} = \left(\frac{k_{33}-k_{11}}{d^2}\right) \qquad \text{(Equation 7)}$$

$$\left\{(\theta_{j+1}-\theta_j)^2\sin 2\theta_j + (\theta_{j+1}-\theta_j)\left(\cos 2\theta_j - \frac{k_{33}+k_{11}}{k_{33}-k_{11}}\right) + \right.$$

$$(\theta_{j+1}-\theta_j)\left(\cos 2\theta_{j-1} - \frac{k_{33}+k_{11}}{k_{33}-k_{11}}\right) -$$

$$\left.\frac{\Delta\epsilon(dE)^2}{(k_{33}-k_{11})}\sin 2\theta_j\right\}$$

is determined. In this equation, d is L/np, wherein L is the distance between the substrates.

However, it is not easy to formulate and solve a system of np difficult non-linear equations as in Equation 7. Therefore, Equation 7 is solved with the following circuit analogy. The kinetic equation of the directors is written as:

$$\eta\frac{\partial \theta_j}{\partial t} + \frac{\partial F}{\partial \theta j} = 0 \qquad \text{(Equation 8)}$$

wherein $\eta$ is the viscosity coefficient of the liquid crystal. The following circuit analogies are applied to Equation 8:

$$\eta \rightarrow C \qquad \text{(Equation 9)}$$

$$\theta_j \rightarrow V_j$$

Thus, Equation 8 is transformed into:

$$C\frac{\partial V_j}{\partial t} + \frac{V_j}{R_j} = 0 \ \ (0 \leq j \leq np-1) \qquad \text{(Equation 10)}$$

As shown in FIG. 3, the circuit corresponding to Equation 10 consists of np CR circuits. The second term in Equation 10 represents the current flowing through the CR circuits. Here, Rj is the resistance for discharge relaxation, and is a voltage controlled resistance, determining the current (i) flowing through the CR circuits as $i=\partial F(Vj)/\partial Vj$.

The current $i (=\partial F/\partial Vj)$ settles to zero at a certain Vj. This means, Vj is determined automatically when determining the voltage at which the current through the CR circuits is zero with a circuit simulator.

Thus, by transforming the kinetic equations of the directors into an equivalent circuit, it is possible to analyze the non-linear equation system representing the effect of liquid crystal alignment with a circuit simulator, and to determine the relation between the external electric field E and the alignment (that is, the alignment angles θj).

As in this approach, the non-linear equation system representing the alignment effect is converted into a circuit by electric circuit analogy and analyzed with a circuit simulator, the equivalent circuit can be simply entered into a program, and there is no need to include a calculation for solving the equation itself. Therefore, simplification and downsizing of the program can be achieved.

Furthermore, by using this approach to calculate the change of the alignment angle θj as the external electric field E is increased, it is possible to determine the critical electric field Ec for liquid crystal transition as the external electric field Ec at which the alignment angles θj change abruptly.

Figure 44:
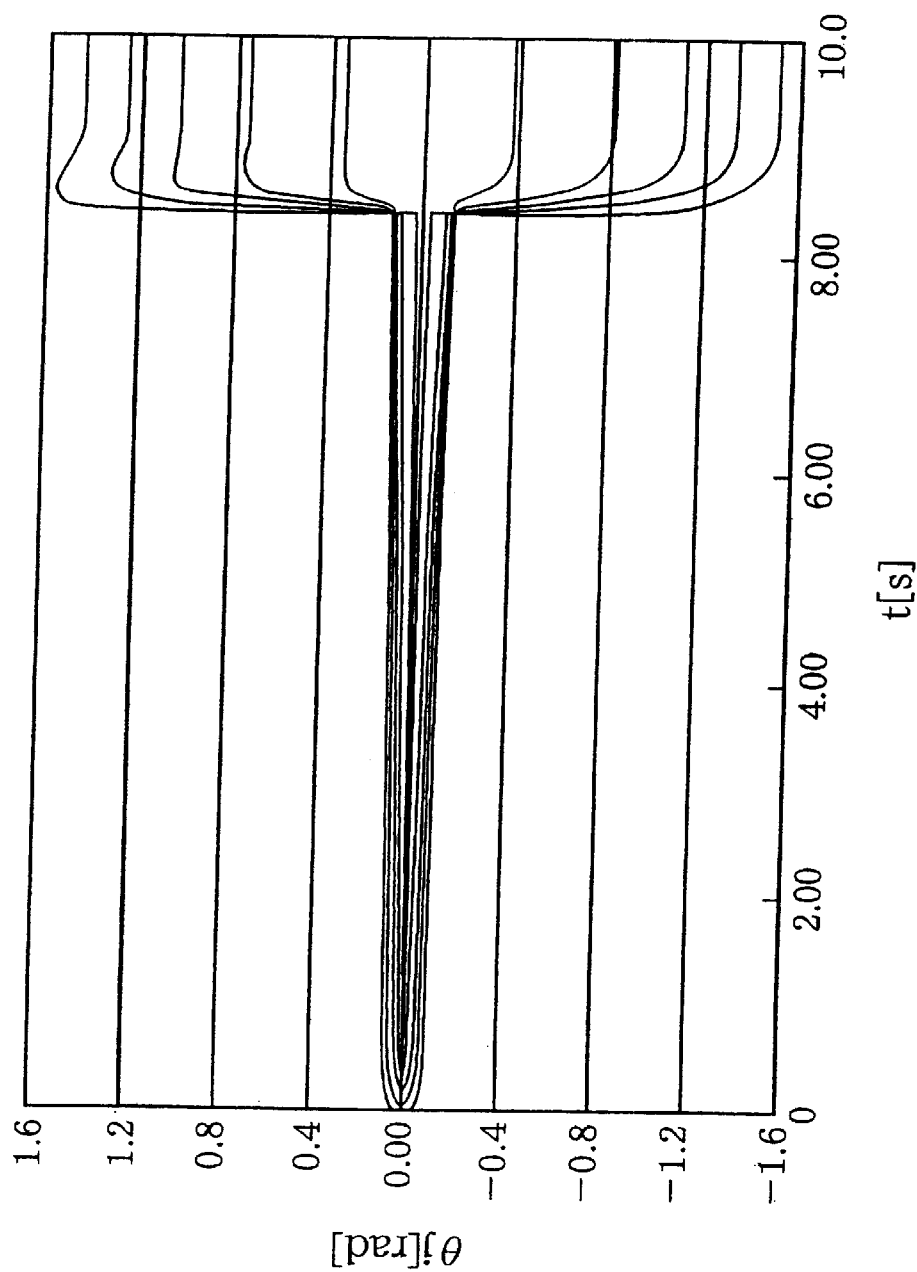
FIG. 44 shows the temporal change of the alignment angle ($\theta j$) of the liquid crystal when the external field is increased with time.

FIG. 44 is an example of the calculation results of this approach, and shows the temporal change of θj when the external field E is increased with time. The results shown in FIG. 4 have been calculated setting the boundary conditions $\theta_0=+0.1$ rad, and $\theta_{np-1}=-0.1$ rad, and with $k_{11}=6\times10^{-7}$dyn, $k_{33}=12\times10^{-7}$dyn and $\Delta\epsilon=10$. As shown in FIG. 4, when starting to apply the electric field, all alignment angles θj are comparatively small, and the liquid crystal is in homogeneous alignment. However, after a certain time has passed, that is, when the external electric field E exceeds a certain value (E>Ec), the alignment angles θj suddenly change, and the transition takes place. The absolute values of the alignment angles θj after the transition increase from the vicinity of the substrates to the center of the liquid crystal layer, and it can be seen that the liquid crystal after transition is in the bend alignment.

The smaller the critical electric field Ec is, the faster the alignment of the liquid crystal changes from homogenous alignment to bend alignment. With the approach described above, the critical electric field Ec was calculated for various parameters determining the alignment of the liquid crystal. As a result, it was found that the critical electric field Ec is susceptible in particular to the elastic constant (splay elastic constant) of the liquid crystal and to asymmetries of the pretilt angles.

Figure 45:
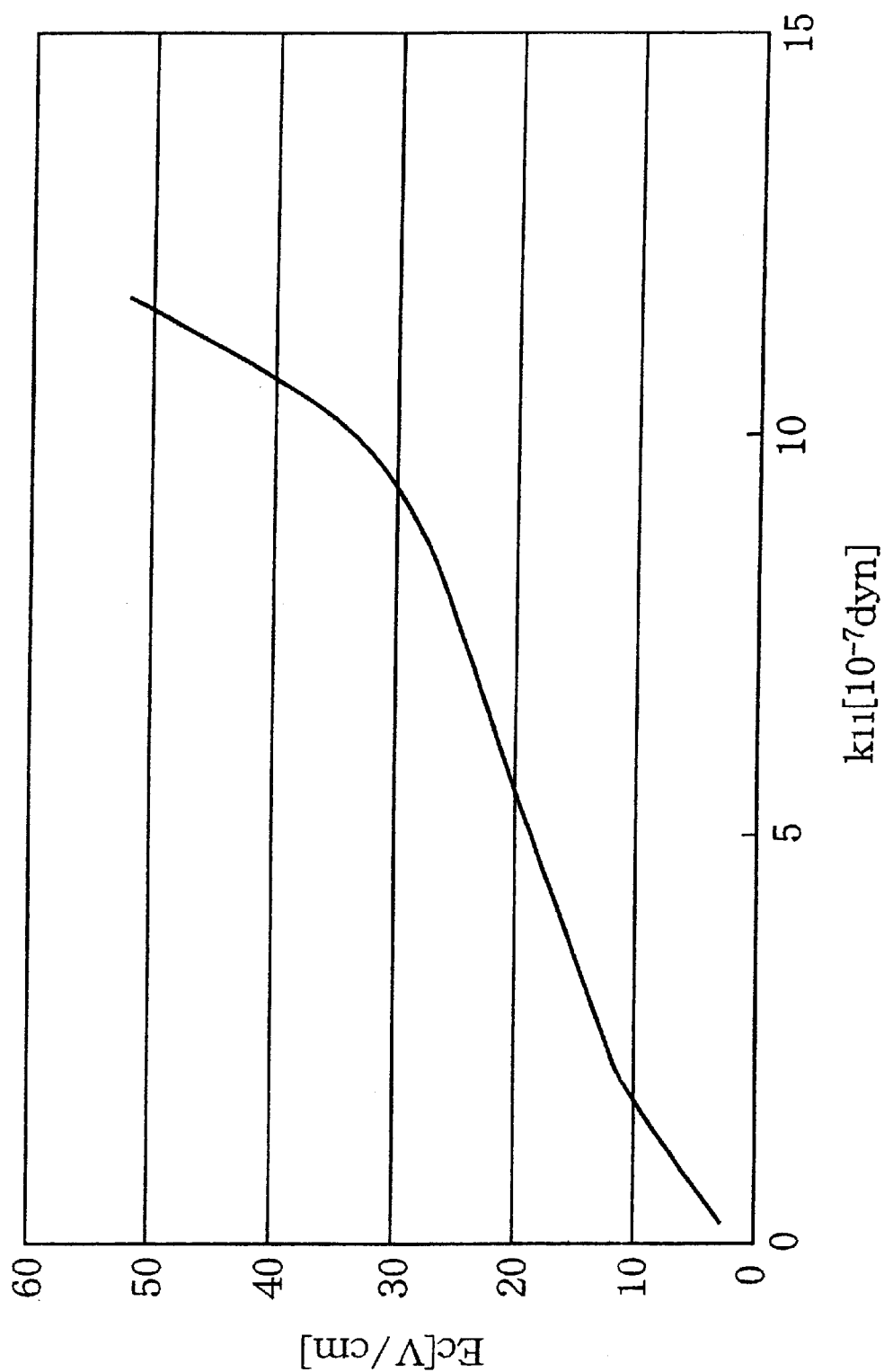
FIG. 45 shows the critical electric field (Ec) as a function of the splay elastic constant ($k_{11}$).

FIG. 45 shows the result of determining the relation of the splay elastic constant $k_{11}$ and the critical electric field Ec. The results shown in FIG. 45 have been calculated setting the boundary conditions $\theta_0=+0.1$ rad, and $\theta_{np-1}=-0.1$ rad, and with $k_{33}=12\times10^{-7}$dyn and $\Delta\epsilon=10$. As shown in FIG. 5, the larger the splay elastic constant $k_{11}$ is, the larger is the critical electric field Ec. In particular in the range of $k_{11}>10\times10^{-7}$dyn, Ec increases sharply with $k_{11}$.

Consequently, in order to achieve a swift liquid crystal transition, it is advantageous to set the splay elastic constant $k_{11}$ to less than $10\times10^{-7}$dyn, preferably to not more than $8\times10^{-7}$dyn. There is no particular lower limit for the splay elastic constant $k_{11}$, but it is preferable if the splay elastic constant $k_{11}$ is at least $6\times10^{-7}$dyn, because it is usually difficult to synthesize or prepare liquid crystal materials with $k_{11}<6\times10^{-7}$dyn.

There is no particular limitation with regard to the liquid crystal materials having such a splay elastic constant $k_{11}$, and suitable examples include pyrimidine type liquid crystals, dioxane type liquid crystals, and biphenyl type liquid crystals.

The asymmetry of the pretilt angles can be expressed by the difference (Δθ) of the absolute tilt angles at the upper and lower substrates. Also, as mentioned above, the pretilt angles $\theta_0$ and $\theta_{np-1}$ have opposite signs, so that the difference (Δθ) of the absolute values of the pretilt angles can be expressed as $\Delta\theta=|\theta_0+\theta_{np-1}|$.

Figure 46:
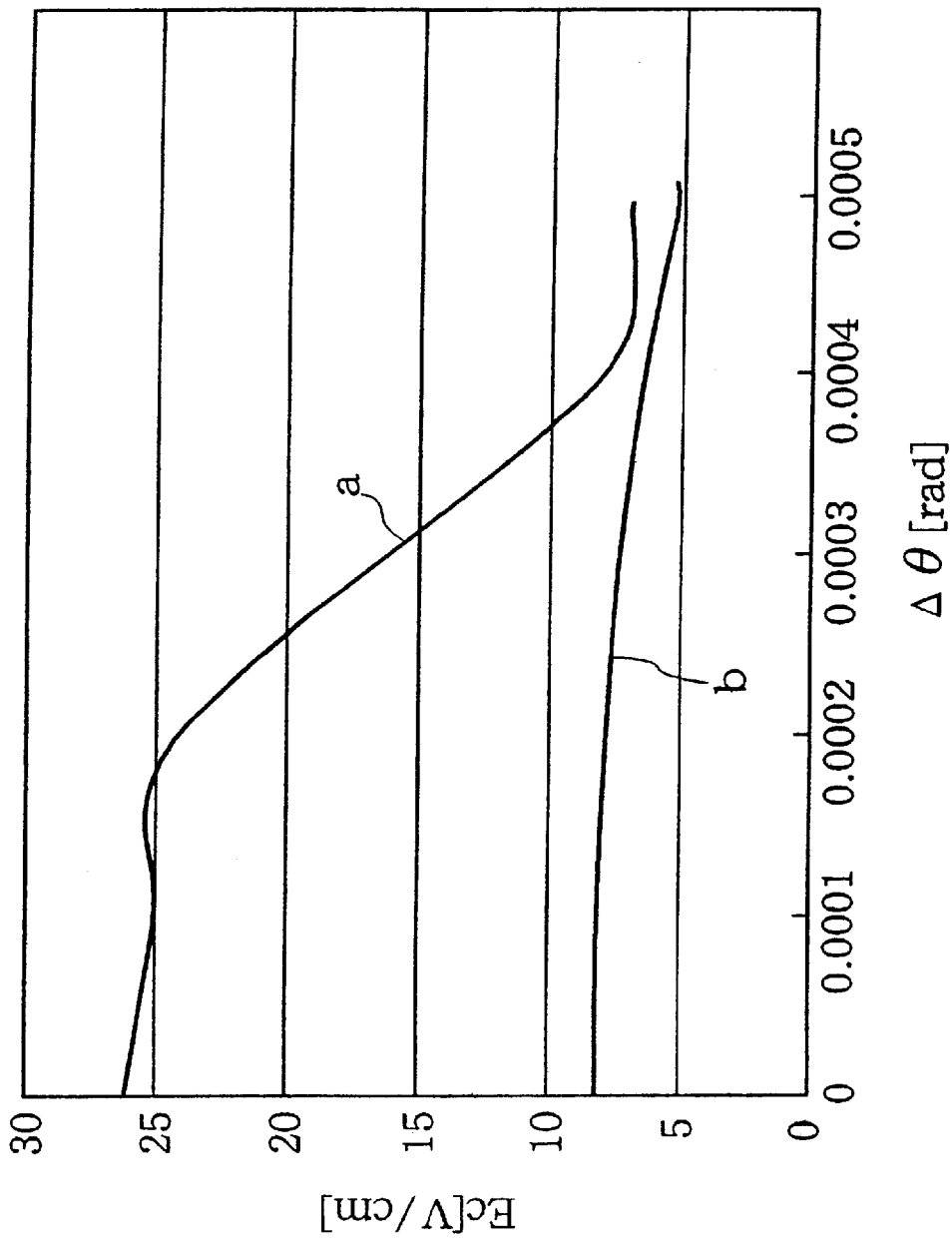
FIG. 46 shows the critical electric field (Ec) as a function of the difference ($\Delta\theta$) of the absolute values of the pretilt angles.

Curve a in FIG. 46 shows the calculated relation between the difference (Δθ) of the absolute values of the tilt angles at the upper and lower substrates and the critical electric field Ec. Curve a in FIG. 6 has been calculated for $k_{11}=6\times10^{-7}$dyn, $k_{33}=12\times10^{-7}$dyn and $\Delta\epsilon=10$. Curve a in FIG. 6 shows that the larger the difference Δθ of the pretilt angles is, the lower is the critical electric field Ec. In particular in a range of $\Delta\theta\geq0.0002$ rad, Ec decreases sharply as Δθ increases.

Consequently, to achieve a swift liquid crystal transition, it is advantageous to set the difference Δθ of the pretilt angles to at least 0.0002 rad, preferably to at least 0.035 rad. Furthermore, there is not particular limitation with regard to an upper limit for the difference Δθ of the pretilt angles, but preferably, the difference Δθ of the pretilt angles is set to less than 1.57 rad, more preferably to not more than 0.785 rad.

The absolute values of the pretilt angles $\theta_0$ and $\theta_{np-1}$ are preferably set to more than 0 rad and less than 1.57 rad, more preferably to at least 0.017 rad and at most 0.785 rad. The pretilt angles can be adjusted by forming suitable liquid crystal alignment films on the substrate surfaces by such methods as oblique deposition or Langmuir Blodgett (LB) deposition. There is no particular limitation with regard to the liquid crystal alignment films, and suitable examples include polyimide resins, polyvinyl alcohols, polystyrene resins, polycinnamate resins, chalcone-based resins, polypeptide resins, and polymer liquid crystals. Furthermore, in addition to the selection of the material for the liquid crystal alignment film, the pretilt angles can be controlled by adjusting such parameters as the tilt of the deposition direction with respect to the substrate surface in case of oblique deposition, or the lifting speed of the substrates in case of LB deposition.

The critical electric field Ec is also influenced by non-uniformities of the electric field in the liquid crystal layer, because bends of the electric field in the liquid crystal layer influence the stability of the alignment of the liquid crystal molecules. Non-uniformities in the electric field can be expressed by the ratio $E_1/E_0$ of the main electric field $E_0$ applied substantially uniformly to the liquid crystal layer and the secondary electric field $E_1$ that is applied non-uniformly. Here, $E_1$ is the maximum value of the applied secondary electric field.

The relation between the non-uniformity $E_1/E_0$ and the critical electric field Ec can be determined as follows, with the above-described approach. That is to say, the change of the alignment angles θj when increasing the main electric field $E_0$ is calculated under the condition that a uniform main electric field $E_0$ is applied as the external electric field E to the liquid crystal layer, and superimposed with a non-uniform secondary electric field $E_1$. The secondary electric field $E_1$ increases together with the main electric field $E_0$, so that the $E_1/E_0$ is constant at a predetermined value. From the result of the calculation, it is possible to determine the critical electric field Ec for liquid crystal transition as the main electric field $E_0$ at which the alignment angles θj change abruptly.

Figure 47:
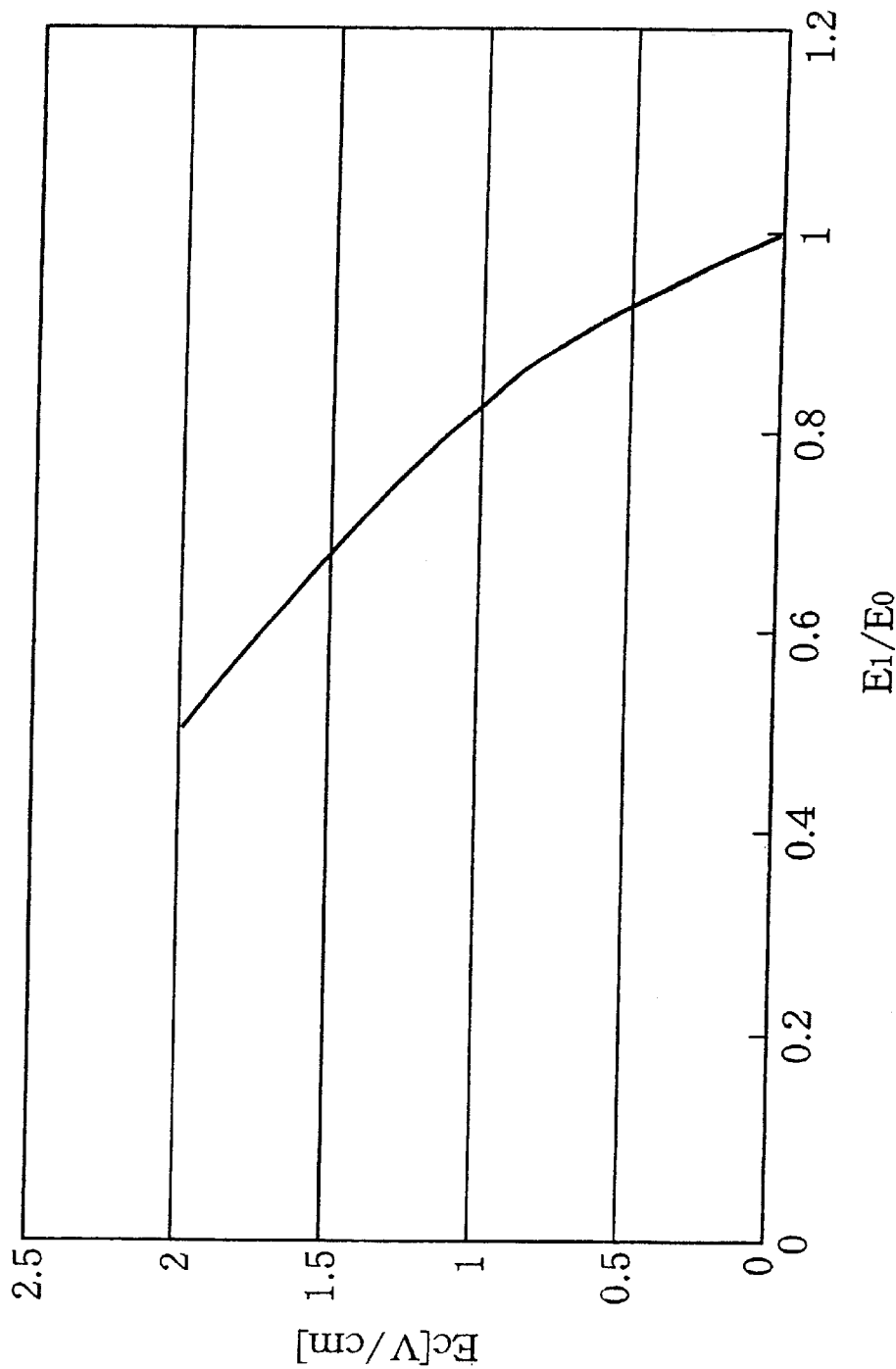
FIG. 47 shows the critical electric field (Ec) as a function of the non-uniformity ($E_1/E_0$) of the electric field.
Figure 48:
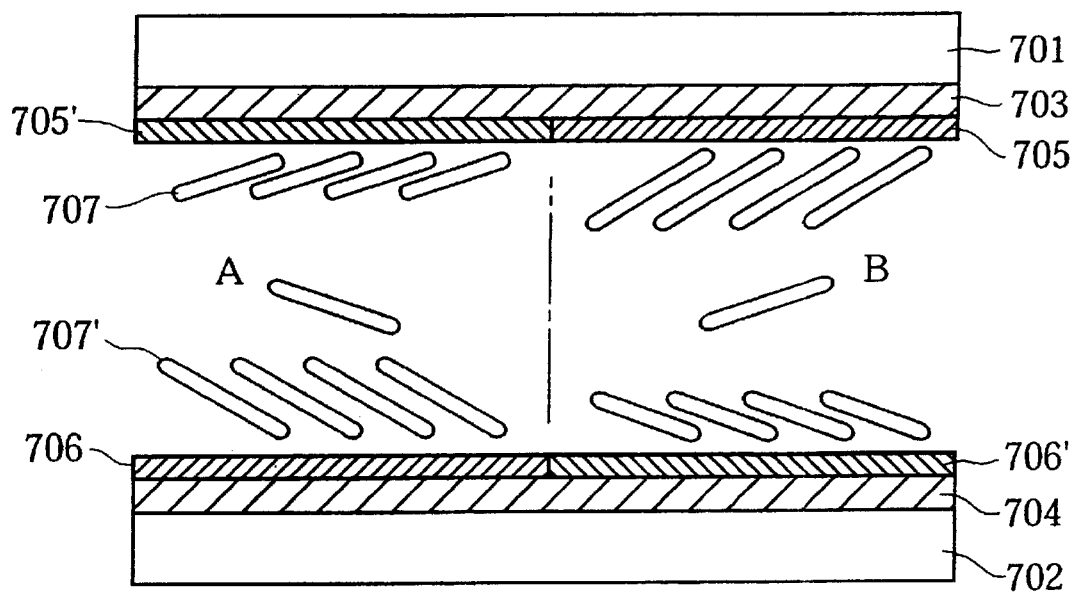
FIG. 48 is a cross-sectional view of a conventional example.

FIG. 47 is an example of the calculated critical electric field Ec, calculated with the above-described approach for a varying $E_1/E_0$. The results shown in FIG. 7 have been calculated setting the boundary conditions to $\theta_0=+0.26$ rad and $\theta_{np-}=-0.25$ rad, and with $k_{11}=6\times10^{-7}$dyn, $k_{33}=12\times10^{-7}$dyn and $\Delta\epsilon=10$. As shown in FIG. 47, the larger $E_1/E_0$ is, that is, the larger the non-uniformity of the electric field is, the larger is the critical electric field Ec, which becomes infinitely small near $E_1/E_0=1$. It seems that this is, because when there are bends in the electric field in the liquid crystal layer, then the homogeneous alignment is more unstable than when the electric field is uniform, and as a result, the transition to the bend alignment accelerates.

Consequently, to achieve a fast liquid crystal transition, it is advantageous when the a spatially non-uniform electric field $E_1$ is applied to the liquid crystal layer together with a practically uniform main field $E_0$. It is particularly advantageous to set $0.01<E_1/E_0<1$. In the range of $E_1/E_0 \leq 0.01$, it is difficult to attain a satisfying effect of promoting the liquid crystal transition by application of a non-uniform electric field, and in the range of $E_1/E_0 \geq 1$, the applied voltage becomes too large, so that there is the problem that it is not suitable for practical use. It is preferable to set $0.5 \leq E_1/E_0 \leq 1$.

Using the voltage applied between the source electrode of the thin film transistor and the transparent electrode, the non-uniform electric field $E_1$ can be applied to the liquid crystal layer in a direction perpendicular to the substrates. It is preferable that the non-uniform electric field $E_1$ is an ac electric field with a frequency of at most 100 kHz, and it is preferable that its amplitude attenuates over time.

It is preferable to satisfy a combination of two or all three of the three conditions for lowering the critical electric field Ec, namely the conditions for the splay elastic constant ($k_{11}$), the asymmetry of the pretilt angle ($\Delta\theta$), and the non-uniformity of the electric field ($E_1/E_0$). Combining these conditions, the critical electric field Ec can be lowered even more reliably than when only one of the conditions is satisfied.

For example, curve b in FIG. 46 shows the result of the calculations under the same conditions as in curve a of FIG. 46, except that a non-uniform electric field $E_1$ is applied in addition to the practically uniform external electric field $E_0$. Curve b shows the results for $E_1/E_0=0.03$. As can be seen by comparing curve a and curve b in FIG. 46, the critical electric field Ec is lowered further, and a swifter liquid crystal transition can be achieved by satisfying a combination of the two conditions of asymmetry of the pretilt angles and electric field non-uniformity.

INDUSTRIAL APPLICABILITY

With the configurations as explained above, it is possible to attain all object of the present invention.

In accordance with the present invention as described above, with a method for driving a liquid crystal display device using OCB cells in which an ac voltage superimposed with a bias voltage is continuously applied to a pair of substrates, or a step of applying an ac voltage superimposed with a bias voltage to a pair of substrates, and a step of applying an open state or a low voltage state are repeated in alternation, it is possible to obtain an OCB liquid crystal display device of the bend alignment type without display defects, with fast response times, which is suitable for moving images, which has broad viewing angles, and in which a transition from splay alignment to bend alignment can be accomplished substantially reliably and in a very short time.

Furthermore, the effect attained with the present invention is that it is possible to obtain a liquid crystal display device for OCB display mode with fast response times and broad viewing angles, made of active matrix type liquid crystal cells, in which a transition from splay alignment to bend alignment can be achieved reliably and fast.

Furthermore, in accordance with the present invention, in an active matrix liquid crystal display device, including an array substrate, an opposing substrate, and a liquid crystal layer arranged between the array substrate and the opposing substrate, wherein pretilt angles of the liquid crystal at an upper and at a lower boundary of liquid crystal layer have opposite signs, and in a liquid crystal cell in splay alignment, which has been subjected to a parallel alignment process, the liquid crystal is in splay alignment when no voltage is applied, wherein, before liquid crystal display driving, an initialization process for a transition from splay alignment to bend alignment is performed by application of a voltage, wherein the liquid crystal display driving is performed in the bend alignment attained by the initialization, a liquid crystal display device for OCB display mode with fast response times and broad viewing angles, made of active matrix type liquid crystal cells, in which a transition from splay alignment to bend alignment can be achieved reliably and fast, by providing each pixel with at least one transition-inducing transversal field application portion due to which a transversal electric field is generated, and applying a continuous or intermittent voltage between the pixel electrode and the common electrode, creating transition seeds in each pixel and transitioning the pixels from splay arrangement to bend arrangement.

Furthermore, in accordance with the present invention, an OCB display mode alignment liquid crystal display element is a parallel alignment liquid crystal display element including a liquid crystal layer disposed between a pair of substrates and a phase compensator arranged outside the substrates, achieving a reliable and fast splay-bend alignment transition, which is very valuable in practice.

Furthermore, in accordance with the present invention, a method of applying an electric field to a liquid crystal disposed between a first substrate and a second substrate arranged in opposition and transitioning the alignment of the liquid crystal into bend alignment can cause swift transition of the liquid crystal into bend alignment by setting the splay elastic constant $k_{11}$ of the liquid crystal in the range of $10\times10^{-7}\mathrm{dyn} \geq k_{11} \geq 6\times10^{-7}\mathrm{dyn}$, and satisfying the relation $1.57\ \mathrm{rad} > |\theta_1 - \theta_2| \geq 0.0002\ \mathrm{rad}$, wherein $\theta_1$ is the absolute value of a pretilt angle of the liquid crystal with respect to the first substrate and $\theta_2$ is the absolute value of a pretilt angle of the liquid crystal with respect to the second substrate.

Furthermore, in accordance with the present invention, a method of applying an electric field to a liquid crystal disposed between a first substrate and a second substrate arranged in opposition and transitioning the alignment of the liquid crystal into bend alignment can cause swift transition of the liquid crystal into bend alignment by setting the splay elastic constant $k_{11}$ of the liquid crystal in the range of $10\times10^{-7}\mathrm{dyn} \geq k_{11} \geq 6\times10^{-7}\mathrm{dyn}$, and, when the electric field is a main electric field $E_0$ applied uniformly over space, to which a secondary electric field $E_1$ applied non-uniformly over space is superimposed, satisfying the relation $1.0 > E_1 - E_0 > \frac{1}{100}$.

Furthermore, in accordance with the present invention, a method of applying an electric field to a liquid crystal disposed between a first substrate and a second substrate arranged in opposition and transitioning the alignment of the liquid crystal into bend alignment can cause swift transition of the liquid crystal into bend alignment by satisfying the relation $1.57\ \mathrm{rad} > |\theta_1 - \theta_2| \geq 0.0002\ \mathrm{rad}$, wherein $\theta_1$ is the absolute value of a pretilt angle of the liquid crystal with respect to the first substrate and $\theta_2$ is the absolute value of a pretilt angle of the liquid crystal with respect to the second substrate, and, when the electric field is a main electric field $E_0$ applied uniformly over space, to which a secondary electric field $E_1$ applied non-uniformly over space is superimposed, satisfying the relation $1.0 > E_1 - E_0 > \frac{1}{100}$.

Furthermore, in accordance with the present invention, a method of applying an electric field to a liquid crystal disposed between a first substrate and a second substrate arranged in opposition and transitioning the alignment of the liquid crystal into bend alignment can cause swift transition of the liquid crystal into bend alignment by setting the splay elastic constant $k_{11}$ of the liquid crystal is in the range of $10 \times 10^{-7} \text{dyn} \geq k_{11} \geq 6 \times 10^{-7} \text{dyn}$, satisfying the relation $1.57 \text{ rad} > |\theta_1 - \theta_2| \geq 0.0002 \text{ rad}$, wherein $\theta_1$ is the absolute value of a pretilt angle of the liquid crystal with respect to the first substrate and $\theta_2$ is the absolute value of a pretilt angle of the liquid crystal with respect to the second substrate, and, when the electric field is a main electric field $E_0$ applied uniformly over space, to which a secondary electric field $E_1$ applied non-uniformly over space is superimposed, satisfying the relation $1.0 > E_1 - E_0 > 1/100$.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. An active matrix liquid crystal display device comprising a liquid crystal cell including an array substrate provided with a pixel electrode, a signal electrode line, and a gate electrode line and an opposing substrate provided with a common electrode, the liquid crystal cell in which pretilt angles of liquid crystal at upper and lower interfaces of a liquid crystal layer disposed between the array substrate and the opposing substrate have opposite signs having splay alignment formed by parallel alignment process while no voltage is applied, the active matrix liquid crystal display device being subjected to an initialization process for transitioning the splay alignment to bend alignment by application of voltage before liquid crystal display driving and adapted to perform the liquid crystal display driving in the bend alignment, wherein the pixel electrode is provided with a protrusion at a periphery thereof in a plane parallel to a plane defined by an upper surface of said array substrate, and in a region where the protrusion does not overlap with the signal electrode line and the gate electrode line in a vertical direction relative to said plane, and voltage is applied continuously or intermittently applied to the pixel electrode and the common electrode.

2. The active matrix liquid crystal display device according to claim 1, wherein the protrusion is rectangle-shaped.

3. The active matrix liquid crystal display device according to claim 1, wherein the protrusion is triangle-shaped.

4. The active matrix liquid crystal display device according to claim 1, wherein the protrusion is trapezoid-shaped.

5. The active matrix liquid crystal display device according to claim 1, wherein protrusions are formed continuously along the periphery of the pixel electrode.

6. The active matrix liquid crystal display device according to claim 1, wherein at least one of the signal electrode line and the gate electrode line is disposed on the array substrate so as to be provided at position different from position at which the pixel electrode is provided in direction vertical to the array substrate.

7. The active matrix liquid crystal display device according to claim 1, wherein both of the signal electrode line and the gate electrode line are disposed on the array substrate so as to be provided at positions different from position at which the pixel electrode is provided in direction vertical to the array substrate.

8. The active matrix liquid crystal display device according to claim 1, wherein rubbing direction is substantially perpendicular to the signal electrode line.

9. The active matrix liquid crystal display device according to claim 1, wherein rubbing direction is substantially perpendicular to the gate electrode line.

10. The active matrix liquid crystal display device according to claim 1, wherein transversal electric field is generated by the protrusion.

11. The active matrix liquid crystal display device according to claim 10, wherein direction of the transversal electric field is substantially perpendicular to rubbing direction.

* * * * *

UNITED STATES PATENT AND TRADEMARK OFFICE
CERTIFICATE OF CORRECTION

PATENT NO. : 6,597,424 B2
DATED : July 22, 2003
INVENTOR(S) : Katsuji Hattori et al.

It is certified that error appears in the above-identified patent and that said Letters Patent is hereby corrected as shown below:

Title page,
Item [63], Related U.S. Application Data", replace "Continuation of application No. 09/786,160, filed as application No. PCT/JP99/04814 on Mar. 1, 2001." with -- Continuation of application No. 09/786,160 filed March 1, 2001 which claims priority to International Application No. PCT/JP99/04814 filed on September 3, 1999. --

Signed and Sealed this

First Day of June, 2004

JON W. DUDAS
*Acting Director of the United States Patent and Trademark Office*